United States Patent
Kim et al.

(10) Patent No.: US 10,182,335 B2
(45) Date of Patent: Jan. 15, 2019

(54) METHOD FOR DISCOVERING DEVICE IN WIRELESS COMMUNICATION SYSTEM SUPPORTING DEVICE-TO-DEVICE COMMUNICATION AND APPARATUS FOR SAME

(71) Applicants: LG ELECTRONICS INC., Seoul (KR); Industry-University Cooperation Foundation of Soongsil University, Seoul (KR)

(72) Inventors: Hakseong Kim, Seoul (KR); Mochan Yang, Seoul (KR); Shanai Wu, Seoul (KR); Yoan Shin, Seoul (KR)

(73) Assignees: LG ELECTRONICS INC., Seoul (KR); Industry-University Cooperation Foundation of Soongsil University, Seoul (KR)

( * ) Notice: Subject to any disclaimer, the term of this patent is extended or adjusted under 35 U.S.C. 154(b) by 120 days.

(21) Appl. No.: 15/123,586

(22) PCT Filed: Mar. 4, 2015

(86) PCT No.: PCT/KR2015/002086
§ 371 (c)(1),
(2) Date: Sep. 2, 2016

(87) PCT Pub. No.: WO2015/133816
PCT Pub. Date: Sep. 11, 2015

(65) Prior Publication Data
US 2017/0078863 A1 Mar. 16, 2017

Related U.S. Application Data

(60) Provisional application No. 62/056,622, filed on Sep. 29, 2014, provisional application No. 61/947,975, filed on Mar. 4, 2014.

(51) Int. Cl.
*H04W 8/00* (2009.01)
*H04L 5/00* (2006.01)
*H04W 48/16* (2009.01)

(52) U.S. Cl.
CPC .......... *H04W 8/005* (2013.01); *H04L 5/0048* (2013.01); *H04W 48/16* (2013.01)

(58) Field of Classification Search
CPC ............................ H04W 8/005; H04L 5/0048
See application file for complete search history.

(56) References Cited

U.S. PATENT DOCUMENTS

| | | | |
|---|---|---|---|
| 8,594,632 B1 * | 11/2013 | Azizi | H04W 12/06 455/411 |
| 2007/0153809 A1 * | 7/2007 | Chang | H04L 12/185 370/395.53 |

(Continued)

FOREIGN PATENT DOCUMENTS

WO 2014/031829 2/2014

OTHER PUBLICATIONS

PCT International Application No. PCT/KR2015/002086, International Search Report dated Jun. 15, 2015, 4 pages.

*Primary Examiner* — Charles C Jiang
*Assistant Examiner* — Thad N Defauw
(74) *Attorney, Agent, or Firm* — Lee, Hong, Degerman, Kang & Waimey

(57) ABSTRACT

Disclosed are a terminal discovery method in a wireless communication system supporting device-to-device (D2D) communication, and a device therefor. The method for discovering a terminal in a wireless communication system supporting device-to-device (D2D) communication, includes transmitting, by a terminal, a discovery signal, and receiving, by the terminal, a response signal as a response with respect to the discovery signal from a different terminal, wherein the response signal is transmitted by the dif- (Continued)

ferent terminal when a response delay time determined on the basis of a reception signal-to-interference noise ratio (SINR) terminates.

12 Claims, 34 Drawing Sheets

(56) References Cited

U.S. PATENT DOCUMENTS

| | | | |
|---|---|---|---|
| 2012/0020237 A1* | 1/2012 | Tanaka | H04W 8/005 370/252 |
| 2012/0179798 A1* | 7/2012 | Pafumi | G06F 9/5072 709/223 |
| 2013/0159522 A1 | 6/2013 | Hakola et al. | |
| 2013/0160101 A1 | 6/2013 | Hakola et al. | |
| 2013/0322276 A1 | 12/2013 | Pelletier et al. | |

* cited by examiner

[FIG. 1]
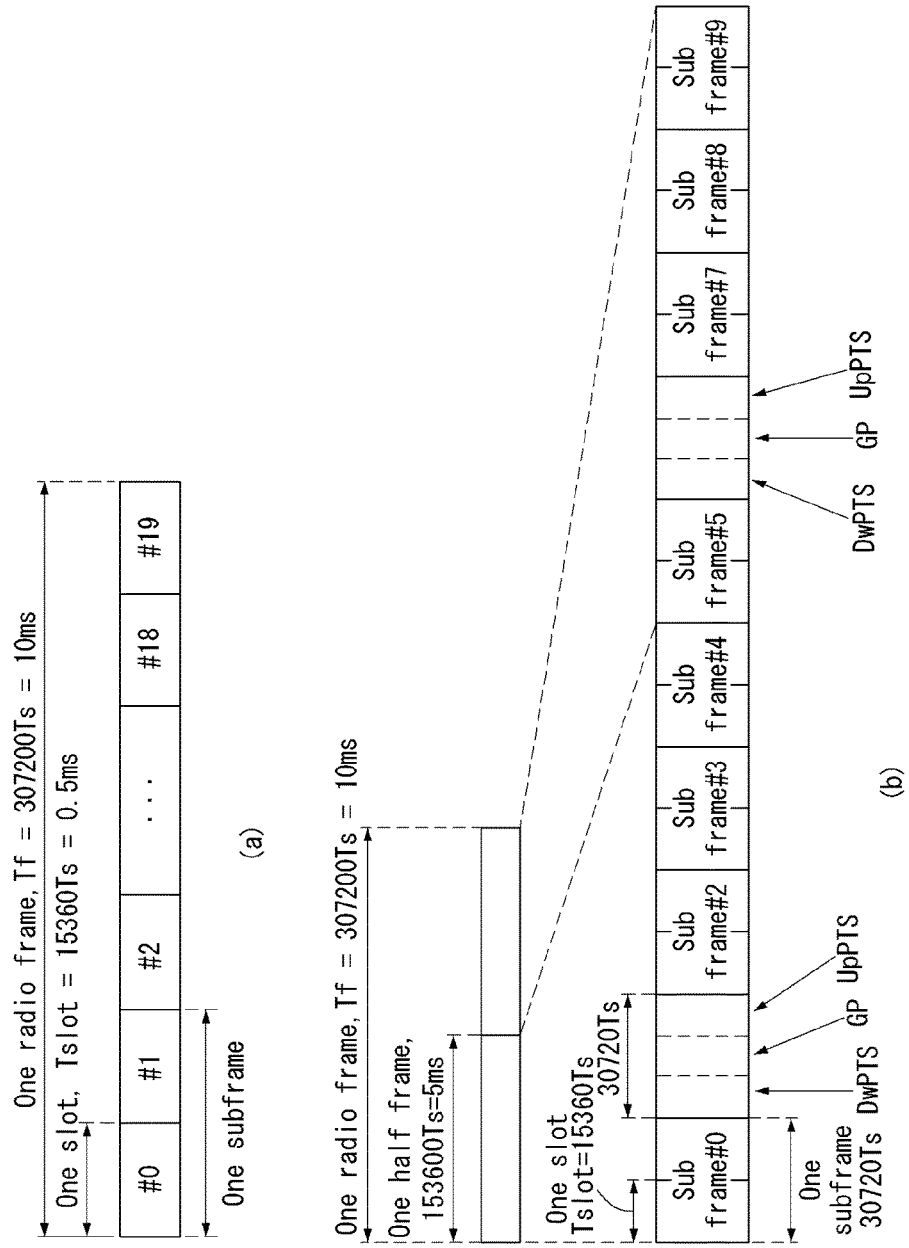

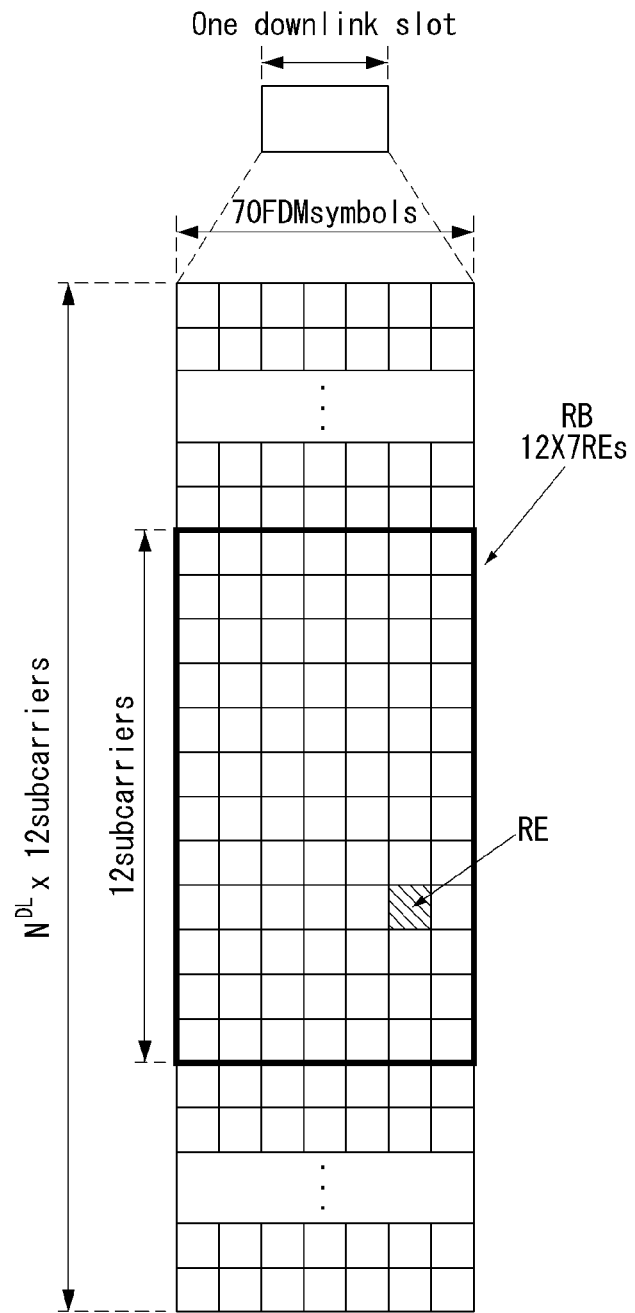
[FIG. 2]

[FIG. 3]
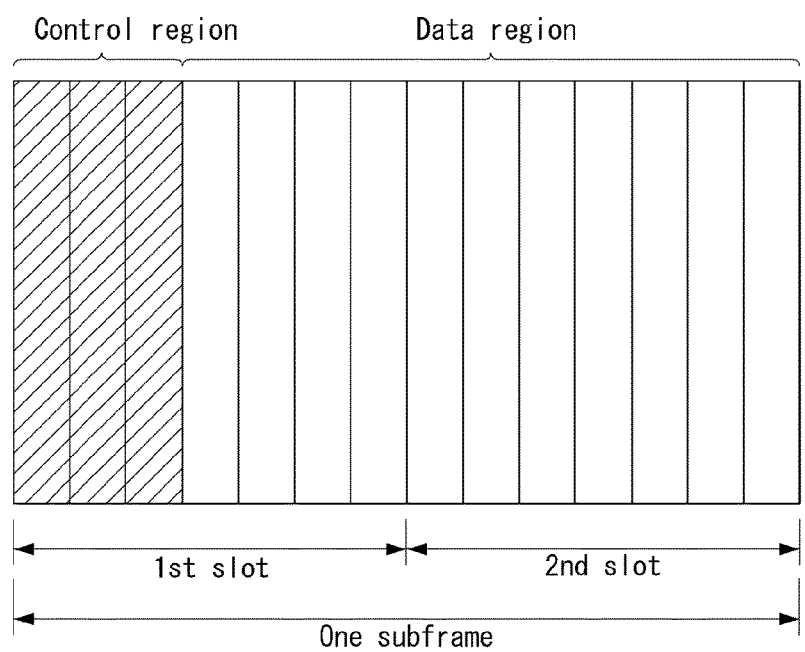
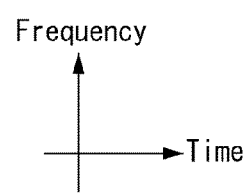

[FIG. 4]
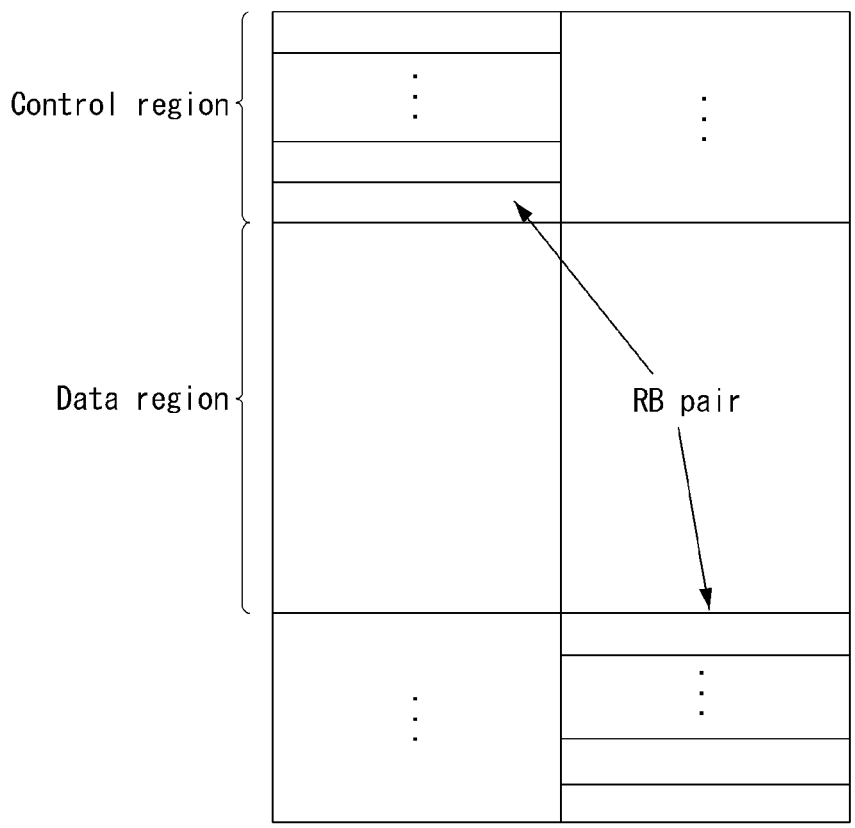

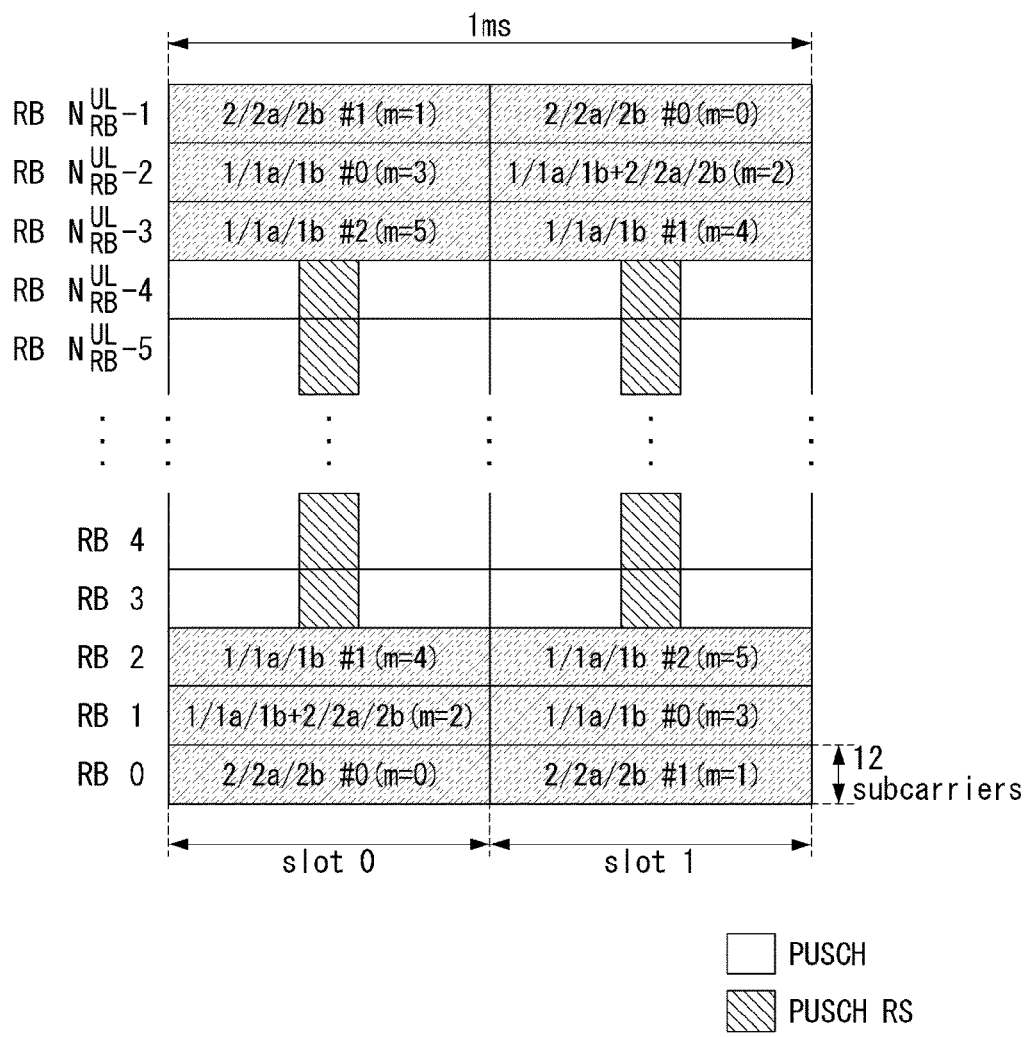
[FIG. 5]

[FIG. 6]
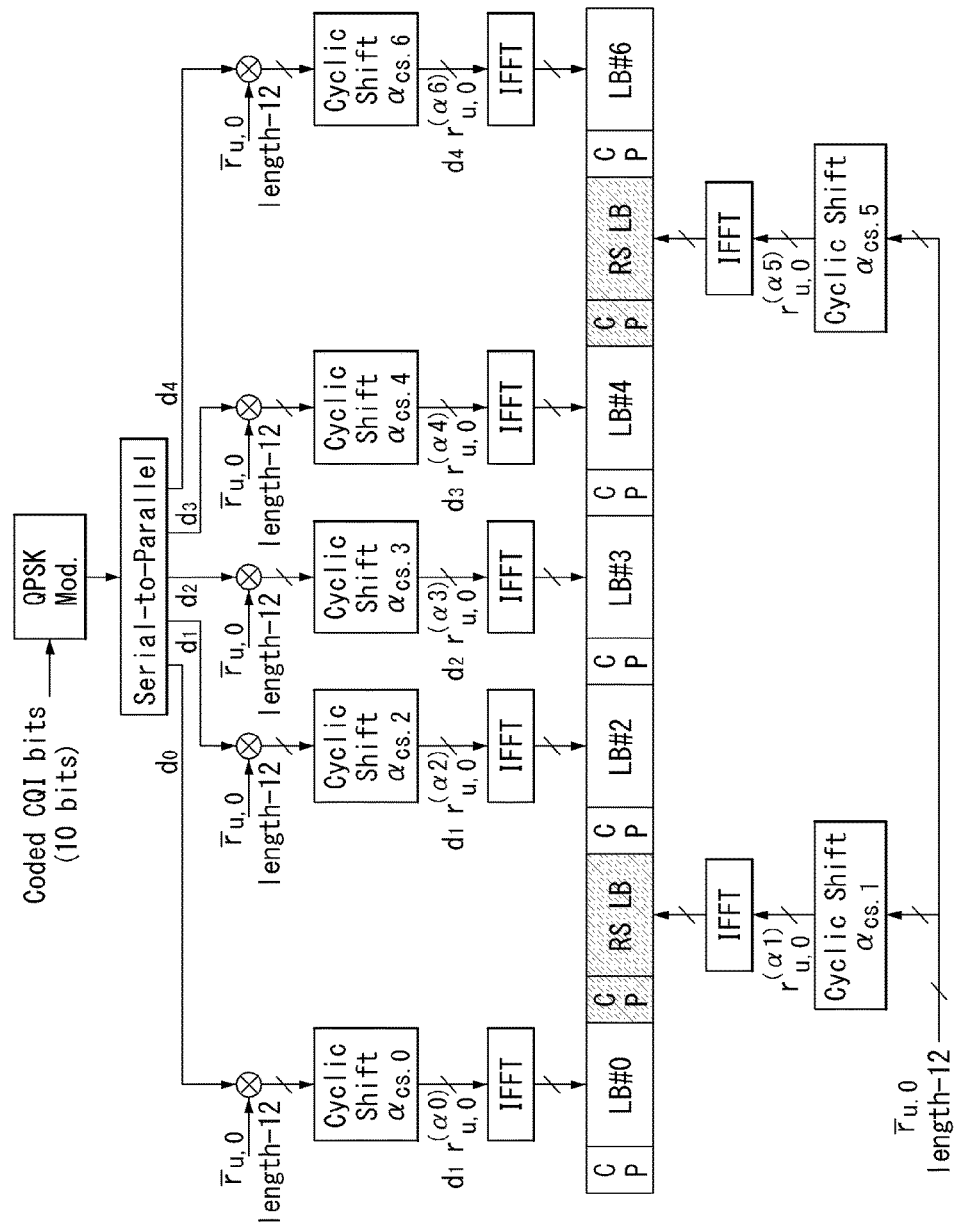

[FIG. 7]
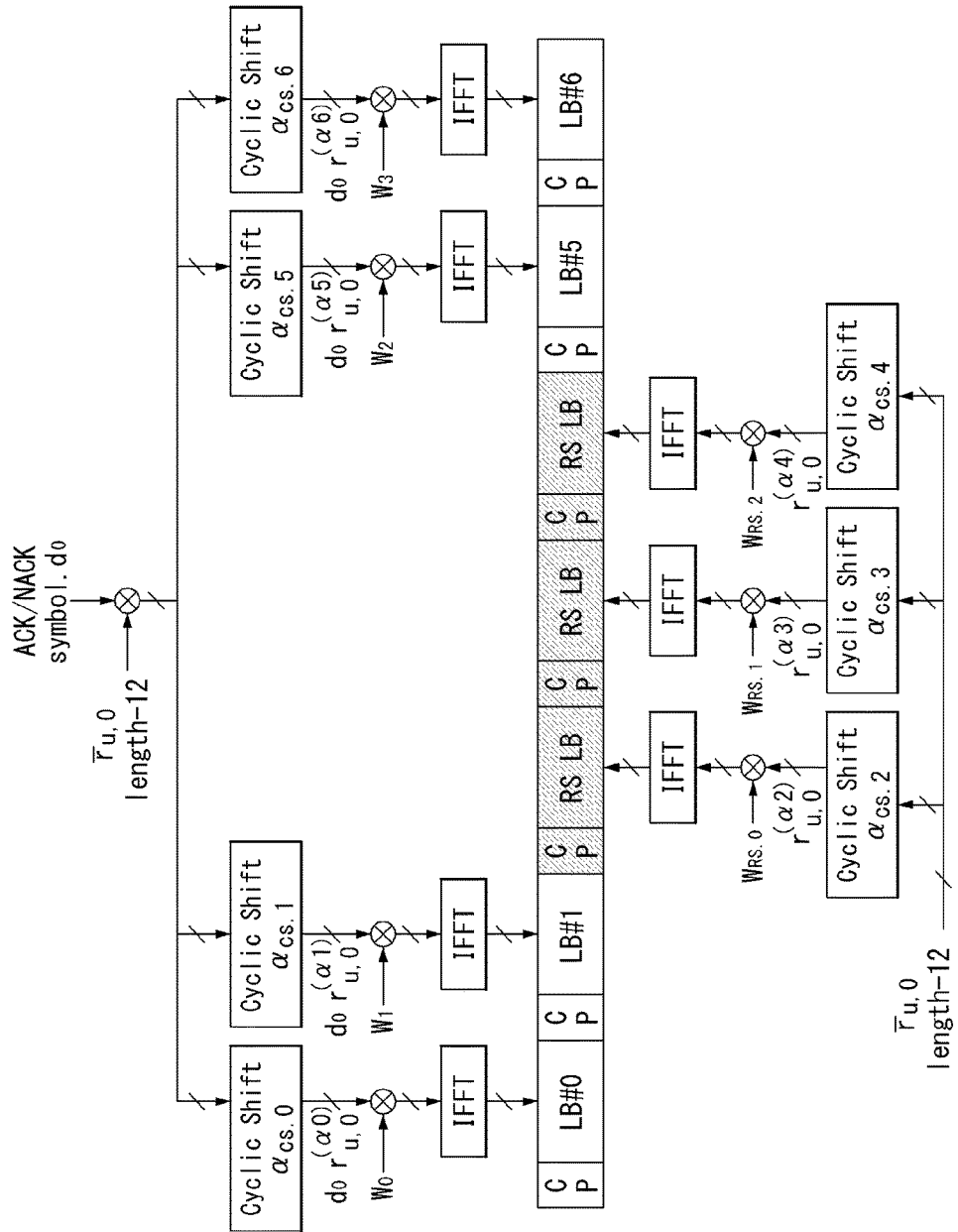

[FIG. 8]
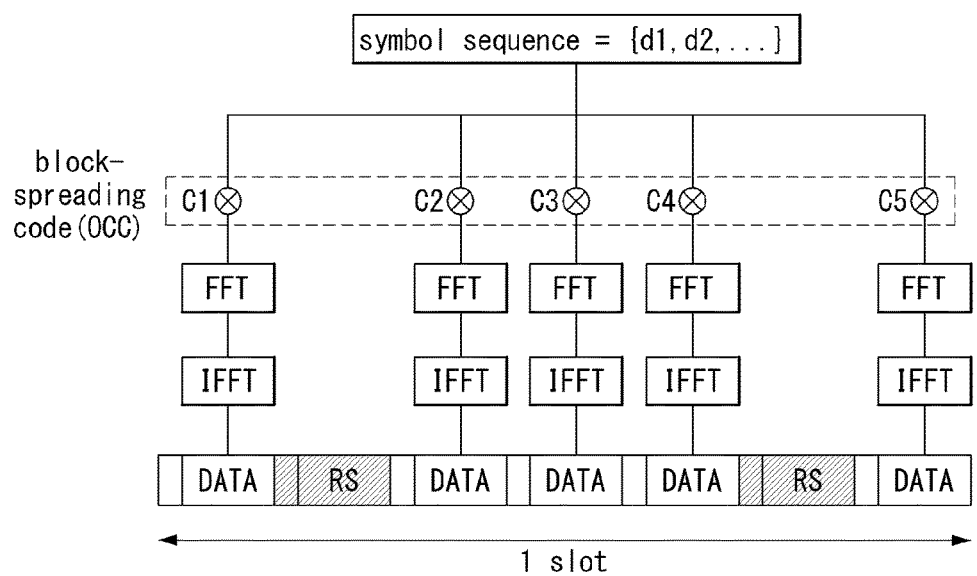

[FIG. 9]
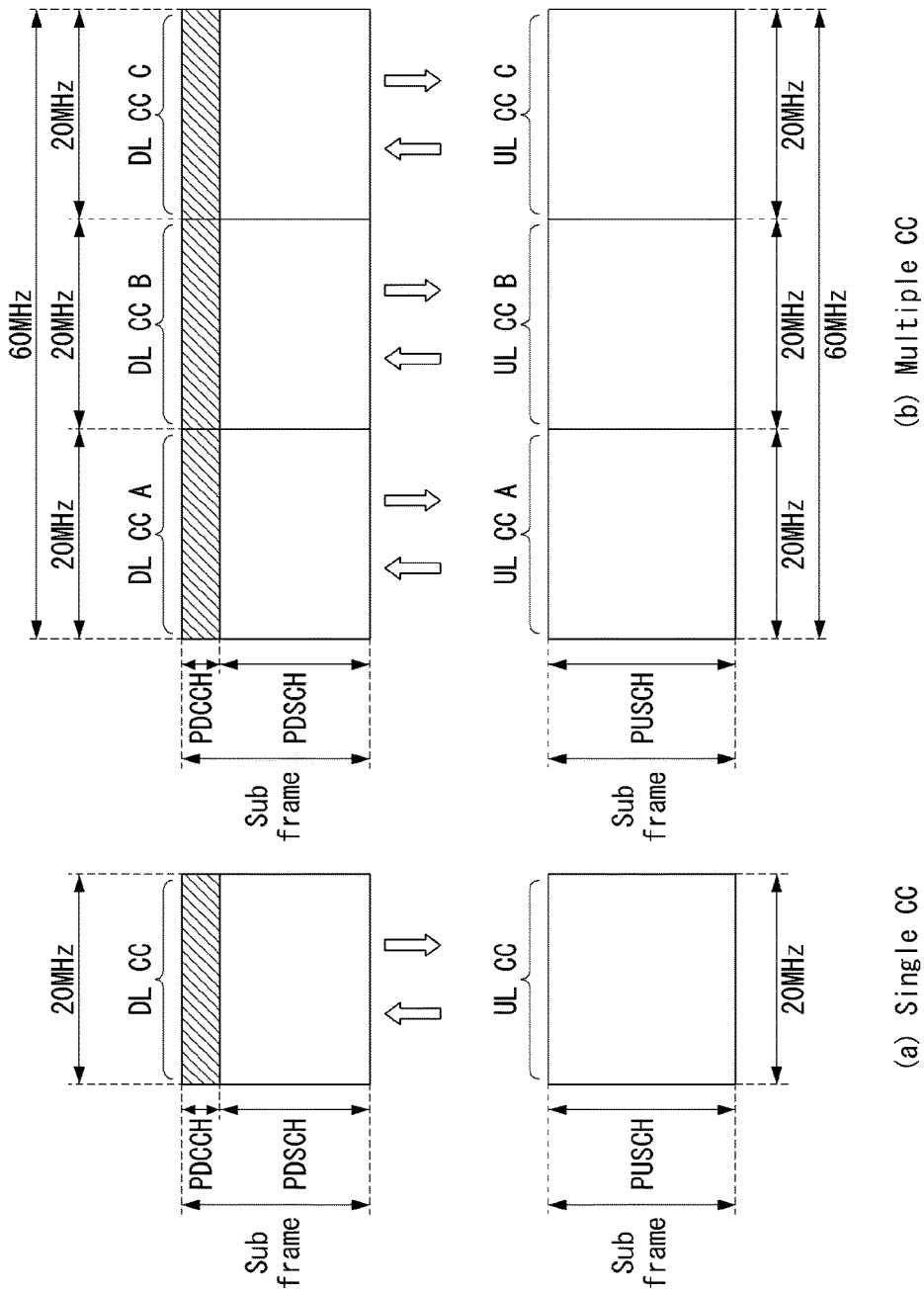

【FIG. 10】
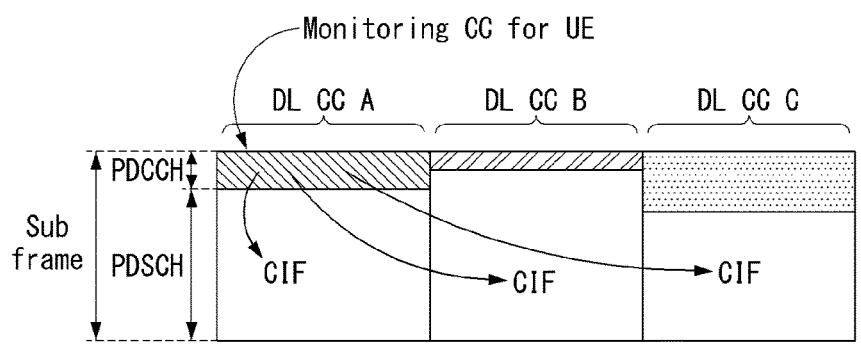
【FIG. 11】
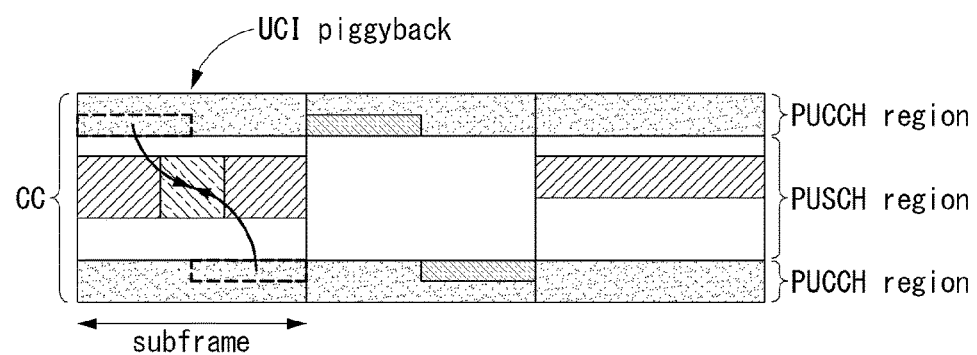

[FIG. 12]
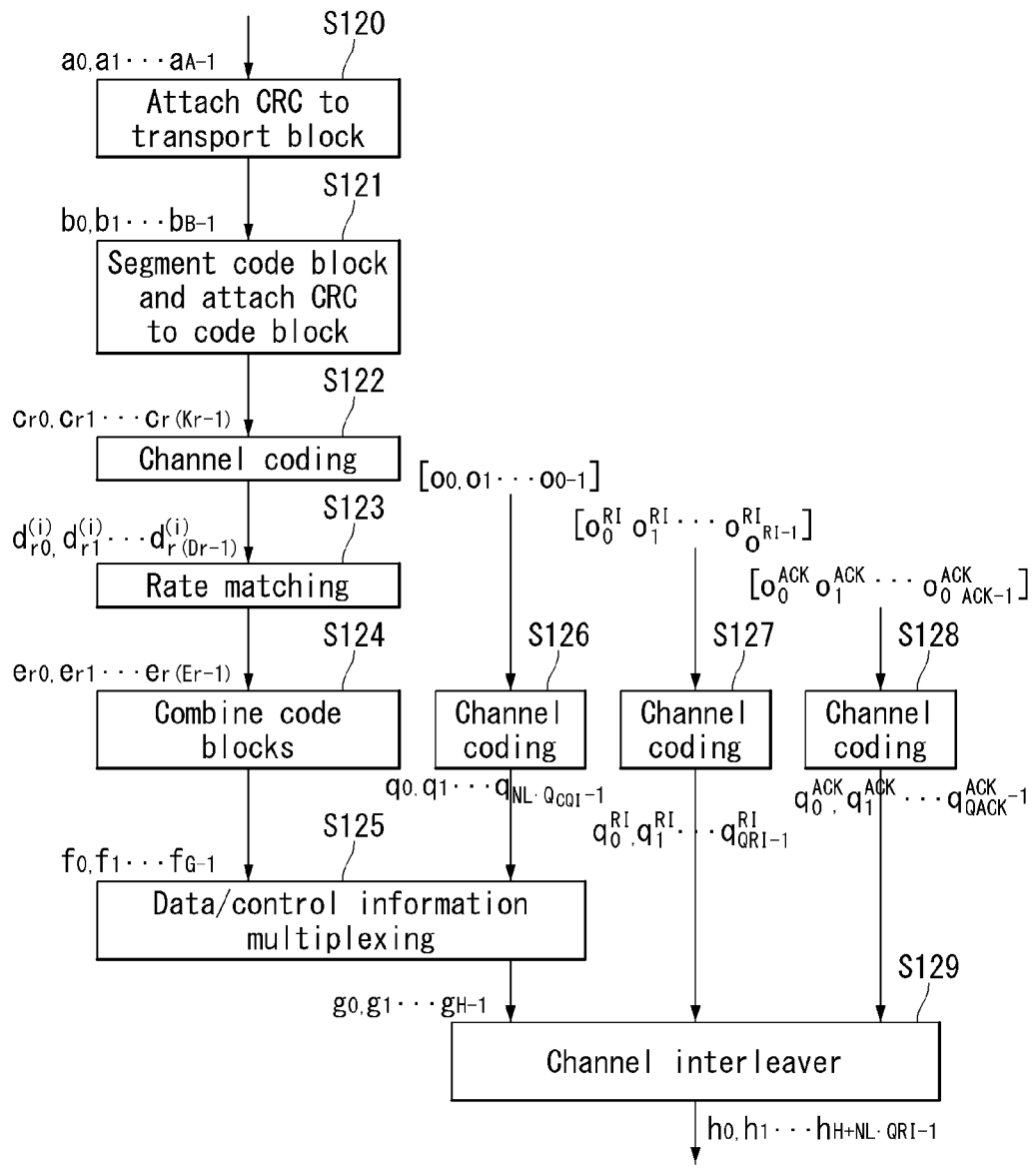

[FIG. 13]
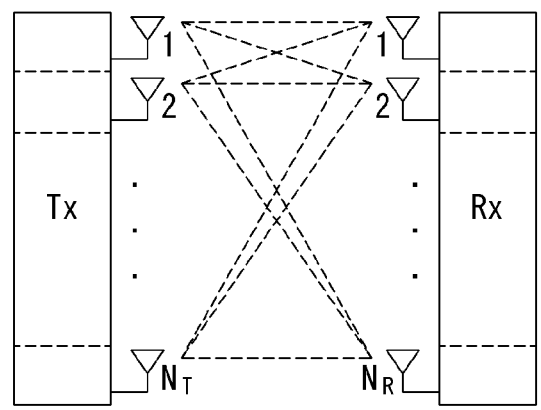
[FIG. 14]
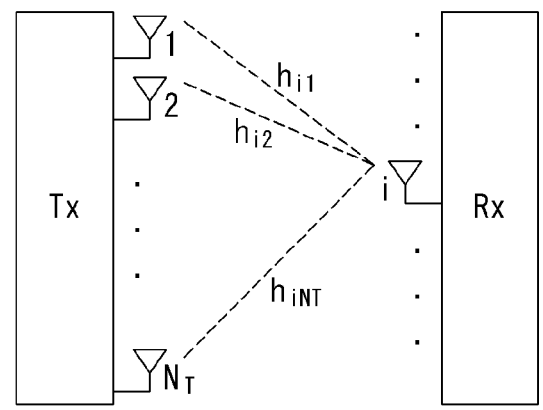

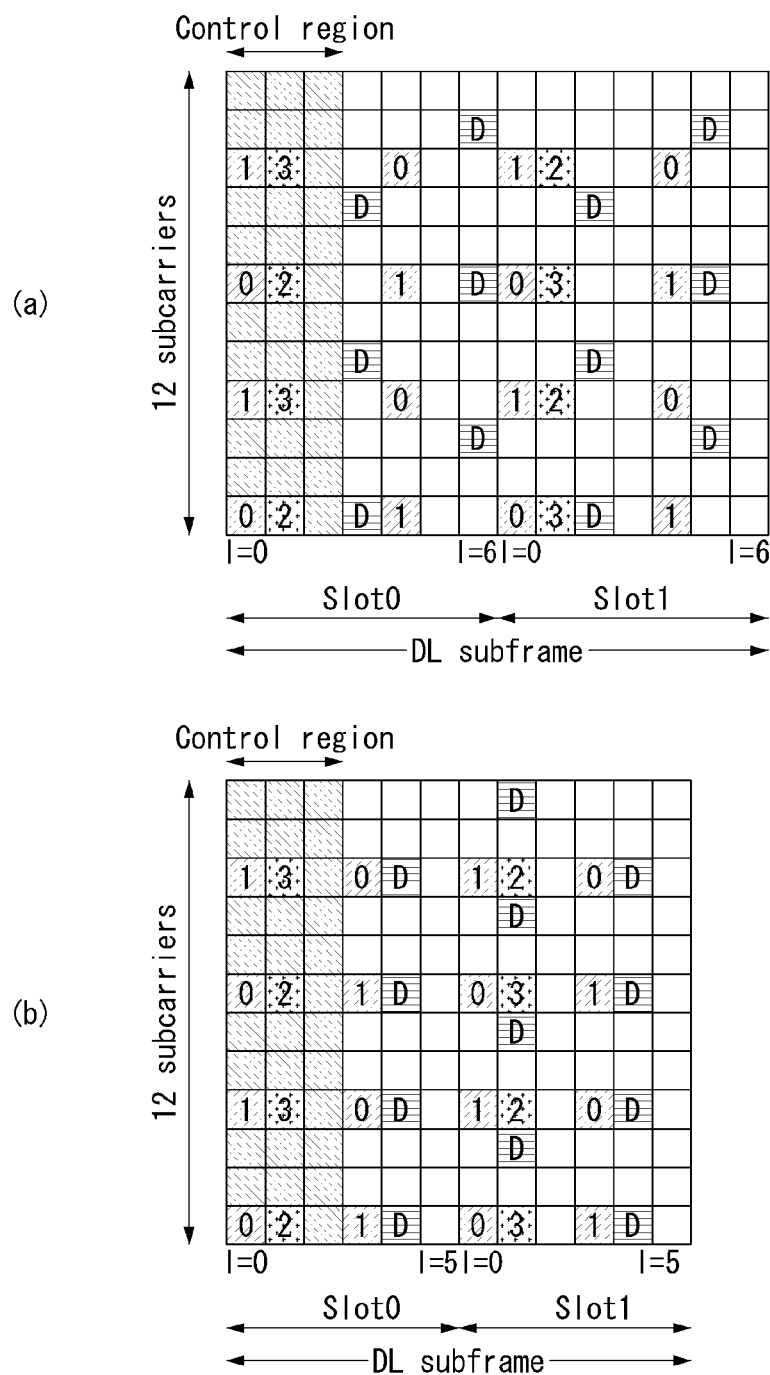
[FIG. 15]

[FIG. 16]
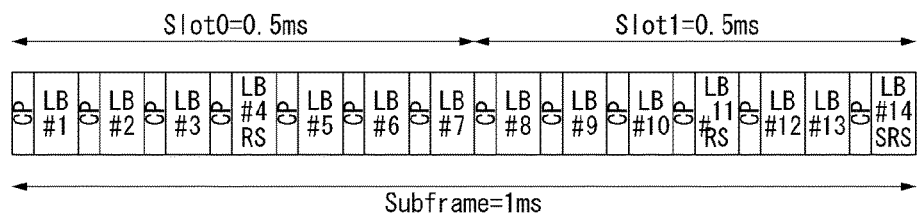
[FIG. 17]
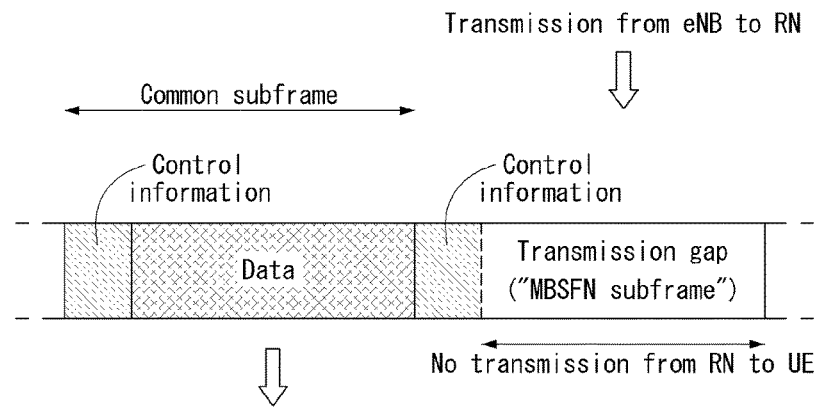
[FIG. 18]
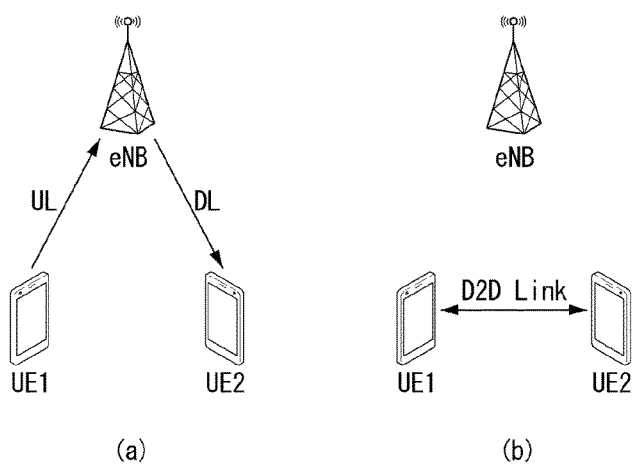

[FIG. 19]
(a) 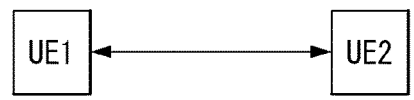
(b) 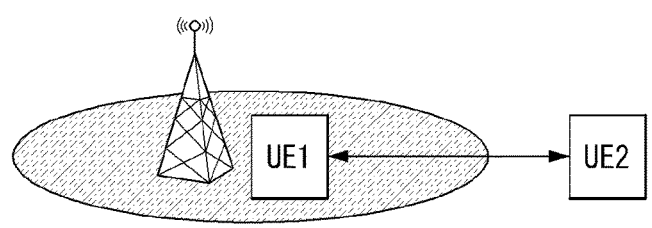
(c) 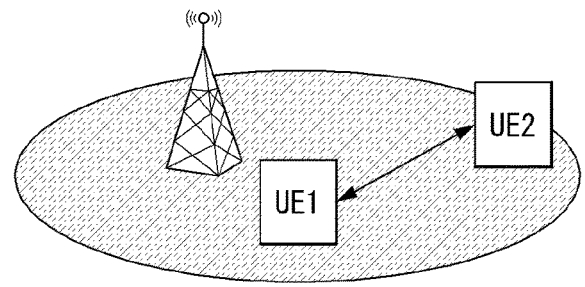
(d) 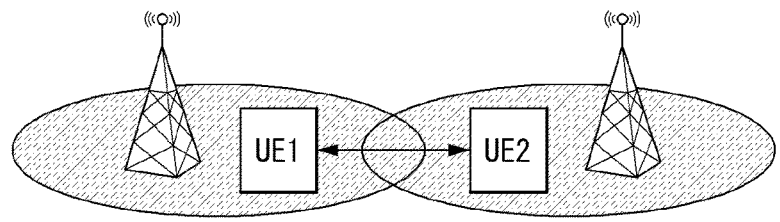

[FIG. 20]
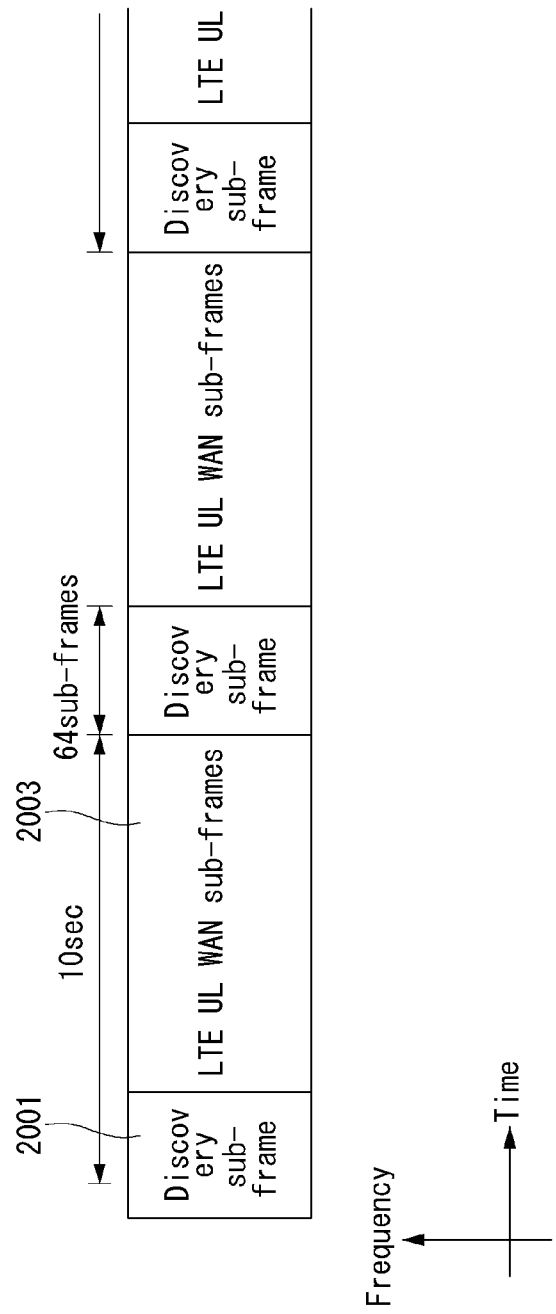

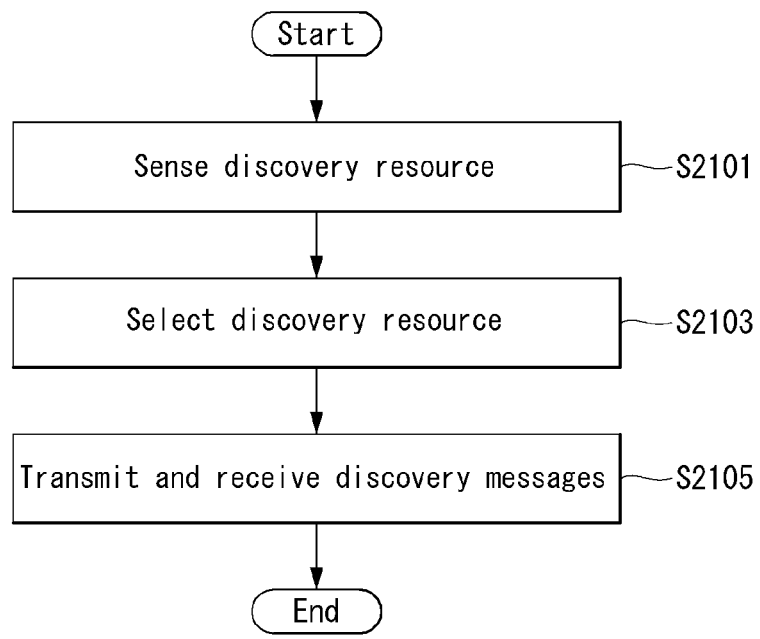
[FIG. 21]

【FIG. 22】
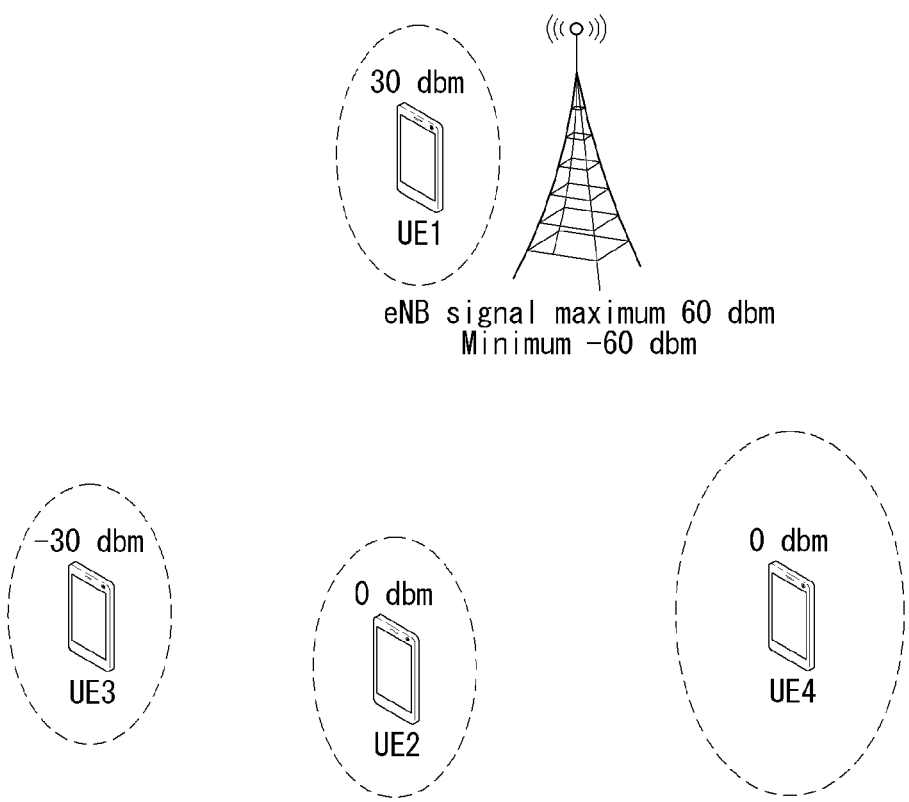

[FIG. 23]
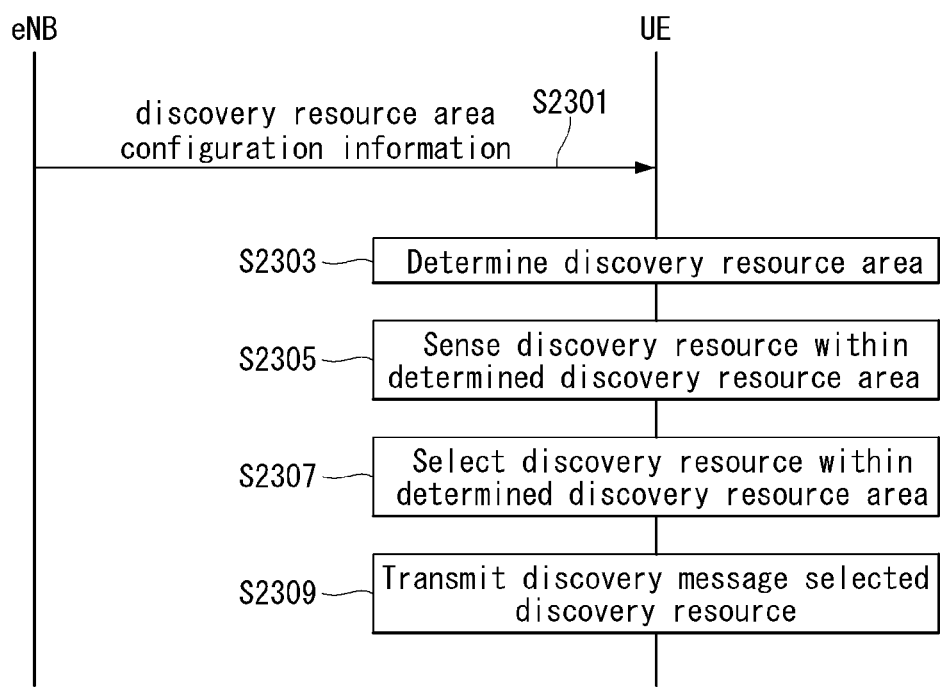

[FIG. 24]
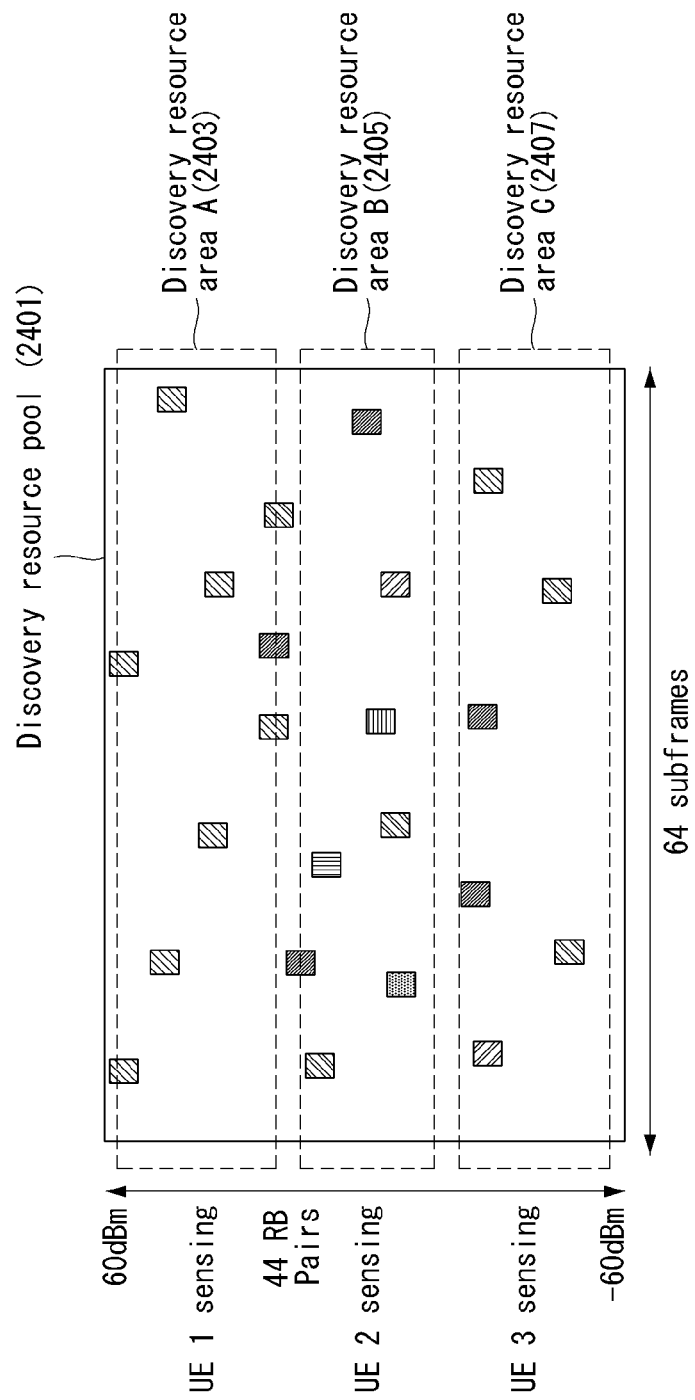

[FIG. 25]
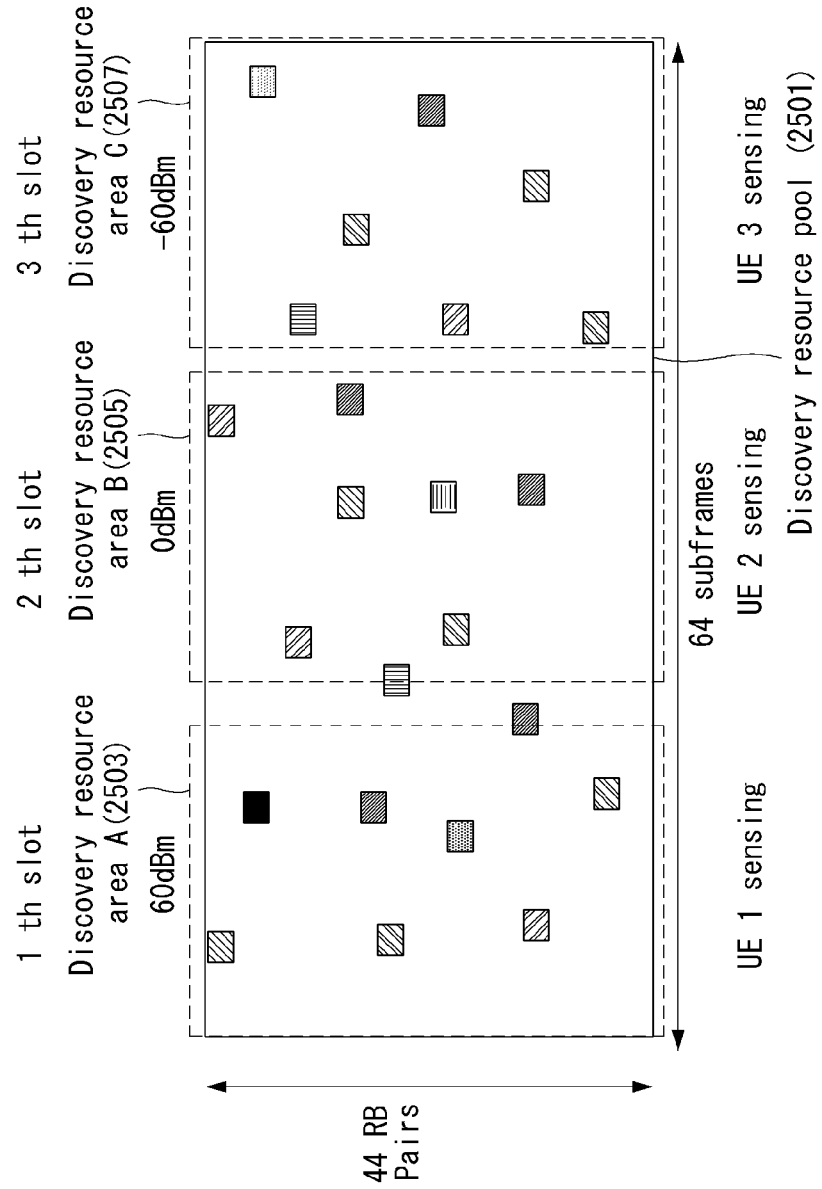

【FIG. 26】
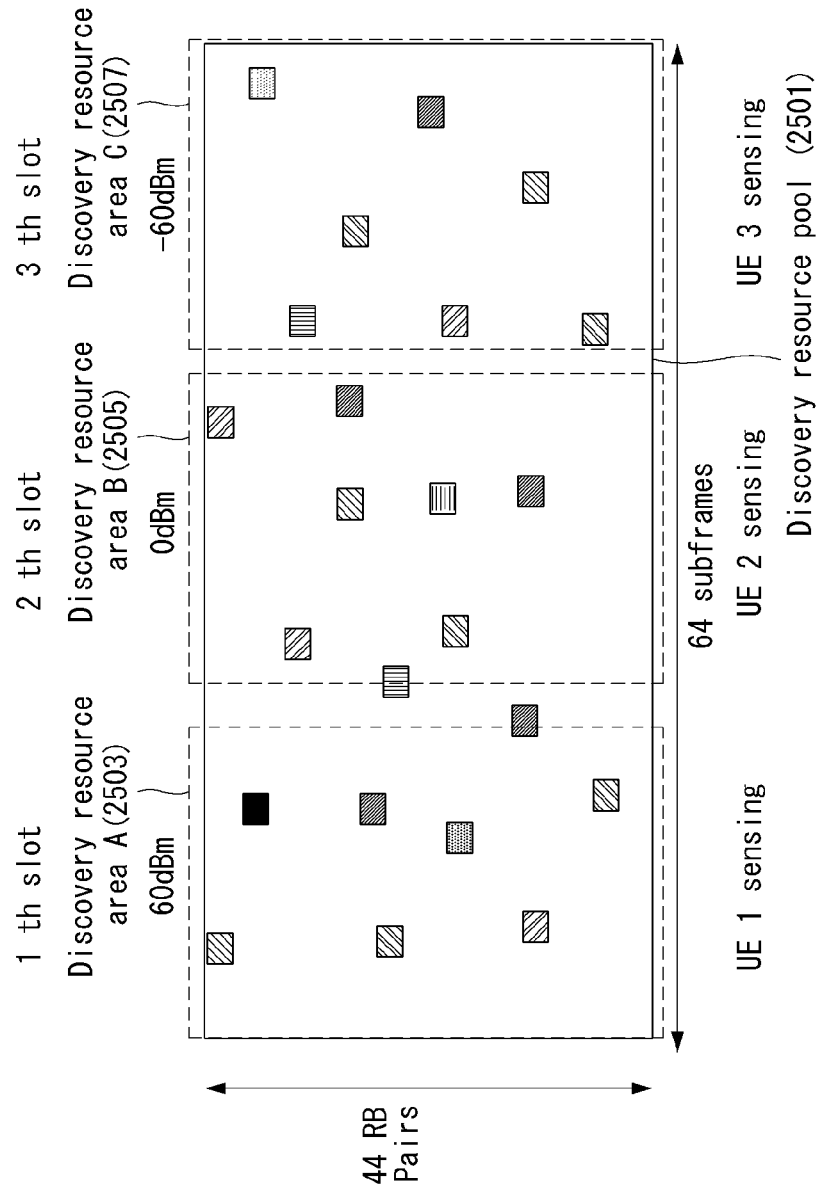

【FIG. 27】
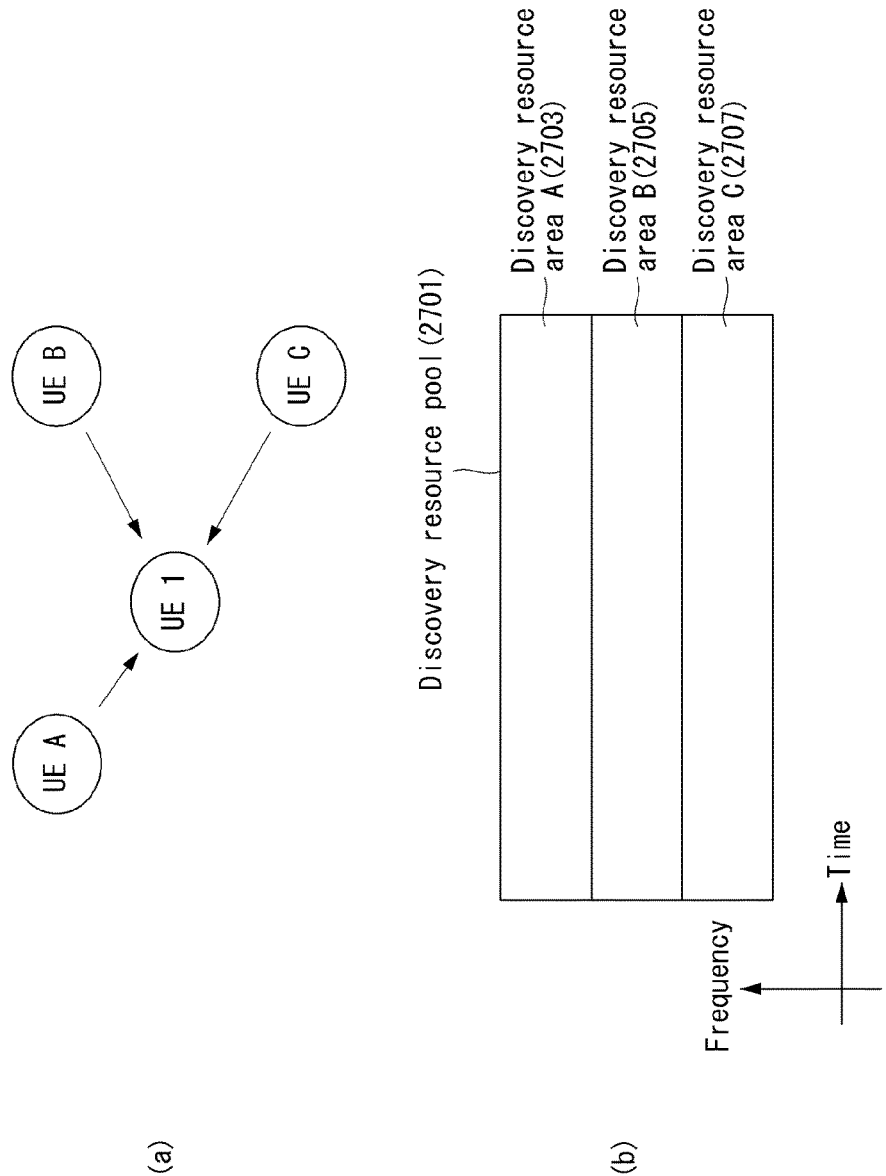

[FIG. 28]
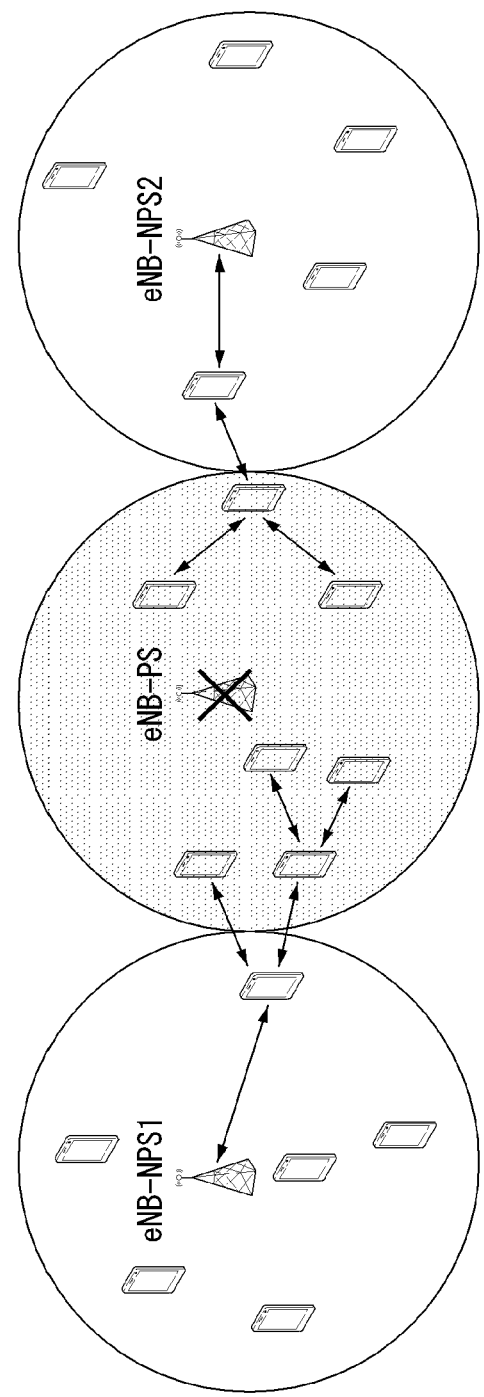

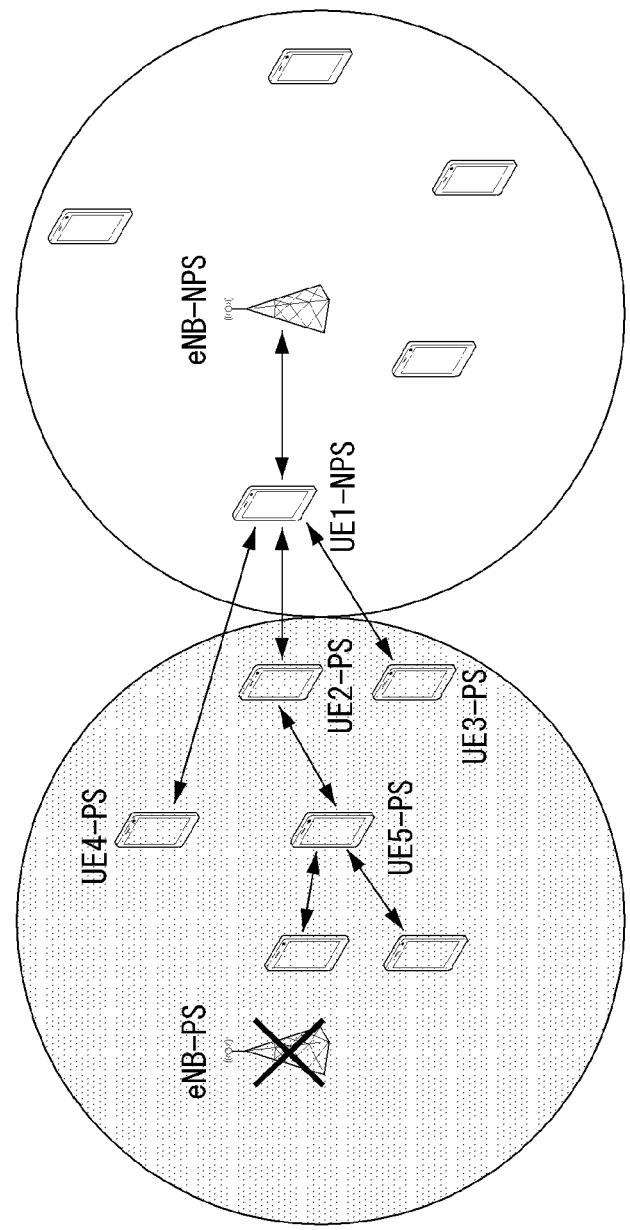
【FIG. 29】

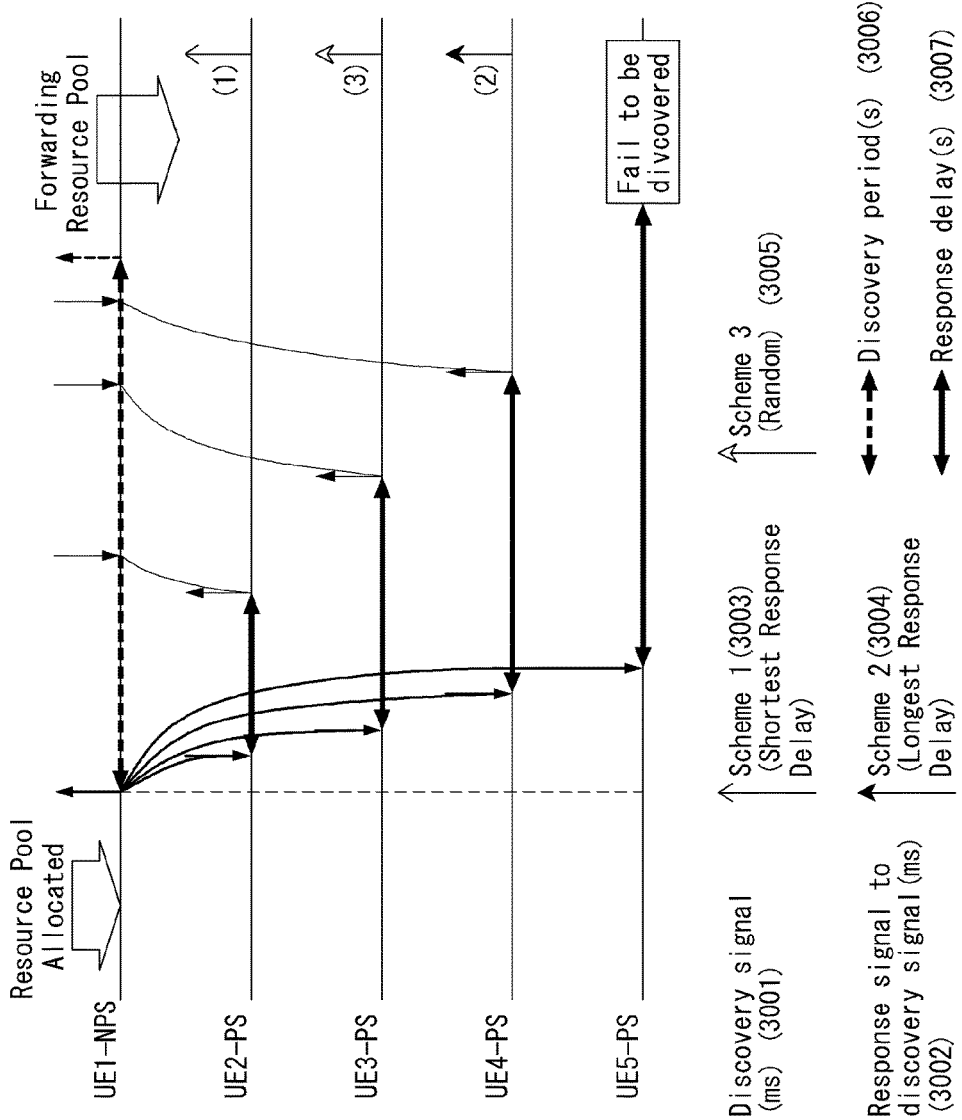
[FIG. 30]

[FIG. 31]
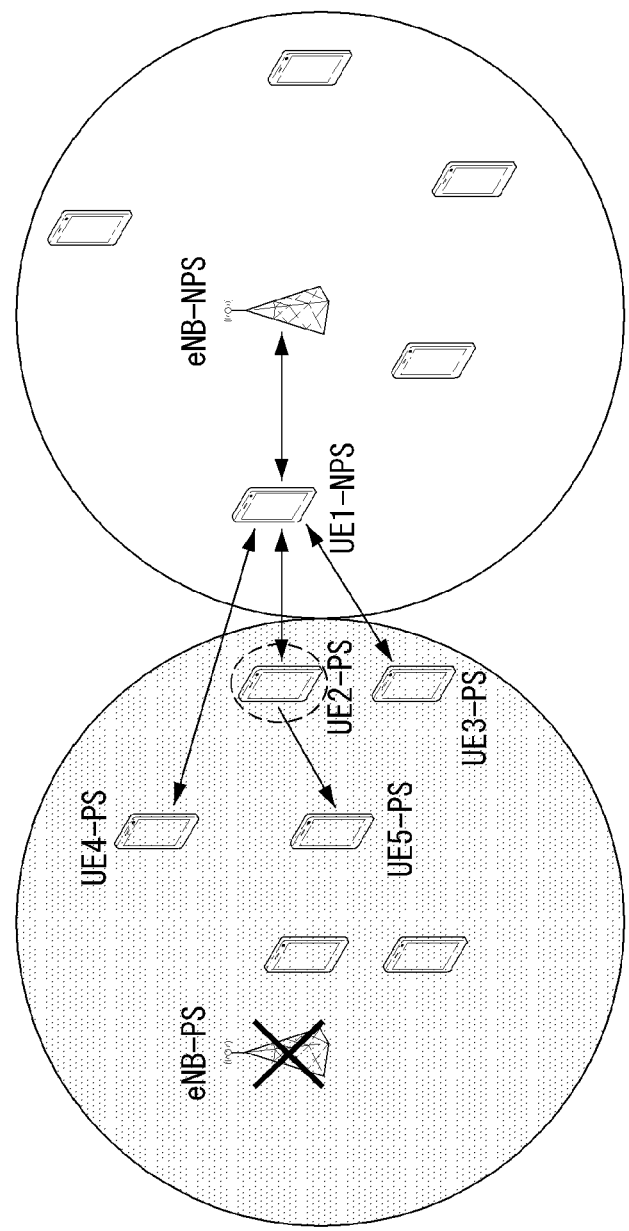

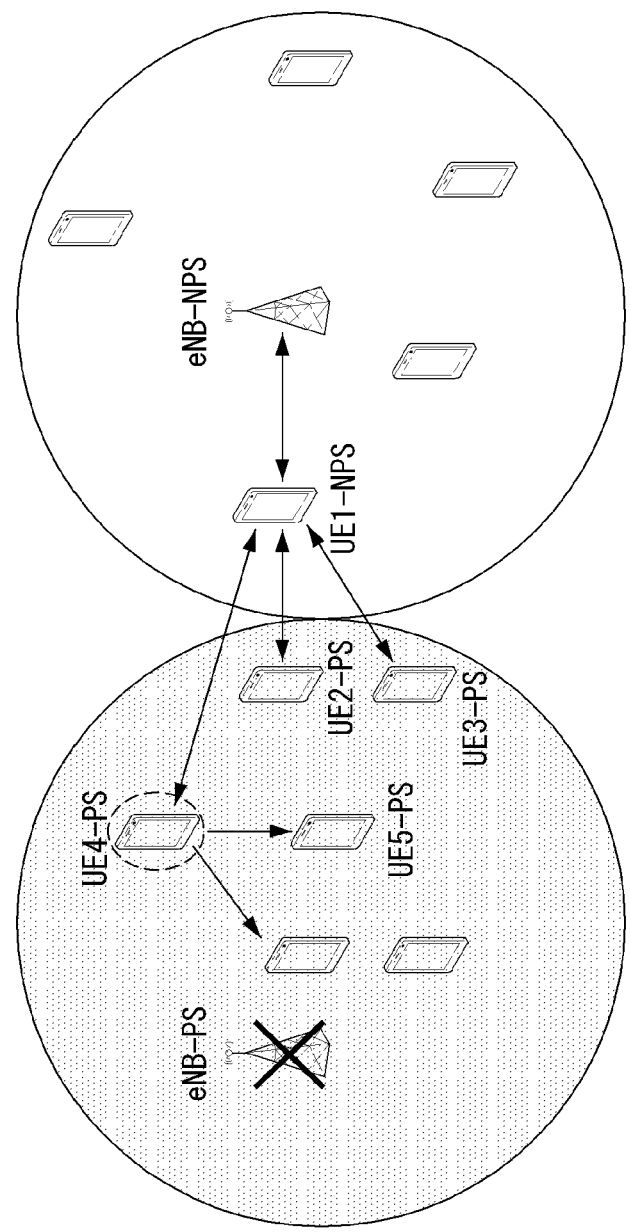
[FIG. 32]

[FIG. 33]
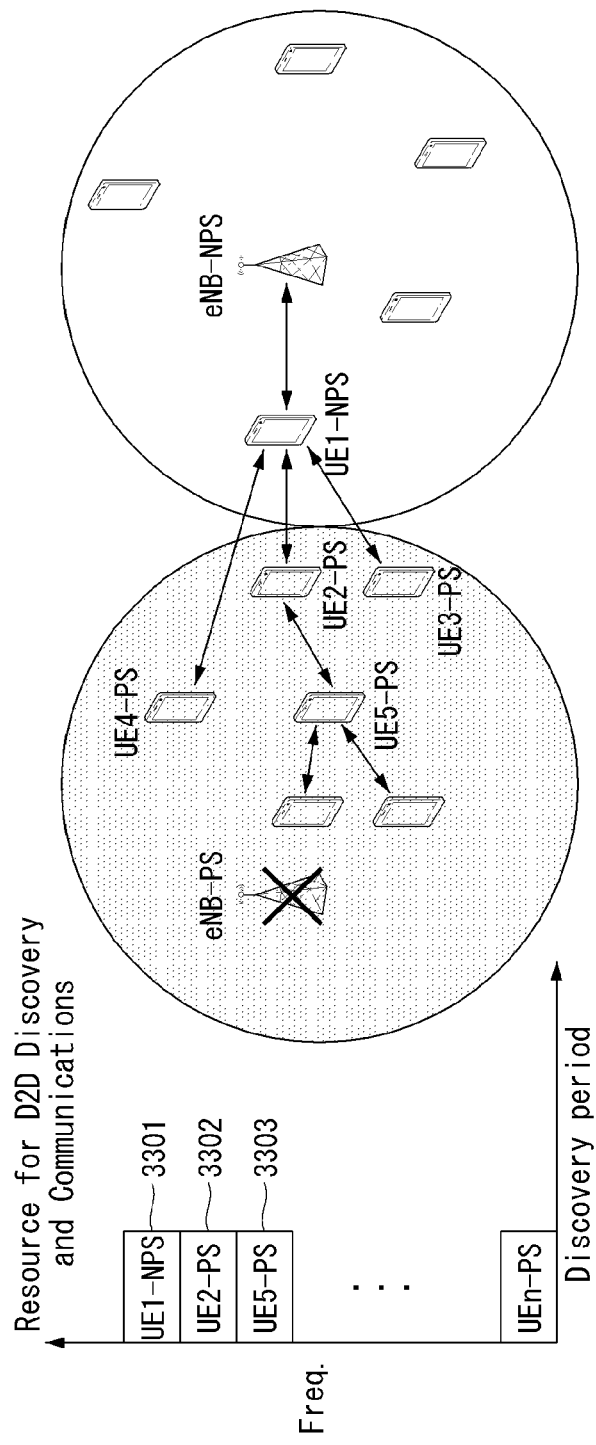

[FIG. 34]
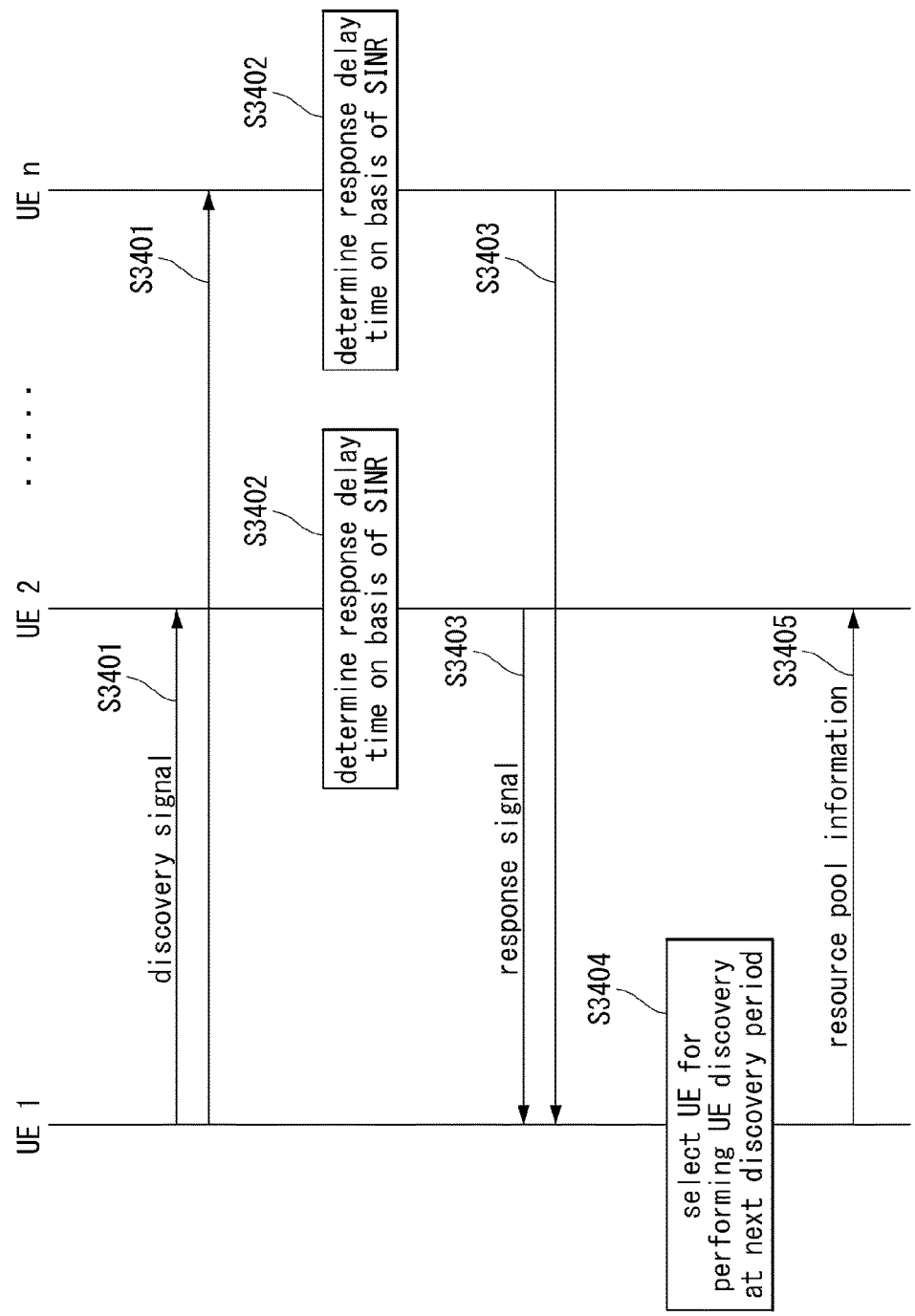

[FIG. 35]
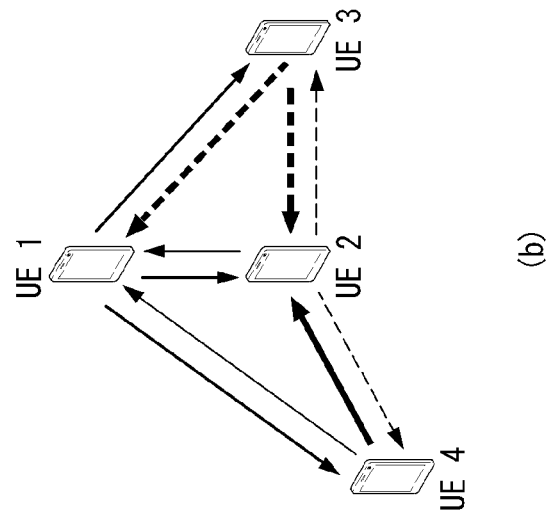
(b)
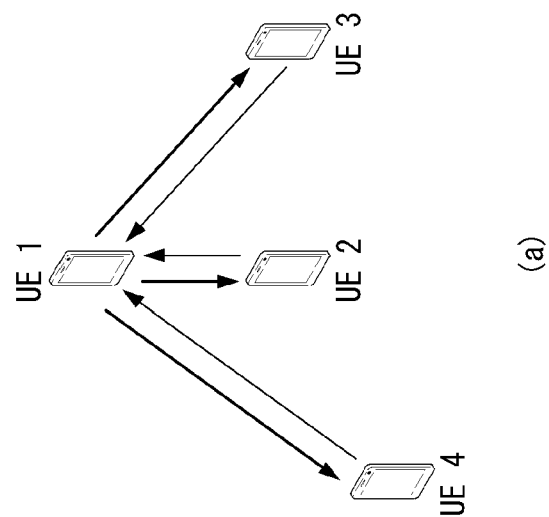
(a)

【FIG. 36】
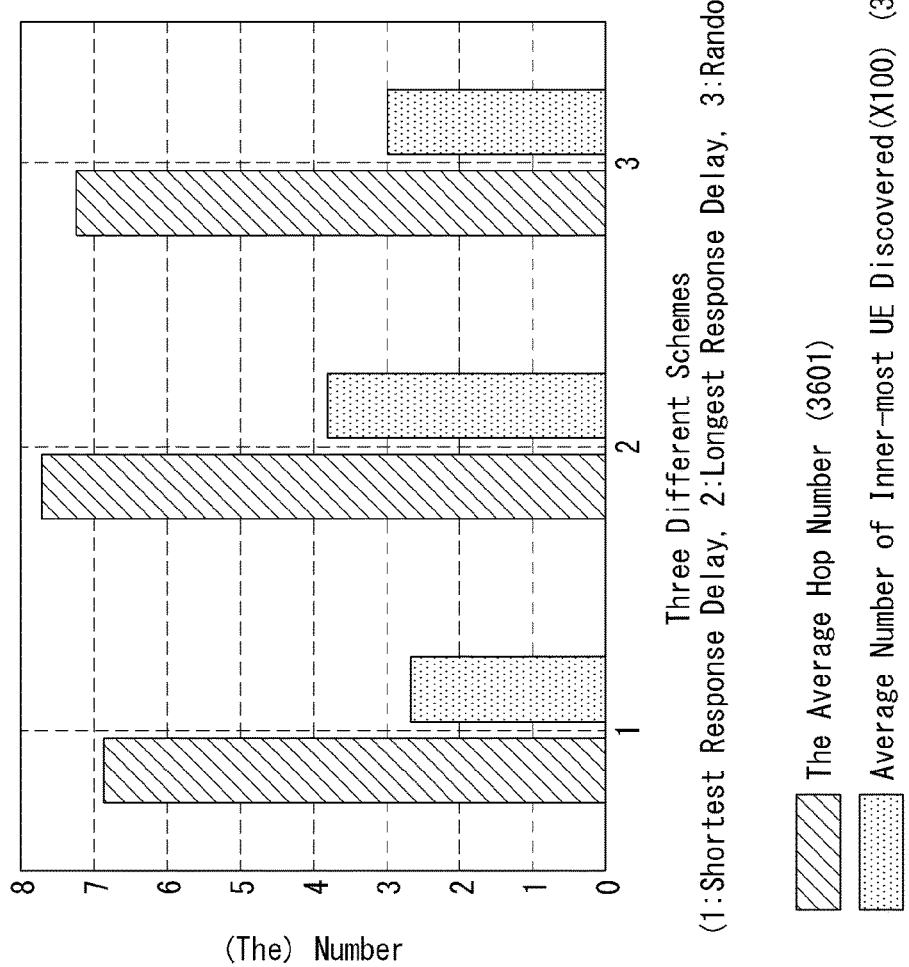

[FIG. 37]
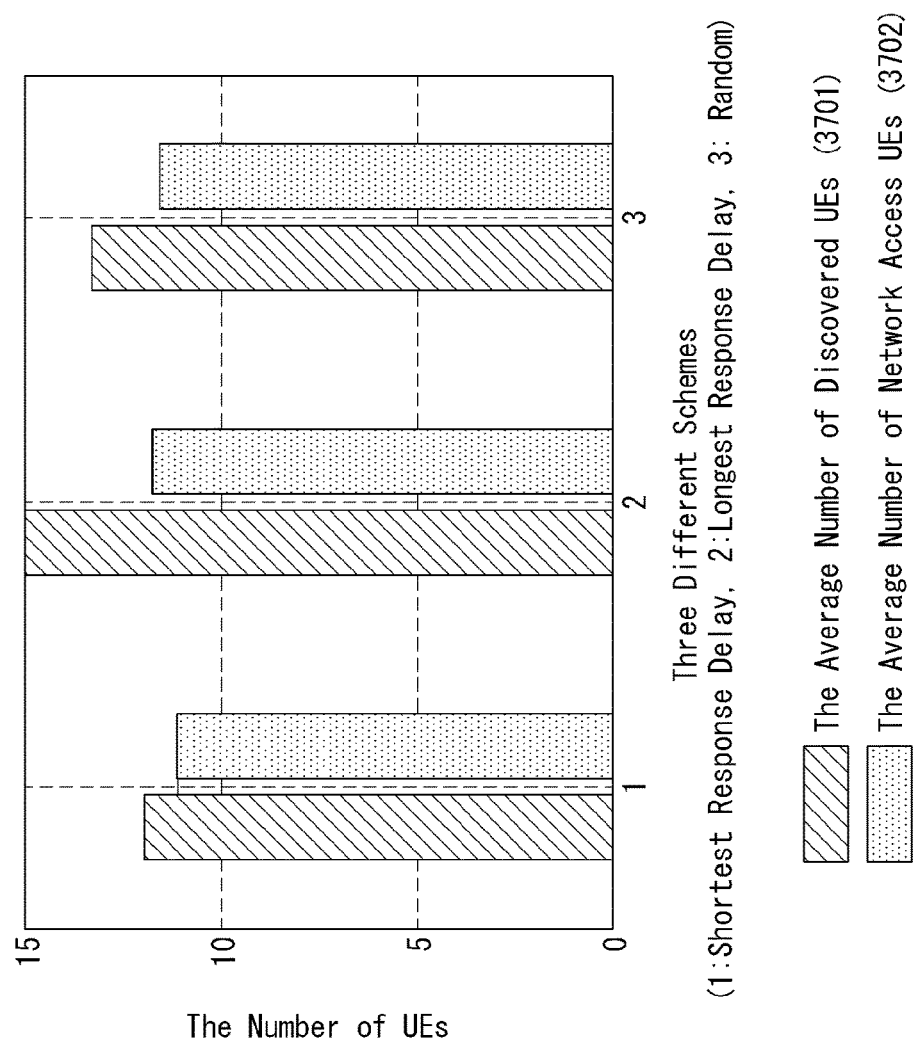

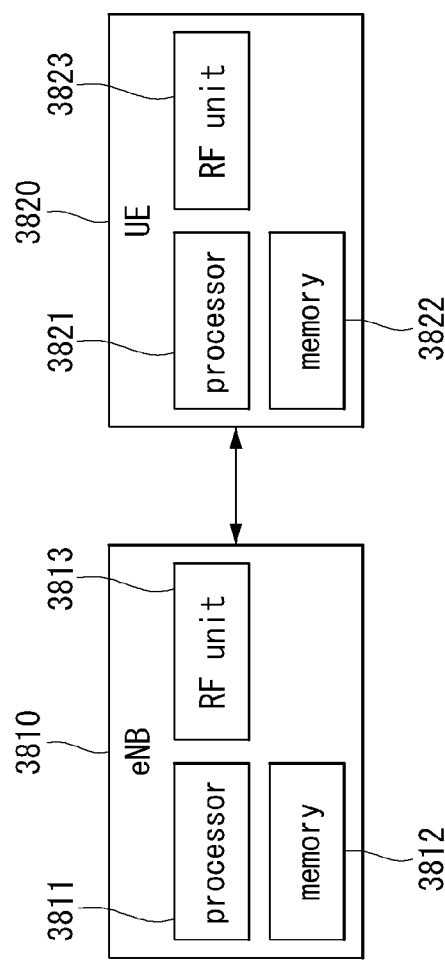
[FIG. 38]

US 10,182,335 B2

METHOD FOR DISCOVERING DEVICE IN WIRELESS COMMUNICATION SYSTEM SUPPORTING DEVICE-TO-DEVICE COMMUNICATION AND APPARATUS FOR SAME

CROSS-REFERENCE TO RELATED APPLICATIONS

This application is the National Stage filing under 35 U.S.C. 371 of International Application No. PCT/KR2015/002086, filed on Mar. 4, 2015, which claims the benefit of U.S. Provisional Application Nos. 61/947,975, filed on Mar. 4, 2014, and 62/056,622, filed on Sep. 29, 2014, the contents of which are all hereby incorporated by reference herein in their entirety.

TECHNICAL FIELD

The present invention relates to a wireless communication system and, more particularly, to a response delay-based terminal discovery method in a wireless communication system supporting device-to-device (D2D) communication, and a device supporting the same

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

In the present invention, in a state in which the entirety or a portion of a communication infrastructure may not be used in a disaster situation, terminals in a disaster area may attempt at searching for a neighbor base station and accessing or a terminal not able to search for a neighbor base station may be connected to an infrastructure network through hopping using a relay function of a neighbor terminal. Here, indiscriminate signal transmissions may be made, leading to resource conflict between D2D terminals or between cellular resources and an ineffective use of resource.

Therefore, an object of the present invention is to provide a method for effectively searching for a neighbor terminal on the basis of response delay, while minimizing resource conflict.

Technical subjects of the present invention that may be obtained in the present invention are not limited to the foregoing technical subjects and any other technical subjects not mentioned herein may be easily understood by a person skilled in the art from the present disclosure and accompanying drawings.

Technical Solution

According to an aspect of the present invention, there is provided a method for discovering a terminal in a wireless communication system supporting device-to-device (D2D) communication, including: transmitting, by a terminal, a discovery signal; and receiving, by the terminal, a response signal as a response with respect to the discovery signal from a different terminal, wherein the response signal is transmitted by the different terminal when a response delay time determined on the basis of a reception signal-to-interference noise ratio (SINR) terminates.

According to another aspect of the present invention, there is provided a terminal for discovering a terminal in a wireless communication system supporting device-to-device (D2D) communication, including: a radio frequency (RF) unit transmitting and receiving a wireless signal; and a processor, wherein the processor is configured to transmit a discovery signal and receive a response signal as a response with respect to the discovery signal from a different terminal, and the response signal is transmitted by the different terminal when a response delay time determined on the basis of a reception signal-to-interference noise ratio (SINR) terminates.

Preferably, the response delay time may be determined to be in inverse proportion to the reception SINR.

Preferably, the method may further include: selecting, by the terminal, a terminal for performing a terminal discovery process at a next discovery period, from among terminals which have transmitted the response signal; and transmitting, by the terminal, information of a resource pool for transmission of a discovery message to the selected terminal.

Preferably, the terminal for performing the terminal discovery process at the next discovery period may be selected as a terminal which has first transmitted the response signal.

Preferably, the terminal for performing the terminal discovery process at the next discovery period may be selected as a terminal which has transmitted the response signal the latest.

Preferably, the terminal for performing the terminal discovery process at the next discovery period may be selected randomly.

Preferably, the discovery signal may include a terminal identifier and/or discovery period information.

Preferably, the method may further include: after transmitting the discovery signal, switching the terminal to a reception mode.

According to another aspect of the present invention, there is provided a method for discovering a terminal in a wireless communication system supporting device-to-device (D2D) communication, including: receiving, by a terminal, a discovery signal; determining, by the terminal, a response delay time on the basis of a reception signal-to-interference noise ratio (SINR); and transmitting, by the terminal, a response signal as a response with respect to the discovery signal when the response delay time terminates.

According to another aspect of the present invention, there is provided a terminal for discovering a terminal in a wireless communication system supporting device-to-device (D2D) communication, including: a radio frequency (RF) unit transmitting and receiving a wireless signal; and a processor, wherein the processor is configured to receive a discovery signal, determine a response delay time on the basis of a reception signal-to-interference noise ratio (SINR), and transmit a response signal as a response with respect to the discovery signal when the response delay time terminates.

Preferably, the response delay time may be determined to be in inverse proportion to the reception SINR.

Preferably, the reception SINR may be derived on the basis of the discovery signal or a reference signal transmitted from the terminal which has transmitted the discovery signal.

Advantageous Effects

According to embodiments of the present invention, since a D2D signal is transmitted on the basis of response delay in a wireless communication system supporting D2D communication, a neighbor terminal may be effectively searched, while minimizing resource conflict between D2D terminals or between cellular resources.

Advantages and effects of the present invention that may be obtained in the present invention are not limited to the foregoing effects and any other technical effects not mentioned herein may be easily understood by a person skilled in the art from the present disclosure and accompanying drawings.

DESCRIPTION OF DRAWINGS

The above and/or other aspects of the present invention will be more apparent by describing certain exemplary embodiments of the present invention with reference to the accompanying drawings, in which:

FIG. 1 is a view illustrating a structure of a wireless frame in a wireless communication system to which the present invention may be applied.

FIG. 2 is a view illustrating a resource grid of a downlink slot in a wireless communication system to which the present invention may be applied.

FIG. 3 is a view illustrating a structure of a downlink subframe in a wireless communication system to which the present invention may be applied.

FIG. 4 is a view illustrating a structure of an uplink subframe in a wireless communication system to which the present invention may be applied.

FIG. 5 is a view illustrating an example in which PUCCH formats are mapped to PUCCH regions of uplink physical resource blocks in a wireless communication system to which the present invention may be applied.

FIG. 6 is a view illustrating a structure of a CQI channel in case of a general CP in a wireless communication system to which the present invention may be applied.

FIG. 7 is a view illustrating a structure of an ACK/NACK channel in case of general CP in a wireless communication system to which the present invention may be applied.

FIG. 8 is a view illustrating an example in which five SC-FDMA symbols are generated and transmitted during a single symbol in a wireless communication system to which the present invention may be applied.

FIG. 9 is a view illustrating an example in which a component carrier and a carrier are merged in a wireless communication system to which the present invention may be applied.

FIG. 10 is a view illustrating an example of a structure of a subframe in accordance with cross carrier scheduling in a wireless communication system to which the present invention may be applied.

FIG. 11 is a view illustrating an example of processing a transport channel of a UL-SCH in a wireless communication system to which the present invention may be applied.

FIG. 12 is a view illustrating an example of processing a signal of an uplink shared channel, a transport channel, in a wireless communication system to which the present invention may be applied.

FIG. 13 is a view illustrating a configuration of a general multi-input multi-output (MIMO) communication system.

FIG. 14 is a view illustrating a channel from a plurality of transmission antennas to a single reception antenna.

FIG. 15 is a view illustrating a pattern of reference signals mapped to downlink resource block pairs in a wireless communication system to which the present invention may be applied.

FIG. 16 is a view illustrating an uplink subframe including a sounding reference signal symbol in a wireless communication system to which the present invention may be applied.

FIG. 17 is a view illustrating dividing resource of a relay node in a wireless communication system to which the present invention may be applied.

FIG. 18 is a view conceptually illustrating D2D communication in a wireless communication system to which the present invention may be applied.

FIG. 19 is a view illustrating examples of various scenarios of D2D communication to which a method proposed in the present disclosure is applicable.

FIG. 20 is a view illustrating an example of allocating discovery resource according to an embodiment of the present invention.

FIG. 21 is a view briefly illustrating a discovery process according to an embodiment of the present invention.

FIG. 22 is a view illustrating terminals receiving a reference signal according to an embodiment of the present invention.

FIG. 23 is a view illustrating a method for transmitting a D2D discovery message according to an embodiment of the present invention.

FIG. 24 is a view illustrating an example of dividing and setting discovery resource regions according to an embodiment of the present invention.

FIG. 25 is a view illustrating an example of dividing and setting discovery resource regions according to an embodiment of the present invention.

FIG. 26 is a view illustrating an example of dividing and setting discovery resource regions according to an embodiment of the present invention.

FIG. 27 is a view illustrating a scheme of determining discovery resource regions on the basis of a signal transmitted from a UE according to an embodiment of the present invention.

FIG. 28 is a view illustrating a situation in which UEs in a disaster area access an infrastructure network according to an embodiment of the present invention.

FIG. 29 is a view illustrating a UE discovery method according to an embodiment of the present invention.

FIG. 30 is a view illustrating a D2D UE discovery method according to an embodiment of the present invention.

FIG. 31 is a view illustrating a UE discovery method according to an embodiment of the present invention.

FIG. 32 is a view illustrating a UE discovery method according to an embodiment of the present invention.

FIG. 33 is a view illustrating a method for allocating resource simultaneously with UE discovery according to an embodiment of the present invention.

FIG. 34 is a view illustrating a UE discovery method according to an embodiment of the present invention.

FIG. 35 is a view illustrating a difference between an existing UE discovery method and a UE discovery method proposed in the present invention.

FIG. 36 is a view illustrating results of a simulation of UE discovery performance of response delay-based UE discovery according to an embodiment of the present invention.

FIG. 37 is a view illustrating results of a simulation of infrastructure access performance of a response delay-based UE discovery method according to an embodiment of the present invention.

FIG. 38 is a view illustrating a block diagram of a wireless communication device according to an embodiment of the present invention.

MODE FOR INVENTION

Some embodiments of the present invention are described in detail with reference to the accompanying drawings. A detailed description to be disclosed along with the accompanying drawings are intended to describe some exemplary embodiments of the present invention and are not intended to describe a sole embodiment of the present invention. The following detailed description includes more details in order to provide full understanding of the present invention. However, those skilled in the art will understand that the present invention may be implemented without such more details.

In some cases, in order to avoid that the concept of the present invention becomes vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a Base Transceiver System (BTS), or an access point (AP). Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical sprit of the present invention.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General System to Which the Present Invention May Be Applied

FIG. 1 shows the structure of a radio frame in a wireless communication system to which an embodiment of the present invention may be applied.

3GPP LTE/LTE-A support a radio frame structure type 1 which may be applicable to Frequency Division Duplex (FDD) and a radio frame structure which may be applicable to Time Division Duplex (TDD).

FIG. 1(*a*) illustrates the radio frame structure type 1. A radio frame consists of 10 subframes. One subframe consists of 2 slots in a time domain. The time taken to send one subframe is called a Transmission Time Interval (TTI). For example, one subframe may have a length of 1 ms, and one slot may have a length of 0.5 ms.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 1(*b*) illustrates the frame structure type 2. The radio frame structure type 2 consists of 2 half frames. Each of the half frames consists of 5 subframes, a Downlink Pilot Time Slot (DwPTS), a Guard Period (GP), and an Uplink Pilot Time Slot (UpPTS). One subframe consists of 2 slots. The DwPTS is used for initial cell search, synchronization, or channel estimation in UE. The UpPTS is used for channel estimation in an eNB and to perform uplink transmission synchronization with UE. The guard period is an interval in which interference generated in uplink due to the multi-path delay of a downlink signal between uplink and downlink is removed.

In the frame structure type 2 of a TDD system, an uplink-downlink configuration is a rule indicating whether uplink and downlink are allocated (or reserved) to all subframes. Table 1 shows the uplink-downlink configuration.

TABLE 1

| UL-DL configure-tion | DL-to-UL Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, "D" is indicative of a subframe for downlink transmission, "U" is indicative of a subframe for uplink transmission, and "S" is indicative of a special subframe including three types of a DwPTS, GP, and UpPTS. An uplink-downlink configuration may be classified into 7 types. The positions and/or number of downlink subframes, special subframes, and uplink subframe are different in each configuration.

A point of time at which a change is performed from downlink to uplink or a point of time at which a change is performed from uplink to downlink is called a switching point. The periodicity of the switching point means a cycle in which an uplink subframe and a downlink subframe are changed is identically repeated. Both 5 ms and 10 ms are supported in the periodicity of a switching point. If the periodicity of a switching point has a cycle of a 5 ms downlink-uplink switching point, the special subframe S is present in each half frame. If the periodicity of a switching point has a cycle of a 5 ms downlink-uplink switching point, the special subframe S is present in the first half frame only.

In all the configurations, 0 and 5 subframes and a DwPTS are used for only downlink transmission. An UpPTS and a subframe subsequent to a subframe are always used for uplink transmission.

Such uplink-downlink configurations may be known to both an eNB and UE as system information. An eNB may notify UE of a change of the uplink-downlink allocation state of a radio frame by transmitting only the index of uplink-downlink configuration information to the UE whenever the uplink-downlink configuration information is changed. Furthermore, configuration information is kind of downlink control information and may be transmitted through a Physical Downlink Control Channel (PDCCH) like other scheduling information. Configuration information may be transmitted to all UEs within a cell through a broadcast channel as broadcasting information.

The structure of a radio frame is only one example. The number of subcarriers included in a radio frame or the number of slots included in a subframe and the number of OFDM symbols included in a slot may be changed in various ways.

FIG. 2 is a diagram illustrating a resource grid for one downlink slot in a wireless communication system to which an embodiment of the present invention may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block (RB) includes 12×7 resource elements. The number of RBs $N^{DL}$ included in a downlink slot depends on a downlink transmission bandwidth.

The structure of an uplink slot may be the same as that of a downlink slot.

FIG. 3 shows the structure of a downlink subframe in a wireless communication system to which an embodiment of the present invention may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

A PDCCH may carry information about the resource allocation and transport format of a downlink shared channel (DL-SCH) (this is also called an "downlink grant"), resource allocation information about an uplink shared channel (UL-SCH) (this is also called a "uplink grant"), paging information on a PCH, system information on a DL-SCH, the resource allocation of a higher layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. A PDCCH is transmitted on a single Control Channel Element (CCE) or an aggregation of some contiguous CCEs. A CCE is a logical allocation unit that is used to provide a PDCCH with a coding rate according to the state of a radio channel A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to UE and attaches a Cyclic Redundancy Check (CRC) to control information. A unique identifier (a Radio Network Temporary Identifier (RNTI)) is masked to the CRC depending on the owner or use of a PDCCH. If the PDCCH is a PDCCH for specific UE, an identifier unique to the UE, for example, a Cell-RNTI (C-RNTI) may be masked to the CRC. If the PDCCH is a PDCCH for a paging message, a paging indication identifier, for example, a Paging-RNTI (P-RNTI) may be masked to the CRC. If the PDCCH is a PDCCH for system information, more specifically, a System Information Block (SIB), a system information identifier, for example, a System Information-RNTI (SI-RNTI) may be masked to the CRC. A Random Access-RNTI (RA-RNTI) may be masked to the CRC in order to indicate a random access response which is a response to the transmission of a random access preamble by UE.

FIG. 4 shows the structure of an uplink subframe in a wireless communication system to which an embodiment of the present invention may be applied.

Referring to FIG. 4, the uplink subframe may be divided into a control region and a data region in a frequency domain A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Physical Uplink Control Channel (PUCCH)

The Uplink Control Information (UCI) transmitted through a PUCCH can include

Scheduling Request (SR), HARQ ACK/NACK information, and downlink channel measurement information as shown below.

SR (Scheduling Request): used for requesting uplink UL-SCH resources. SR is transmitted by On-Off Keying (OOK) scheme.

HARQ ACK/NACK: a signal responding to a downlink data packet on a PDSCH. This signal indicates whether a downlink data packet has successfully received or not. ACK/NACK 1 bit is transmitted in response to a single downlink codeword while ACK/NACK 2 bits are transmitted in response to two downlink codewords.

CSI (Channel State Information): feedback information about a downlink channel. CSI can include at least one of a Channel Quality Indicator (CQI), a Rank Indicator (RI), a Precoding Matrix Indicator (PMI), and a Precoding Type Indicator (PTI). For each subframe, 20 bits are used to represent the CSI.

HARQ ACK/NACK information may be generated depending on whether a downlink data packet on a PDSCH has been successfully decoded. In an existing wireless communication system, 1 bit is transmitted as ACK/NACK information with respect to the transmission of downlink single codeword, and 2 bits are transmission as ACK/NACK information with respect to the transmission of downlink 2 codewords.

Channel measurement information denotes feedback information related to a Multiple Input Multiple Output (MIMO) scheme and may include a Channel Quality Indicator (CQI), a Precoding Matrix Index (PMI), and a Rank Indicator (RI). Such channel measurement information may be commonly called a CQI.

In order to transmit a CQI, 20 bits may be used in each subframe.

A PUCCH may be modulated using a Binary Phase Shift Keying (BPSK) scheme and a Quadrature Phase Shift Keying (QPSK) scheme. Control information for a plurality of UEs may be transmitted through a PUCCH. If Code Division Multiplexing (CDM) is performed in order to distinguish the signals of UEs from each other, a Constant Amplitude Zero Autocorrelation (CAZAC) sequence of a length 12 is mostly used. The CAZAC sequence has a characteristic in that a constant size (amplitude) is maintained in a time domain and a frequency domain. Accordingly, the CAZAC sequence has a property suitable for increasing coverage by lowering the Peak-to-Average Power Ratio (PAPR) or Cubic Metric (CM) of UE. Furthermore, ACK/NACK information about downlink data transmission transmitted through a PUCCH is covered using an orthogonal sequence or an Orthogonal Cover (OC).

Furthermore, control information transmitted through a PUCCH may be distinguished from each other using a cyclically shifted sequence having a different Cyclic Shift (CS) value. The cyclically shifted sequence may be generated by cyclically shifting a base sequence by a specific CS amount. The specific CS amount is indicated by a CS index. The number of available CSs may be different depending on delay spread of a channel A variety of types of sequences may be used as the base sequence, and the CAZAC sequence is an example of the sequences.

Furthermore, the amount of control information that may be transmitted by UE in one subframe may be determined depending on the number of SC-FDMA symbols which may be used to send the control information (i.e., SC-FDMA symbols other than SC-FDMA symbols which are used to send a Reference Signal (RS) for the coherent detection of a PUCCH).

In a 3GPP LTE system, a PUCCH is defined as a total of 7 different formats depending on control information that is transmitted, a modulation scheme, and the amount of control information. The attributes of Uplink Control Information (UCI) transmitted according to each PUCCH format may be summarized as in Table 2 below.

TABLE 2

| PUCCH Format | Uplink Control Information (UCI) |
|---|---|
| Format 1 | Scheduling Request (SR)(unmodulated waveform) |
| Format 1a | 1-bit HARQ ACK/NACK with/without SR |
| Format 1b | 2-bit HARQ ACK/NACK with/without SR |
| Format 2 | CQI (20 coded bits) |
| Format 2 | CQI and 1- or 2-bit HARQ ACK/NACK (20 bits) for extended CP only |
| Format 2a | CQI and 1-bit HARQ ACK/NACK (20 + 1 coded bits) |
| Format 2b | CQI and 2-bit HARQ ACK/NACK (20 + 2 coded bits) |
| Format 3 | HARQ ACK/NACK, SR, CSI (48 coded bits) |

The PUCCH format 1 is used for SR-only transmission. In the case of SR-only transmission, a not-modulated waveform is applied. This is described in detail later.

The PUCCH format 1a or 1b is used to send HARQ ACK/NACK. If HARQ ACK/NACK is solely transmitted in a specific subframe, the PUCCH format 1a or 1b may be used. Alternatively, HARQ ACK/NACK and an SR may be transmitted in the same subframe using the PUCCH format 1a or 1b.

PUCCCH 2 is used for transmission of CQI, and PUCCH format 2a or 2b is used for transmission of CQI and HARQ ACK/NACK. In the case of extended CP, PUCCH format 2 may be used for transmission of CQI and HARQ ACK/NACK.

PUCCH format 3 is used for carrying an encoded UCI of 48 bits. PUCCH format 3can carry HARQ ACK/NACK about a plurality of serving cells, SR (if exists), and a CSI report about one serving cell.

FIG. 5 shows an example of a form in which the PUCCH formats are mapped to the PUCCH region of the uplink physical resource block in a wireless communication system to which an embodiment of the present invention may be applied.

In FIG. 5, $N_{RB}^{UL}$ is indicative of the number of RBs in uplink, and 0, 1, ..., $N_{RB}^{UL}-1$ means the number of physical RBs. Basically, a PUCCH is mapped to both edges of an uplink frequency block. As shown in FIG. 5, the PUCCH format 2/2a/2b is mapped to a PUCCH region indicated by m=0, 1. This may represent that the PUCCH format 2/2a/2b is mapped to RBs located at a band edge. Furthermore, the PUCCH format 2/2a/2b and the PUCCH format 1/1a/1b may be mixed and mapped to a PUCCH region indicated by m=2. Furthermore, the PUCCH format 1/1a/1b may be mapped to a PUCCH region indicated by m=3, 4, 5. UEs within a cell may be notified of the number $N_{RB}^{(2)}$ of PUCCH RBs which may be used by the PUCCH format 2/2a/2b through broadcasting signaling.

The PUCCH format 2/2a/2b is described below. The PUCCH format 2/2a/2b is a control channel for transmitting channel measurement feedback (i.e., a CQI, a PMI, and an RI).

The report cycle of channel measurement feedback (hereinafter commonly called "CQI information") and a frequency unit (or frequency resolution) to be measured may be controlled by an eNB. In a time domain, a periodic or aperiodic CQI report may be supported. The PUCCH format 2 may be used for a periodic report, and a PUSCH may be used for an aperiodic report. In the case of an aperiodic report, an eNB may instruct UE to carry an individual CQI report on a resource scheduled to transmit uplink data.

FIG. 6 shows the structure of a CQI channel in the case of a normal CP in a wireless communication system to which an embodiment of the present invention may be applied.

The SC-FDMA symbols 1 and 5 (i.e., the second and the sixth symbols) of the SC-FDMA symbols 0 to 6 of one slot are used to transmit a demodulation reference signal (DMRS), and the remaining SC-FDMA symbols of the SC-FDMA symbols 0 to 6 of the slot may be used to CQI information. Meanwhile, in the case of an extended CP, one SC-FDMA symbol (SC-FDMA symbol 3) is used for DMRS transmission.

In the PUCCH format 2/2a/2b, modulation by a CAZAC sequence is supported, and a QPSK-modulated symbol is multiplied by a CAZAC sequence of a length 12. A Cyclic Shift (CS) of the sequence is changed between a symbol and a slot. Orthogonal covering is used for a DMRS.

A reference signal (DMRS) is carried on 2 SC-FDMA symbols that belong to 7 SC-FDMA symbols included in one slot and that is spaced at 3 SC-FDMA symbols. CQI information is carried on the remaining 5 SC-FDMA symbols of the 7 SC-FDMA symbols. Two RSs are used in one slot in order to support high-speed UE. Furthermore, UEs are distinguished from each other using Cyclic Shift (CS) sequences. CQI information symbols are modulated into all SC-FDMA symbols and transferred. The SC-FDMA symbols consist of one sequence. That is, UE modulates a CQI using each sequence and sends the CQI.

The number of symbols which may be transmitted in one TTI is 10, and the modulation of CQI information is determined up to QPSK. If QPSK mapping is used for an SC-FDMA symbol, a CQI value of 10 bits may be carried on one slot because a CQI value of 2 bits may be carried on the SC-FDMA symbol. Accordingly, a CQI value having a maximum of 20 bits may be carried on one subframe. Frequency domain spread code is used to spread CQI information in a frequency domain.

A CAZAC sequence (e.g., ZC sequence) of a length 12 may be used as the frequency domain spread code. Control channels may be distinguished from each other by applying CAZAC sequences having different cyclic shift values. IFFT is performed on frequency domain-spread CQI information.

12 different UEs may be subjected to orthogonal multiplexing on the same PUCCH RB by 12 cyclic shifts having the same interval. In the case of a normal CP, a DMRS sequence on the SC-FDMA symbols 1 and 5 (on an SC-FDMA symbol 3 in the case of an extended CP) are similar to a CQI signal sequence on a frequency domain, but modulation, such as CQI information, is not applied to the DMRS sequence.

UE may be semi-statically configured by higher layer signaling so that it periodically reports different CQI, PMI and RI Types on PUCCH resources indicated by PUCCH resource indices $n_{PUCCH}^{(1,\tilde{p})}$, $n_{PUCCH}^{(2,\tilde{p})}$, and $n_{PUCCH}^{(3,\tilde{p})}$. In this case, the PUCCH resource index $n_{PUCCH}^{(2,\tilde{p})}$ is information indicative of a PUCCH region that is used to transmit the PUCCH format 2/2a/2b and the value of a Cyclic Shift (CS) to be used.

Hereinafter, the PUCCH format 1a and 1b is described below.

In the PUCCH format 1a/1b, a symbol modulated using a BPSK or QPSK modulation scheme is multiplied by a CAZAC sequence of a length 12. For example, the results of a modulation symbol d(0) by a CAZAC sequence r(n)(n=0, 1, 2, ..., N−1) of a length N become y(0), y(1), y(2), ..., y(N−1). The symbols y(0), ..., y(N−1) may be called a block of symbols. After the modulation symbol is multiplied by the CAZAC sequence, block-wise spread using an orthogonal sequence is applied.

A Hadamard sequence of a length 4 is used for common ACK/NACK information, and a Discrete Fourier Transform (DFT) sequence of a length 3 is used for shortened ACK/NACK information and a reference signal.

In the case of an extended CP, a Hadamard sequence of a length 2 is used in a reference signal.

FIG. 7 shows the structure of an ACK/NACK channel in the case of a normal CP in a wireless communication system to which an embodiment of the present invention may be applied.

FIG. 7 illustrates a PUCCH channel structure for transmitting HARQ ACK/NACK without a CQI.

A Reference Signal (RS) is carried on 3 contiguous SC-FDMA symbol that belong to 7 SC-FDMA symbols included in one slot and that are placed in a middle portion, and an ACK/NACK signal is carried on the remaining 4 SC-FDMA symbols of the 7 SC-FDMA symbols.

Meanwhile, in the case of an extended CP, an RS may be carried on 2 contiguous symbols placed in the middle of one slot. The number and positions of symbols used in an RS may be different depending on control channels, and the number and positions of symbols used in an ACK/NACK signal associated with the control channels may be changed depending on the number and positions of symbols used in the RS.

ACK information (not-scrambled state) of 1 bit and 2 bits may be represented as one HARQ ACK/NACK modulation symbol using respective BPSK and QPSK modulation schemes. Positive ACK (ACK) may be encoded as "1", and negative ACK (NACK) may be encoded as "0".

When a control signal is to be transmitted within an allocated bandwidth, two-dimensional spreading is applied in order to increase multiplexing capacity. That is, in order to increase the number of UEs or the number of control channels that may be multiplexed, frequency domain spreading and time domain spreading are used at the same time.

In order to spread an ACK/NACK signal in a frequency domain, a frequency domain sequence is used as a base sequence. A Zadoff-Chu (ZC) sequence which is one of CAZAC sequences, may be used as the frequency domain sequence. For example, by applying a different Cyclic Shift (CS) to a ZC sequence which is a base sequence, different UEs or different control channels may be multiplexed. The number of CS resources supported in a SC-FDMA symbol for PUCCH RBs for transmitting HARQ ACK/NACK is configured by a cell-specific upper layer signaling parameter $\Delta_{shift}^{PUCCH}$.

An ACK/NACK signal spread in a frequency domain is spread in a time domain using orthogonal spreading code. A Walsh-Hadamard sequence or DFT sequence may be used as the orthogonal spreading code. For example, an ACK/NACK signal may be spread for 4 symbols using an orthogonal sequence w0, w1, w2, or w3 of a length 4. Furthermore, an RS is also spread using an orthogonal sequence of a length 3 or length 2. This is called Orthogonal Covering (OC).

A plurality of UEs may be multiplexed using a Code Division Multiplexing (CDM) method using CS resources in a frequency domain and OC resources in a time domain, such as those described above. That is, ACK/NACK information and RSs of a large number of UEs may be multiplexed on the same PUCCH RB.

The number of spreading code supported for ACK/NACK information is restricted by the number of RS symbols with respect to such time domain spreading CDM. That is, the multiplexing capacity of an RS is smaller than the multiplexing capacity of ACK/NACK information because the number of SC-FDMA symbols for RS transmission is smaller than the number of SC-FDMA symbols for ACK/NACK information transmission.

For example, in the case of a normal CP, ACK/NACK information may be transmitted in 4 symbols. 3 pieces of orthogonal spreading code not 4 are used for ACK/NACK information. The reason for this is that only 3 pieces of orthogonal spreading code may be used for an RS because the number of symbols for RS transmission is limited to 3.

In case that 3 symbols of one slot may be used for RS transmission and 4 symbols of the slot may be used for ACK/NACK information transmission in a subframe of a normal CP, for example, if 6 Cyclic Shifts (CSs) may be used in a frequency domain and 3 Orthogonal Cover (OC) resources may be used in a time domain, HARQ ACK from a total of 18 different UEs may be multiplexed within one PUCCH RB. In case that 2 symbols of one slot are used for RS transmission and 4 symbols of one slot are used for ACK/NACK information transmission in a subframe of an extended CP, for example, if 6 CSs may be used in a frequency domain and 2 OC resources may be used in a time domain, HARQ ACK from a total of 12 different UEs may be multiplexed within one PUCCH RB.

The PUCCH format 1 is described below. A Scheduling Request (SR) is transmitted in such a way as to make a request or does not make a request that UE is scheduled. An SR channel reuses an ACK/NACK channel structure in the PUCCH format 1a/1b and consists of an On-Off Keying (OKK) method based on an ACK/NACK channel design. An RS is not transmitted in the SR channel Accordingly, a sequence of a length 7 is used in the case of a normal CP, and a sequence of a length 6 is used in the case of an extended CP. Different cyclic shifts or orthogonal covers may be allocated to an SR and ACK/NACK. That is, in order to send a positive SR, UE sends HARQ ACK/NACK through a resource allocated for the SR. In order to send a negative SR, UE sends HARQ ACK/NACK through a resource allocated for ACK/NACK.

An enhanced-PUCCH (e-PUCCH) format is described below. An e-PUCCH may correspond to the PUCCH format 3 of an LTE-A system. A block spreading scheme may be applied to ACK/NACK transmission using the PUCCH format 3.

Unlike in the existing PUCCH format 1 series or 2 series, the block spreading scheme is a method of modulating control signal transmission using an SC-FDMA method. As shown in FIG. 8, a symbol sequence may be spread in a time domain using Orthogonal Cover Code (OCC) and transmitted. By using OCC, the control signals of a plurality of UEs may be multiplexed on the same RB. In the case of the PUCCH format 2, one symbol sequence is transmitted in a time domain, and the control signals of a plurality of UEs are multiplexed using a Cyclic Shift (CS) of a CAZAC sequence. In contrast, in the case of a block spreading-based PUCCH format (e.g., the PUCCH format 3), one symbol sequence is transmitted in a frequency domain, and the control signals of a plurality of UEs are multiplexed using time domain spreading using OCC.

FIG. 8 shows an example in which 5 SC-FDMA symbols are generated and transmitted during one slot in a wireless communication system to which an embodiment of the present invention may be applied.

FIG. 8 shows an example in which 5 SC-FDMA symbols (i.e., a data part) are generated using OCC of a length=5 (or SF=5) in one symbol sequence during 1 slot and transmitted. In this case, 2 RS symbols may be used during the 1 slot.

In the example of FIG. 8, the RS symbols may be generated from a CAZAC sequence to which a specific CS value has been applied and may be transmitted in a form in which a specific OCC may be applied (or multiplied) to a plurality of RS symbols. Furthermore, in the example of FIG. 8, assuming that 12 modulation symbols are used in each OFDM symbol (or SC-FDMA symbol) and each of the modulation symbols is generated by QPSK, a maximum number of bits capable of being transmitted in one slot are 12×2=24 bits. Accordingly, a total number of bits capable of being transmitted in 2 slots are 48 bits. As described above, if a PUCCH channel structure using a block spreading method is used, control information having an extended size compared to the existing PUCCH format 1 series and 2 series can be transmitted.

General Carrier Aggregation

A communication environment taken into consideration in embodiments of the present invention includes a multi-carrier support environment. That is, a multi-carrier system or Carrier Aggregation (CA) system that is used in an embodiment of the present invention refers to a system in which one or more Component Carriers (CCs) having a smaller bandwidth than a target bandwidth are aggregated and used when the target wideband is configured in order to support a wideband.

In an embodiment of the present invention, a multi-carrier means of an aggregation of carriers (or a carrier aggregation). In this case, an aggregation of carriers means both an aggregation between contiguous carriers and an aggregation between discontinuous (or non-contiguous) carriers. Furthermore, the number of CCs aggregated between downlink and uplink may be different. A case where the number of downlink CCs (hereinafter called "DL CCs") and the number of uplink CCs (hereinafter called "UL CCs") are the same is called a symmetric aggregation. A case where the number of DL CCs is different from the number of UL CCs is called an asymmetric aggregation. Such the term of a carrier aggregation may be replaced with terms, such as a carrier aggregation, bandwidth aggregation, or spectrum aggregation.

An object of a carrier aggregation configured by aggregating two or more component carriers is to support up to a 100 MHz bandwidth in an LTE-A system. When one or more carriers having a smaller bandwidth than a target bandwidth are aggregated, the bandwidth of the aggregated carriers may be restricted to a bandwidth which is used in an existing system in order to maintain backward compatibility with an existing IMT system. For example, in an existing 3GPP LTE system, {1.4, 3, 5, 10, 15, 20} MHz bandwidths may be supported. In a 3GPP LTE-advanced system (i.e., LTE-A), bandwidths greater than the bandwidth 20 MHz may be supported using only the bandwidths for a backward compatibility with existing systems. Furthermore, in a carrier aggregation system used in an embodiment of the present invention, new bandwidths may be defined regardless of the bandwidths used in the existing systems in order to support a carrier aggregation.

An LTE-A system uses the concept of a cell in order to manage radio resources.

The aforementioned carrier aggregation environment may also be called a multi-cell environment. A cell is defined as a combination of a pair of a downlink resource (DL CC) and an uplink resource (UL CC), but an uplink resource is not an essential element. Accordingly, a cell may consist of a downlink resource only or a downlink resource and an uplink resource. If specific UE has a single configured serving cell, it may have 1 DL CC and 1 UL CC. If specific UE has two or more configured serving cells, it has DL CCs corresponding to the number of cells, and the number of UL CCs may be the same as or smaller than the number of DL CCs.

In some embodiments, a DL CC and an UL CC may be configured in an opposite way. That is, if specific UE has a plurality of configured serving cells, a carrier aggregation environment in which the number of UL CCs is greater than the number of DL CCs may also be supported. That is, a carrier aggregation may be understood as being an aggregation of two or more cells having different carrier frequency (the center frequency of a cell). In this case, the "cell" should be distinguished from a "cell", that is, a region commonly covered by an eNB.

A cell used in an LTE-A system includes a Primary Cell (PCell) and a Secondary Cell (SCell). A PCell and an SCell may be used as serving cells. In the case of UE which is in an RRC_CONNECTED state, but in which a carrier aggregation has not been configured or which does not support a carrier aggregation, only one serving cell configured as only a PCell is present. In contrast, in the case of UE which is in the RRC_CONNECTED state and in which a carrier aggregation has been configured, one or more serving cells may be present. A PCell and one or more SCells are included in each serving cell.

A serving cell (PCell and SCell) may be configured through an RRC parameter. PhysCellId is the physical layer identifier of a cell and has an integer value from 0 to 503. SCellIndex is a short identifier which is used to identify an SCell and has an integer value of 1 to 7. ServCellIndex is a short identifier which is used to identify a serving cell (PCell or SCell) and has an integer value of 0 to 7. The value 0 is applied to a PCell, and SCellIndex is previously assigned in order to apply it to an SCell. That is, in ServCellIndex, a cell having the smallest cell ID (or cell index) becomes a PCell.

A PCell means a cell operating on a primary frequency (or primary CC). A PCell may be used for UE to perform an initial connection establishment process or a connection re-establishment process and may refer to a cell indicated in a handover process. Furthermore, a PCell means a cell that belongs to serving cells configured in a carrier aggregation environment and that becomes the center of control-related communication. That is, UE may receive a PUCCH allocated only in its PCell and send the PUCCH and may use only the PCell to obtain system information or to change a monitoring procedure. An Evolved Universal Terrestrial Radio Access Network (E-UTRAN) may change only a PCell for a handover procedure using the RRC connection reconfiguration (RRCConnectionReconfiguration) message of a higher layer including mobility control information (mobilityControlInfo) for UE which supports a carrier aggregation environment.

An SCell may mean a cell operating on a secondary frequency (or secondary CC). Only one PCell is allocated to specific UE, and one or more SCells may be allocated to the specific UE. An SCell may be configured after RRC connection is established and may be used to provide additional radio resources. A PUCCH is not present in the remaining cells, that is, SCells that belong to serving cells configured in a carrier aggregation environment and that do not include a PCell. When adding an SCell to UE supporting a carrier aggregation environment, an E-UTRAN may provide all types of system information related to the operation of a related cell in the RRC_CONNECTED state through a dedicated signal. A change of system information may be controlled by releasing and adding a related SCell. In this case, the RRC connection reconfiguration (RRCConnection-Reconfigutaion) message of a higher layer may be used. An E-UTRAN may send dedicated signaling having a different parameter for each UE instead of broadcasting within a related SCell.

After an initial security activation process is started, an E-UTRAN may configure a network including one or more SCells by adding to a PCell that is initially configured in a connection establishing process. In a carrier aggregation environment, a PCell and an SCell may operate respective component carriers. In the following embodiments, a Primary Component Carrier (PCC) may be used as the same meaning as a PCell, and a Secondary Component Carrier (SCC) may be used as the same meaning as an SCell.

FIG. 9 shows an example of component carriers and a carrier aggregation in a wireless communication system to which an embodiment of the present invention may be applied.

FIG. 9a shows the structure of a single carrier used in an LTE system. A component carrier includes a DL CC and an UL CC. One component carrier may have a frequency range of 20 MHz.

FIG. 9b shows the structure of a carrier aggregation used in an LTE-A system. FIG. 9b shows an example in which 3 component carriers each having a frequency size of 20 MHz have been aggregated. Three DL CCs and three UL CCs have been illustrated in FIG. 9, but the number of DL CCs and UL CCs is not limited. In the case of a carrier aggregation, UE may monitor 3 CCs at the same time, may receive downlink signal/data, and may transmit uplink signal/data.

If N DL CCs are managed in a specific cell, a network may allocate M (M≤N) DL CCs to UE. In this case, the UE may monitor only the M limited DL CCs and receive a DL signal. Furthermore, a network may give priority to L (L≤M≤N) DL CCs and allocate major DL CCs to UE. In this case, the UE must monitor the L DL CCs. Such a method may be applied to uplink transmission in the same manner.

A linkage between a carrier frequency (or DL CC) of a downlink resource and a carrier frequency (or UL CC) of an uplink resource may be indicated by a higher layer message, such as an RRC message, or system information. For example, a combination of DL resources and UL resources may be configured by a linkage defined by System Information Block Type2 (SIB2). Specifically, the linkage may mean a mapping relationship between a DL CC in which a PDCCH carrying an UL grant is transmitted and an UL CC in which the UL grant is used and may mean a mapping relationship between a DL CC (or UL CC) in which data for an HARQ is transmitted and an UL CC (or DL CC) in which an HARQ ACK/NACK signal is transmitted.

Cross-Carrier Scheduling

In a carrier aggregation system, there are two methods, that is, a self-scheduling method and a cross-carrier scheduling method form the point of view of scheduling for a carrier or a serving cell. Cross-carrier scheduling may also be called cross-component carrier scheduling or cross-cell scheduling.

Cross-carrier scheduling means that a PDCCH (DL grant) and a PDSCH are transmitted in different DL CCs or that a PUSCH transmitted according to a PDCCH (UL grant) transmitted in a DL CC is transmitted through an UL CC different from an UL CC that is linked to the DL CC through which the UL grant has been received.

Whether cross-carrier scheduling will be performed may be activated or deactivate in a UE-specific way, and each UE may be notified through high layer signaling (e.g., RRC signaling) semi-statically.

If cross-carrier scheduling is activated, there is a need for a Carrier Indicator Field (CIF) providing notification that a PDSCH/PUSCH indicated by a PDCCH is transmitted through which DL/UL CC. For example, a PDCCH may allocate a PDSCH resource or PUSCH resource to any one of a plurality of component carriers using a CIF. That is, if a PDCCH on a DL CC allocates a PDSCH or PUSCH resource to one of multi-aggregated DL/UL CCs, a CIF is configured. In this case, a DCI format of LTE-A Release-8 may be extended according to the CIF. In this case, the configured CIF may be fixed to a 3-bit field, and the position of the configured CIF may be fixed regardless of the size of the DCI format. Furthermore, a PDCCH structure (resource mapping based on the same coding and the same CCE) of LTE-A Release-8 may be reused.

In contrast, if a PDCCH on a DL CC allocates a PDSCH resource on the same DL CC or allocates a PUSCH resource on a single-linked UL CC, a CIF is not configured. In this case, the same PDCCH structure (resource mapping based on the same coding and the same CCE) and DCI format as those of LTE-A Release-8 may be used.

If cross-carrier scheduling is possible, UE needs to monitor a PDCCH for a plurality of pieces of DCI in the control region of a monitoring CC based on a transmission mode and/or bandwidth corresponding to each CC. Accordingly, there is a need for the configuration of a search space and PDCCH monitoring capable of supporting such monitoring.

In a carrier aggregation system, a UE DL CC set is indicative of a set of DL CCs scheduled so that UE receives a PDSCH. A UE UL CC set is indicative of a set of UL CCs scheduled so that UE transmits a PUSCH. Furthermore, a PDCCH monitoring set is indicative of a set of one or more DL CCs for performing PDCCH monitoring. A PDCCH monitoring set may be the same as a UE DL CC set or may be a subset of a UE DL CC set. A PDCCH monitoring set may include at least one of DL CCs within a UE DL CC set. Alternatively, a PDCCH monitoring set may be separately defined regardless of a UE DL CC set. DL CCs included in a PDCCH monitoring set may be configured so that self-scheduling for a linked UL CC is always possible. Such a UE DL CC set, UE UL CC set, and PDCCH monitoring set may be configured in a UE-specific, UE group-specific, or cell-specific way.

If cross-carrier scheduling is deactivated, it means that a PDCCH monitoring set is always the same as UE DL CC set. In this case, there is no indication, such as separate signaling for a PDCCH monitoring set. However, if cross-carrier scheduling is activated, a PDCCH monitoring set may be defined in a UE DL CC set. That is, in order to schedule a PDSCH or PUSCH for UE, an eNB transmits a PDCCH through a PDCCH monitoring set only.

FIG. 10 shows an example of the structure of a subframe according to cross-carrier scheduling in a wireless communication system to which an embodiment of the present invention may be applied.

FIG. 10 shows an example in which 3 DL CCs are aggregated in a DL subframe for LTE-A UE and a DL CC "A" has been configured as a PDCCH monitoring DL CC. IF a CIF is not used, each DL CC may send a PDCCH for scheduling its PDSCH without a CIF. In contrast, if a CIF is used through higher layer signaling, only the single DL CC "A" may send its PDSCH or a PDCCH for scheduling a PDSCH of a different CC using the CIF. In this case, the DL CCs "B" and "C" not configured as PDCCH monitoring DL CCs do not send a PDCCH.

ACK/NACK Multiplexing Method

In a situation in which UE has to simultaneously send a plurality of ACK/NACKs corresponding to a plurality of data units received from an eNB, an ACK/NACK multiplexing method based on the selection of a PUCCH resource may be taken into consideration in order to maintain the single frequency characteristic of an ACK/NACK signal and to reduce ACK/NACK transmission power.

The content of ACK/NACK responses for a plurality of data units, together with ACK/NACK multiplexing, is identified by a combination of a PUCCH resource used in actual ACK/NACK transmission and the resource of QPSK modulation symbols.

For example, if one PUCCH resource sends 4 bits and a maximum of 4 data units are transmitted, ACK/NACK results may be identified in an eNB as in Table 3 below.

TABLE 3

| HARQ-ACK (0), HARQ-ACK (1), HARQ-ACK (2), HARQ-ACK (3) | $n_{PUCCH}^{(1)}$ | b (0), b (1) |
|---|---|---|
| ACK, ACK, ACK, ACK | $n_{PUCCH,1}^{(1)}$ | 1, 1 |
| ACK, ACK, ACK, NACK/DTX | $n_{PUCCH,1}^{(1)}$ | 1, 0 |
| NACK/DTX, NACK/DTX, NACK, DTX | $n_{PUCCH,2}^{(1)}$ | 1, 1 |
| ACK, ACK, NACK/DTX, ACK | $n_{PUCCH,1}^{(1)}$ | 1, 0 |
| NACK, DTX, DTX, DTX | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 0, 1 |
| NACK/DTX, NACK/DTX, NACK/DTX, NACK | $n_{PUCCH,3}^{(1)}$ | 1, 1 |
| ACK, NACK/DTX, ACK, NACK/DTX | $n_{PUCCH,2}^{(1)}$ | 0, 1 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,1}^{(1)}$ | 0, 1 |
| NACK/DTX, NACK, DTX, DTX | $n_{PUCCH,1}^{(1)}$ | 0, 0 |
| NACK/DTX, ACK, ACK, NACK/DTX | $n_{PUCCH,2}^{(1)}$ | 1, 0 |
| NACK/DTX, ACK, NACK/DTX, ACK | $n_{PUCCH,3}^{(1)}$ | 1, 0 |

TABLE 3-continued

| | | |
|---|---|---|
| HARQ-ACK (0), HARQ-ACK (1), HARQ-ACK (2), HARQ-ACK (3) | $n_{PUCCH}^{(1)}$ | b (0), b (1) |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| DTX, DTX, DTX, DTX | N/A | N/A |

In Table 3, HARQ-ACK (i) is indicative of ACK/NACK results for an i-th data unit. In Table 3, discontinuous transmission (DTX) means that there is no data unit transmitted for a corresponding HARQ-ACK(i) or that UE does not detect a data unit corresponding to the HARQ-ACK(i).

In accordance with Table 3, a maximum of 4 PUCCH resources $n_{PUCCH,0}^{(1)}$, $n_{PUCCH,1}^{(1)}$, $n_{PUCCH,2}^{(1)}$ and $n_{PUCCH,3}^{(1)}$ are present, and b(0), b(1) has 2 bits transmitted using a selected PUCCH.

For example, if UE successfully receives all of the 4 data units, the UE sends 2 bits (1, 1) using the PUCCH resource $n_{PUCCH,1}^{(1)}$.

If UE fails in decoding in first and third data units and succeed in decoding in second and fourth data units, the UE sends bits (1, 0) using the PUCCH resource $n_{PUCCH,3}^{(1)}$.

In the selection of an ACK/NACK channel, if at least one ACK is present, NACK and DTX are coupled. The reason for this is that all of ACK/NACK states are unable to be represented using a combination of a reserved PUCCH resource and a QPSK symbol. If ACK is not present, however, DTX is decoupled from NACK.

In this case, a PUCCH resource linked to a data unit corresponding to one clear NACK may be reserved in order to send a signal for a plurality of ACKs/NACKs.

Semi-Persistent Scheduling

Semi-Persistent Scheduling (SPS) is a scheduling method for allocating resources to specific UE so that the resources continue to be maintained during a specific time interval.

If a specific amount of data is transmitted during a specific time as in a Voice over Internet Protocol (VoIP), the waste of control information can be reduced using the SPS method because the control information does not need to be transmitted at each data transmission interval for resource allocation. In a so-called SPS method, a time resource area in which resources may be allocated is first allocated to UE.

In this case, in the semi-persistent allocation method, a time resource area allocated to specific UE may be configured to have a cycle. Next, the allocation of time-frequency resources is completed by allocating a frequency resource area, if necessary. The allocation of a frequency resource area as described above may be called so-called activation. If the semi-persistent allocation method is used, resource allocation is maintained by one signaling during a specific period. Accordingly, signaling overhead can be reduced because resource allocation does not need to be repeatedly performed.

Thereafter, if resource allocation for the UE is not required, signaling for releasing the frequency resource allocation may be transmitted from an eNB to the UE. The release of the allocation of a frequency resource area as described above may be called deactivation.

In current LTE, for SPS for uplink and/or downlink, first, UE is notified of that SPS transmission/reception need to be performed in what subframes through Radio Resource Control (RRC) signaling. That is, a time resource of time-frequency resources allocated for SPS is first designated through RRC signaling. In order to notify the UE of available subframes, for example, the UE may be notified of the cycle and offset of a subframe. However, the UE does not immediately perform transmission/reception according to SPS although it has received RRC signaling because only the time resource area is allocated to the UE through RRC signaling. The allocation of the time-frequency resources is completed by allocating a frequency resource area, if necessary. The allocation of a frequency resource area as described above may be called activation, and the release of the allocation of a frequency resource area may be called deactivation.

Accordingly, the UE receives a PDCCH indicative of activation, allocates a frequency resource based on RB allocation information included in the received PDCCH, and starts to perform transmission/reception based on a subframe cycle and offset allocated through RRC signaling by applying a modulation scheme and coding rate according to Modulation and Coding Scheme (MCS) information.

Next, when receiving a PDCCH indicative of deactivation from an eNB, the UE stops the transmission/reception. When a PDCCH indicative of activation or reactivation is received after the transmission/reception is stopped, the UE resumes transmission/reception using a subframe cycle and offset allocated through RRC signaling using RBs and an MCS designated in the corresponding PDCCH. That is, the allocation of time resources is performed through RRC signaling, but the transmission/reception of actual signals may be performed after a PDCCH indicative of the activation and reactivation of SPS is received. The stop of signal transmission/reception is performed after a PDCCH indicative of the deactivation of SPS is received.

If the following conditions are all satisfied, the UE may validate a PDCCH including an SPS indication. First, CRC parity bits added for PDCCH payload need to be scrambled with an SPS C-RNTI. Second, a New Data Indicator (NDI) field needs to be set to 0. In this case, in the case of the DCI formats 2, 2A, 2B, and 2C, an NDI field is indicative of one of activated transport blocks.

Furthermore, the validation of each field used in the DCI format is completed when each field is set based on Table 4 and Table 5 below. When such a validation is completed, the UE recognizes the received DCI information as being valid SPS activation or deactivation (or release). In contrast, if the validation is not completed, the UE recognizes that non-matching CRC is included in a received DCI format.

Table 4 illustrates fields for PDCCH validation indicative of SPS activation.

TABLE 4

| | DCI FORMAT 0 | DCI FORMAT 1/1A | DCI FORMAT 2/2A/2B |
|---|---|---|---|
| TPC command for scheduled PUSCH | set to "00" | N/A | N/A |
| Cyclic shift DMRS | set to "000" | N/A | N/A |
| MCS and redundancy version | MSB is set to "0" | N/A | N/A |
| HARQ process number | N/A | FDD: set to "000" TDD: set to "0000" | FDD: set to "000" TDD: set to "0000" |
| MCS | N/A | MSB is set to "0" | For an enabled transport block: MSB is set to "0" |
| Redundancy version | N/A | set to "00" | For the enabled transport block: set to "00" |

Table 5 illustrates fields for PDCCH validation indicative of SPS deactivation (or release).

TABLE 5

|  | DCI format 0 | DCI format 1A |
|---|---|---|
| TPC command for scheduled PUSCH | set to "00" | N/A |
| Cyclic shift DMRS | set to "000" | N/A |
| MCS and redundancy version | set to "11111" | N/A |
| Resource block assignment and hopping resource allocation | Set to all "1"s | N/A |
| HARQ process number | N/A | FDD: set to "000" TDD: set to "0000" |
| MCS | N/A | set to "11111" |
| Redundancy version | N/A | set to "00" |
| Resource block assignment | N/A | Set to all "1"s |

If a DCI format is indicative of SPS downlink scheduling activation, a TPC command value for a PUCCH field may be used an index indicative of 4 PUCCH resource values set by a higher layer.

PUCCH Piggybacking

FIG. 11 shows an example of transport channel processing for an UL-SCH in a wireless communication system to which an embodiment of the present invention may be applied.

In a 3GPP LTE system (=E-UTRA, Rel. 8), in the case of UL, in order to efficiently use the power amplifier of UE, a Peak-to-Average Power Ratio (PAPR) characteristic or Cubic Metric (CM) characteristic affecting performance of the power amplifier are set to maintain good single carrier transmission. That is, in the case of PUSCH transmission in an existing LTE system, the single carrier characteristic of data may be maintained through DFT-precoding. In the case of PUCCH transmission, a single carrier characteristic may be maintained by carrying information on a sequence having a single carrier characteristic and sending the information. However, if DFT-precoded data is discontiguously allocated based on a frequency axis, or a PUSCH and a PUCCH are transmitted at the same time, such a single carrier characteristic is not maintained. Accordingly, if PUSCH transmission is to be performed in the same subframe as that of PUCCH transmission as in FIG. 11, Uplink Control Information (UCI) information to be transmitted through a PUCCH is transmitted (piggybacked) along with data through a PUSCH in order to maintain the single carrier characteristic.

In a subframe in which a PUSCH is transmitted, a method of multiplexing Uplink Control Information (UCI) (a CQI/PMI, HARQ-ACK, an RI, etc.) with a PUSCH region is used because existing LTE UE is unable to send a PUCCH and a PUSCH at the same time as described above.

For example, if a Channel Quality Indicator (CQI) and/or a Precoding Matrix Indicator (PMI) are to be transmitted in a subframe allocated to send a PUSCH, UL-SCH data and the CQI/PMI may be multiplexed prior to DFT-spreading and may be transmitted along with control information and data. In this case, the UL-SCH data is subjected to rate matching by taking the CQI/PMI resources into consideration. Furthermore, a method of puncturing the UL-SCH data into control information, such as HARQ ACK, and an RI, and multiplexing the results with a PUSCH region is used.

FIG. 12 shows an example of a signal processing process in an uplink shared channel, that is, a transport channel, in a wireless communication system to which an embodiment of the present invention may be applied.

Hereinafter, a signal processing process for an uplink shared channel (hereinafter called an "UL-SCH") may be applied to one or more transport channels or control information types.

Referring to FIG. 12, an UL-SCH transfers data to a coding unit in the form of a Transport Block (TB) once for each Transmission Time Interval (TTI).

CRC parity bits $p_0, p_1, p_2, p_3, \ldots, p_{L-1}$ are attached to the bits $a_0, a_1, a_2, a_3, \ldots, a_{A-1}$ of the transport block received from a higher layer at step S120. In this case, A is the size of the transport block, and L is the number of parity bits. The input bits to which the CRC parity bits have been attached are $b_0, b_1, b_2, b_3, \ldots, b_{B-1}$. In this case, B is indicative of the number of bits of the transport block including the CRC parity bits.

The input bits $b_0, b_1, b_2, b_3, \ldots, b_{B-1}$ are segmented into several Code Blocks (CBs) based on the TB size. A CRC is attached to the segmented several CBs at step S121. Bits after the segmentation of the CBs and the attachment of the CRC are $c_{r0}, c_{r1}, c_{r2}, c_{r3}, \ldots, c_{r(K_r-1)}$. In this case, r is a CB number (r=0, ..., C−1), and $K_r$ is the number of bits according to a CB r. Furthermore, C is a total number of CBs.

Next, channel coding is performed at step S122. Output bits after the channel coding are $d_{r0}^{(i)}, d_{r1}^{(i)}, d_{r2}^{(i)}, d_{r3}^{(i)}, \ldots, d_{r(D_r-1)}^{(i)}$. In this case, i is a coded stream index and may have a value 0, 1, or 2 value. $D_r$ is the number of bits of the i-th-coded stream for the CB r. r is a CB number (r=0, ..., C−1), and C a total number of CBs. Each CB may be coded by turbo coding.

Next, rate matching is performed at step S123. Bits after the rate matching are $e_{r0}, e_{r1}, e_{r2}, e_{r3}, \ldots, e_{r(E_r-1)}$. In this case, r is a CB number (r=0, ..., C−1), and C is a total number of CBs. $E_r$ is the number of bits of a r-th code block that has been subjected to rate matching.

Next, a concatenation between the CBs is performed again at step S124. Bits after the concatenation of the CBs are $f_0, f_1, f_2, f_3, \ldots, f_{G-1}$. In this case, G is a total number of coded bits for transmission. When control information is multiplexed with UL-SCH transmission, the number of bits used for control information transmission is not included.

Meanwhile, when control information is transmitted in a PUSCH, channel coding is independently performed on a CQI/PMI, an RI, and ACK/NACK, that is, the control information, at steps S126, S127, and S128. The pieces of control information have different coding rates because different coded symbols are allocated for the transmission of the control information.

In Time Division Duplex (TDD), ACK/NACK feedback mode supports two types of ACK/NACK bundling mode and ACK/NACK multiplexing mode by the configuration of a higher layer. For ACK/NACK bundling, ACK/NACK information bits include 1 bit or 2 bits. For ACK/NACK multiplexing, ACK/NACK information bits include 1 bit to 4 bits.

After the concatenation between the CBs at step S124, the multiplexing of the coded bits $f_0, f_1, f_2, f_3, \ldots, f_{G-1}$ of the UL-SCH data and the coded bits $q_0, q_1, q_2, q_3, \ldots, q_{N_L \cdot Q_{CQI}-1}$ of the CQI/PMI are performed at step S125. The results of the multiplexing of the UL-SCH data and the CQI/PMI are $g_0, g_1, g_2, g_3, \ldots, q_{H'-1}$. In this case, $g_i (i=0, \ldots, H'-1)$ is indicative of a column vector having a length $(Q_m \cdot N_L)$. $H=(G+N_L \cdot Q_{CQI})$ and $H'=H/(N_L \cdot Q_m)$. $N_L$ is the number of layers to which an UL-SCH transport block has been mapped. H is a total number of coded bits allocated to the $N_L$ transmission layers to which the transport block has been mapped for the UL-SCH data and CQI/PMI information.

Next, the multiplexed data and CQI/PMI and the separately channel-coded RI and ACK/NACK are subjected to channel interleaving, thereby generating an output signal at step S129.

Multi-Input Multi-Output (MIMO)

A MIMO technology does not use single transmission antenna and single reception antenna that have been commonly used so far, but uses a multi-transmission (Tx) antenna and a multi-reception (Rx) antenna. In other words, the MIMO technology is a technology for increasing a capacity or enhancing performance using multi-input/output antennas in the transmission end or reception end of a wireless communication system. Hereinafter, MIMO is called a "multi-input/output antenna.".

More specifically, the multi-input/output antenna technology does not depend on a single antenna path in order to receive a single total message and completes total data by collecting a plurality of data pieces received through several antennas. As a result, the multi-input/output antenna technology can increase a data transfer rate within a specific system range and can also increase a system range through a specific data transfer rate.

It is expected that an efficient multi-input/output antenna technology will be used because next-generation mobile communication requires a data transfer rate much higher than that of existing mobile communication. In such a situation, the MIMO communication technology is a next-generation mobile communication technology which may be widely used in mobile communication UE and a relay node and has been in the spotlight as a technology which may overcome a limit to the transfer rate of another mobile communication attributable to the expansion of data communication.

Meanwhile, the multi-input/output antenna (MIMO) technology of various transmission efficiency improvement technologies that are being developed has been most in the spotlight as a method capable of significantly improving a communication capacity and transmission/reception performance even without the allocation of additional frequencies or a power increase.

FIG. 13 shows the configuration of a known MIMO communication system.

Referring to FIG. 13, if the number of transmission (Tx) antennas is increased to $N_T$ and the number of reception (Rx) antennas is increased to $N_R$ at the same time, a theoretical channel transmission capacity is increased in proportion to the number of antennas, unlike in the case where a plurality of antennas is used only in a transmitter or a receiver. Accordingly, a transfer rate can be improved, and frequency efficiency can be significantly improved. In this case, a transfer rate according to an increase of a channel transmission capacity may be theoretically increased by a value obtained by multiplying the following rate increment $R_i$ by a maximum transfer rate $R_o$ if one antenna is used.

$$R_i = \min(N_T, N_R) \quad \text{[Equation 1]}$$

That is, in an MIMO communication system using 4 transmission antennas and 4 reception antennas, for example, a quadruple transfer rate can be obtained theoretically compared to a single antenna system.

Such a multi-input/output antenna technology may be divided into a spatial diversity method for increasing transmission reliability using symbols passing through various channel paths and a spatial multiplexing method for improving a transfer rate by sending a plurality of data symbols at the same time using a plurality of transmission antennas. Furthermore, active research is being recently carried out on a method for properly obtaining the advantages of the two methods by combining the two methods.

Each of the methods is described in more detail below.

First, the spatial diversity method includes a space-time block code-series method and a space-time Trelis code-series method using a diversity gain and a coding gain at the same time. In general, the Trelis code-series method is better in terms of bit error rate improvement performance and the degree of a code generation freedom, whereas the space-time block code-series method has low operational complexity. Such a spatial diversity gain may correspond to an amount corresponding to the product (NT×NR) of the number of transmission antennas (NT) and the number of reception antennas (NR).

Second, the spatial multiplexing scheme is a method for sending different data streams in transmission antennas. In this case, in a receiver, mutual interference is generated between data transmitted by a transmitter at the same time. The receiver removes the interference using a proper signal processing scheme and receives the data. A noise removal method used in this case may include a Maximum Likelihood Detection (MLD) receiver, a Zero-Forcing (ZF) receiver, a Minimum Mean Square Error (MMSE) receiver, Diagonal-Bell Laboratories Layered Space-Time (D-BLAST), and Vertical-Bell Laboratories Layered Space-Time (V-BLAST). In particular, if a transmission end can be aware of channel information, a Singular Value Decomposition (SVD) method may be used.

Third, there is a method using a combination of a spatial diversity and spatial multiplexing. If only a spatial diversity gain is to be obtained, a performance improvement gain according to an increase of a diversity disparity is gradually saturated. If only a spatial multiplexing gain is used, transmission reliability in a radio channel is deteriorated. Methods for solving the problems and obtaining the two gains have been researched and may include a double space-time transmit diversity (double-STTD) method and a space-time bit interleaved coded modulation (STBICM).

In order to describe a communication method in a multi-input/output antenna system, such as that described above, in more detail, the communication method may be represented as follows through mathematical modeling.

First, as shown in FIG. 13, it is assumed that $N_T$ transmission antennas and $N_R$ reception antennas are present.

First, a transmission signal is described below. If the $N_T$ transmission antennas are present as described above, a maximum number of pieces of information which can be transmitted are $N_T$, which may be represented using the following vector.

$$S = [S_1, S_2, \ldots, S_{N_T}]^T \quad \text{[Equation 2]}$$

Meanwhile, transmission power may be different in each of pieces of transmission information $s_1, s_2, s_{NT}$. In this case, if pieces of transmission power are $P_1, P_2, \ldots, P_{NT}$, transmission information having controlled transmission power may be represented using the following vector.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

Furthermore, $\hat{s}$ may be represented as follows using the diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, the information vector $\hat{s}$ having controlled transmission power is multiplied by a weight matrix W, thus forming $N_T$ transmission signals $x_1, x_2, \ldots, x_{NT}$ that are actually transmitted. In this case, the weight matrix functions to properly distribute the transmission information to antennas according to a transport channel condition. The following may be represented using the transmission signals $x_1, x_2, \ldots, x_{N_T}$.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} =$$ [Equation 5]

$$W\hat{s} = WPs$$

In this case, $w_{ij}$ denotes weight between an i-th transmission antenna and a j-th transmission information, and W is an expression of a matrix of the weight. Such a matrix W is called a weight matrix or precoding matrix.

Meanwhile, the transmission signal x, such as that described above, may be considered to be used in a case where a spatial diversity is used and a case where spatial multiplexing is used.

If spatial multiplexing is used, all the elements of the information vector s have different values because different signals are multiplexed and transmitted. In contrast, if the spatial diversity is used, all the elements of the information vector s have the same value because the same signals are transmitted through several channel paths.

A method of mixing spatial multiplexing and the spatial diversity may be taken into consideration. In other words, the same signals may be transmitted using the spatial diversity through 3 transmission antennas, for example, and the remaining different signals may be spatially multiplexed and transmitted.

If $N_R$ reception antennas are present, the reception signals $y_1, y_2, \ldots, y_{N_R}$ of the respective antennas are represented as follows using a vector y.

$$y=[y_1,y_1,\ldots,y_{N_R}]^T$$ [Equation 6]

Meanwhile, if channels in a multi-input/output antenna communication system are modeled, the channels may be classified according to transmission/reception antenna indices. A channel passing through a reception antenna i from a transmission antenna j is represented as $h_{ij}$. In this case, it is to be noted that in order of the index of $h_{ij}$, the index of a reception antenna comes first and the index of a transmission antenna then comes.

Several channels may be grouped and expressed in a vector and matrix form. For example, a vector expression is described below.

FIG. 14 is a diagram showing a channel from a plurality of transmission antennas to a single reception antenna.

As shown in FIG. 14, a channel from a total of $N_T$ transmission antennas to a reception antenna i may be represented as follows.

$$h_i^T=[h_{i1},h_{i2},\ldots,h_{iN_T}]$$ [Equation 7]

Furthermore, if all channels from the $N_T$ transmission antenna to $N_R$ reception antennas are represented through a matrix expression, such as Equation 7, they may be represented as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R1} & h_{N_R2} & \cdots & h_{N_RN_T} \end{bmatrix}$$ [Equation 8]

Meanwhile, Additive White Gaussian Noise (AWGN) is added to an actual channel after the actual channel experiences the channel matrix H. Accordingly, AWGN $n_1, n_2, \ldots, n_{N_R}$ added to the $N_R$ reception antennas, respectively, are represented using a vector as follows.

$$n=[n_1,n_2,\ldots,n_{N_R}]^T$$ [Equation 9]

A transmission signal, a reception signal, a channel, and AWGN in a multi-input/output antenna communication system may be represented to have the following relationship through the modeling of the transmission signal, reception signal, channel, and AWGN, such as those described above.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} =$$ [Equation 10]

$$Hx + n$$

Meanwhile, the number of rows and columns of the channel matrix H indicative of the state of channels is determined by the number of transmission/reception antennas. In the channel matrix H, as described above, the number of rows becomes equal to the number of reception antennas $N_R$, and the number of columns becomes equal to the number of transmission antennas $N_T$. That is, the channel matrix H becomes an $N_R \times N_T$ matrix.

In general, the rank of a matrix is defined as a minimum number of the number of independent rows or columns Accordingly, the rank of the matrix is not greater than the number of rows or columns. As for figural style, for example, the rank H of the channel matrix H is limited as follows.

$$\text{rank}(H) \leq \min(N_T, N_R)$$ [Equation 11]

Furthermore, if a matrix is subjected to Eigen value decomposition, a rank may be defined as the number of Eigen values that belong to Eigen values and that are not 0. Likewise, if a rank is subjected to Singular Value Decomposition (SVD), it may be defined as the number of singular values other than 0. Accordingly, the physical meaning of a rank in a channel matrix may be said to be a maximum number on which different information may be transmitted in a given channel.

In this specification, a "rank" for MIMO transmission indicates the number of paths through which signals may be independently transmitted at a specific point of time and a specific frequency resource. The "number of layers" indicates the number of signal streams transmitted through each path. In general, a rank has the same meaning as the number of layers unless otherwise described because a transmission end sends the number of layers corresponding to the number of ranks used in signal transmission.

Reference Signal (RS)

In a wireless communication system, a signal may be distorted during transmission because data is transmitted through a radio channel. In order for a reception end to accurately receive a distorted signal, the distortion of a received signal needs to be corrected using channel information. In order to detect channel information, a method of detecting channel information using the degree of the distortion of a signal transmission when signal is transmitted through a channel and a method of transmitting signal known to both the transmission side and the reception side is mostly used. The aforementioned signal is called a pilot signal or Reference Signal (RS).

When data is transmitted/received using a multi-input/output antenna, a channel state between a transmission antenna and a reception antenna needs to be detected in order to accurately receive a signal. Accordingly, each transmission antenna needs to have an individual reference signal.

A downlink reference signal includes a Common Reference Signal (CRS) shared by all UEs within one cell and a Dedicated Reference Signal (DRS) for specific UE. Information for demodulation and channel measurement may be provided using such reference signals.

The reception side (i.e., UE) measures a channel state based on a CRS and feeds indicators related to channel quality, such as a Channel Quality Indicator (CQI), a Precoding Matrix Index (PMI) and/or a Rank Indicator (RI), back to the transmission side (i.e., an eNB). The CRS is also called a cell-specific RS. In contrast, a reference signal related to the feedback of Channel State Information (CSI) may be defined as a CSI-RS.

The DRS may be transmitted through resource elements if data on a PDSCH needs to be demodulated. UE may receive information about whether a DRS is present through a higher layer, and the DRS is valid only if a corresponding PDSCH has been mapped. The DRS may also be called a UE-specific RS or demodulation RS (DMRS).

FIG. 15 illustrates a reference signal pattern mapped to a downlink resource block pair in a wireless communication system to which an embodiment of the present invention may be applied.

Referring to FIG. 15, a downlink resource block pair, that is, a unit in which a reference signal is mapped unit, may be represented in the form of one subframe in a time domain X 12 subcarriers in a frequency domain. That is, in a time axis (i.e., x axis), one resource block pair has a length of 14 OFDM symbols in the case of a normal Cyclic Prefix (CP) (FIG. 15a) and has a length of 12 OFDM symbols in the case of an extended CP (FIG. 15b). In the resource block lattice, Resource Elements (REs) indicated by "0", "1", "2", and "3" mean the positions of the CRSs of antenna port indices "0", "1", "2", and "3", and REs indicated by "D" denotes the position of a DRS.

A CRS is described in detail below. The CRS is used to estimate the channel of a physical antenna and is a reference signal which may be received by all UEs located in a cell in common The CRS is distributed to the entire frequency bandwidth. Furthermore, the CRS may be used for Channel Quality Information (CQI) and data demodulation.

The CRS is defined in various formats depending on an antenna array on the transmission side (i.e., an eNB). In a 3GPP LTE system (e.g., release-8), various antenna arrays are supported, and the transmission side of a downlink signal has three types of antenna arrays, such as 3 single transmission antennas, 2 transmission antennas, and 4 transmission antennas. If an eNB uses a single transmission antenna, reference signals for a single antenna port are arrayed. If an eNB uses 2 transmission antennas, reference signals for 2 transmission antenna ports are arrayed using a Time Division Multiplexing (TDM) method and/or a Frequency Division Multiplexing (FDM) method. That is, different time resources and/or different frequency resources are allocated so that reference signals for 2 antenna ports are distinguished from each other.

Furthermore, if an eNB uses 4 transmission antennas, reference signals for 4 transmission antenna ports are arrayed using the TDM and/or FDM methods. Channel information measured by the reception side (i.e., UE) of a downlink signal may be used to demodulate data transmitted using a transmission method, such as single transmission antenna transmission, transmission diversity, closed-loop spatial multiplexing, open-loop spatial multiplexing, or an multi-User-multi-input/output (MIMO) antennas.

If a multi-input/output antenna is supported, when a reference signal is transmitted by a specific antenna port, the reference signal is transmitted in the positions of resource elements specified depending on the pattern of the reference signal and is not transmitted in the positions of resource elements specified for other antenna ports. That is, reference signals between different antennas do not overlap.

A rule for mapping a CRS to a resource block is defined as follows.

$$k = 6m + (v + v_{shift}) \bmod 6 \quad \text{[Equation 12]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

In Equation 12, k and l denote a subcarrier index and a symbol index, respectively, and p denotes an antenna port. $N_{symb}^{DL}$ denotes the number of OFDM symbols in one downlink slot, and $N_{RB}^{DL}$ denotes the number of radio resources allocated to downlink. $n_s$ denotes a slot index, and $N_{ID}^{cell}$ denotes a cell ID. mod denotes modulo operation. The position of a reference signal is different depending on a value $v_{shift}$ in a frequency domain. Since the value $v_{shift}$ depends on a cell ID, the position of a reference signal has various frequency shift values depending on a cell.

More specifically, in order to improve channel estimation performance through a CRS, the position of a CRS may be shifted in a frequency domain. For example, if reference signals are placed at an interval of 3 subcarriers, reference signals in one cell are allocated to a 3k-th subcarrier, and reference signals in the other cell are allocated to a (3k+1)-th subcarrier. From the point of view of a single antenna port, reference signals are arrayed at an interval of 6 resource elements in a frequency domain. Reference signals are spaced apart from reference signals allocated in other antenna ports at an interval of 3 resource elements.

In a time domain, reference signals are started from the symbol index 0 of each slot and are arrayed at a constant interval. A time interval is different defined depending on the length of a cyclic prefix. In the case of a normal cyclic prefix, reference signals are placed in the symbol indices 0 and 4 of a slot. In the case of an extended cyclic prefix, reference signals are placed in the symbol indices 0 and 3 of a slot. A reference signal for an antenna port that belongs to 2 antenna ports and that has a maximum value is defined within one OFDM symbol. Accordingly, in the case of 4 transmission antenna transmission, reference signals for RS antenna ports 0 and 1 are placed in the symbol indices 0 and 4 of a slot (i.e., symbol indices 0 and 3 in the case of an extended cyclic prefix), and reference signals for antenna ports 2 and 3 are placed in the symbol index 1 of the slot. The positions of reference signals for antenna ports 2 and 3 in a frequency domain are changed in a second slot.

A DRS is described in more detail below. The DRS is used to demodulate data. In multi-input/output antenna transmission, precoding weight used for specific UE is combined with a transport channel transmitted by each transmission antenna when the UE receives a reference signal and is used to estimate a corresponding channel without any change.

A 3GPP LTE system (e.g., release-8) supports a maximum of 4 transmission antennas and uses a DRS for rank 1 beamforming The DRS for rank 1 beamforming also indicates a reference signal for an antenna port index 5.

A rule on which a DRS is mapped to a resource block is defined as follows. Equation 13 illustrates a normal cyclic prefix, and Equation 14 illustrates an extended cyclic prefix.

$$k = (k') \bmod N_{sc}^{RB} + N_{sc}^{RB} \cdot n_{PRB}$$ [Equation 13]

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0,1 & \text{if } n_s \bmod 2 = 0 \\ 2,3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

$$k = (k') \bmod N_{sc}^{RB} + N_{sc}^{RB} \cdot n_{PRB}$$ [Equation 14]

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1,2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

In Equations 12 to 14, k and p denote a subcarrier index and an antenna port, respectively. $N_{RB}^{DL}$, $n_s$, and $N_{ID}^{cell}$ denote the number of RBs allocated to downlink, the number of slot indices, and the number of cell IDs. The position of an RS is different depending on the value $v^{shift}$ from the point of view of a frequency domain.

In Equations 13 and 14, k and l denote a subcarrier index and a symbol index, respectively, and p denotes an antenna port. $N_{sc}^{RB}$ denotes the size of an RB in a frequency domain and is represented as the number of subcarriers. $n_{PRB}$ denotes the number of physical RBs. $N_{RB}^{PDSCH}$ denotes the frequency bandwidth of an RB for PDSCH transmission. $n_s$ denotes the index of a slot, and $N_{ID}^{cell}$ denotes the ID of a cell. mod denotes modulo operation. The position of a reference signal is different depending on the value $v_{shift}$ in a frequency domain. Since the value $v_{shift}$ depends on the ID of a cell, the position of a reference signal has various frequency shift values depending on a cell.

Sounding Reference Signal (SRS)

An SRS is mostly used in the measurement of channel quality in order to perform uplink frequency-selective scheduling and is not related to the transmission of uplink data and/or control information, but the present invention is not limited thereto. The SRS may be used for various other purposes for improving power control or various startup functions of UEs which have not been recently scheduled. The startup functions may include an initial Modulation and Coding Scheme (MCS), initial power control for data transmission, a timing advance, and frequency semi-selective scheduling, for example. In this case, the frequency semi-selective scheduling means selectively allocating a frequency resource to the first slot of a subframe and pseudo-randomly hopping to another frequency in the second slot of the subframe and allocating frequency resources.

Furthermore, the SRS may be used to measure downlink channel quality, assuming that a radio channel is reciprocal between uplink and downlink. Such an assumption is particularly valid when the same frequency spectrum is shared between uplink and downlink and in Time Division Duplex (TDD) systems separated in a time domain.

The subframes of an SRS transmitted by UE within a cell may be represented by a cell-specific broadcasting signal. A 4-bit cell-specific parameter "srsSubframeConfiguration" indicates 15 available subframe arrays in which an SRS may be transmitted though respective radio frames. In accordance with such arrays, the flexibility of control of SRS overhead can be provided according to a deployment scenario.

A sixteenth array completely turns off the switch of an SRS within a cell, which is mostly suitable for a serving cell which provides service to high-speed UEs.

FIG. 16 illustrates an uplink subframe including the symbols of a Sounding Reference Signal (SRS) in a wireless communication system to which an embodiment of the present invention may be applied.

Referring to FIG. 16, an SRS is always transmitted through the last SC-FDMA symbol in an arrayed subframe. Accordingly, an SRS and DMRS are placed in different SC-FDMA symbols. The transmission of PUSCH data is not permitted in a specific SC-FDMA symbol for SRS transmission. As a result, if sounding overhead is the highest, that is, although an SRS symbol is included in all subframes, sounding overhead does not exceed about 7%.

Each SRS symbol is generated based on a base sequence (i.e., a random sequence or a sequence set based on Zadoff-Ch (ZC)) regarding a given time unit and frequency bandwidth. All UEs within the same cell use the same base sequence. In this case, the transmissions of SRSs from a plurality of UEs within the same cell in the same frequency bandwidth and the same time are orthogonal to each other by different cyclic shifts of a base sequence and are distinguished from each other.

SRS sequences from different cells may be distinguished from each other because different base sequences are allocated to respective cells, but orthogonality between the different base sequences is not guaranteed.

Coordinated Multi-Point (CoMP) Transmission and Reception

In line with the demand of LTE-advanced, there has been proposed CoMP transmission in order to improve system performance CoMP is also called co-MIMO, collaborative MIMO, or network MIMO. CoMP is expected to improve performance of UE located in a cell edge and to improve the average throughput of a cell (or sector).

In general, inter-cell interference deteriorates performance of UE located in a cell edge and the average cell (or sector) efficiency in a multi-cell environment in which a frequency reuse factor is 1. In order to reduce inter-cell interference, a simple passive method, such as Fractional Frequency Reuse (FFR), has been applied to an LTE system so that UE placed in a cell edge in an interference-limited environment has proper performance efficiency. However, instead of reducing the use of frequency resources per cell, a method of reusing inter-cell interference as a signal required to be received by UE or reducing inter-cell interference is more advantageous. In order to achieve the above object, a CoMP transmission method may be used.

A CoMP method applicable to downlink may be divided into a Joint Processing (JP) method and a Coordinated Scheduling/Beamforming (CS/CB) method.

In the JP method, data may be used in each point (ie, eNB) of a CoMP unit. The CoMP unit means a set of eNBs used in the CoMP method. The JP method may be subdivided into a joint transmission method and a dynamic cell selection method.

The joint transmission method is a method of transmitting, by a plurality of points, that is, some or all of the points of a CoMP unit, signals through a PDSCH at the same time. That is, data transmitted to one UE is transmitted from a plurality of transmission points at the same time. The quality of a signal transmitted to UE can be improved coherently or non-coherently and interference between the UE and another UE can be actively removed through such a joint transmission method.

The dynamic cell selection method is a method of sending a signal by one point of a CoMP unit through a PDSCH. That is, data transmitted to one UE on a specific time is transmitted from one point, but is not transmitted from another point within the CoMP unit to the UE. A point at which data is transmitted to UE may be dynamically selected.

In accordance with the CS/CB method, a CoMP unit performs beamforming in cooperation in order to send data to one UE. That is, data is transmitted to UE in a serving cell only, but user scheduling/beamforming may be determined through cooperation between a plurality of cells within a CoMP unit.

In some embodiments, CoMP reception means the reception of a signal transmitted by cooperation between a plurality of points that are geographically separated. A CoMP method which may be applied to uplink may be divided into a Joint Reception (JR) method and a Coordinated Scheduling/Beamforming (CS/CB) method.

The JR method is a method of receiving, by a plurality of points, that is, some or all of the points of a CoMP unit, a signal transmitted through a PDSCH. In the CS/CB method, a signal transmitted through a PDSCH is received only at one point, but user scheduling/beamforming may be determined through cooperation between a plurality of cells within a CoMP unit.

Relay Node (RN)

In a relay node, data transmitted/received between an eNB and UE is transferred through two different links (i.e., a backhaul link and an access link) An eNB may include a donor cell. A relay node is wirelessly connected to a radio access network through a donor cell.

In relation to the use of the bandwidth (or spectrum) of a relay node, a case where a backhaul link operates in the same frequency bandwidth as that of an access link is called an "in-band", and a case where a backhaul link and an access link operate in different frequency bandwidths is called an "out-band." In both the in-band and the out-band, UE (hereinafter called "legacy UE") operating in accordance with an existing LTE system (e.g., release-8) needs to be able to access a donor cell.

A relay node may be divided into a transparent relay node and a non-transparent relay node depending on whether UE recognizes a relay node. The term "transparent" means whether UE communicates with a network through a relay node is not recognized. The term "non-transparent" means whether UE communicates with a network through a relay node is recognized.

In relation to control of a relay node, a relay node may be divided into a relay node formed as part of a donor cell and a relay node autonomously controlling a cell.

A relay node formed as part of a donor cell may have a relay node identity (relay ID), but does not have its own cell identity.

If at least part of Radio Resource Management (RRM) is controlled by an eNB belonging to a donor cell, it is called a relay node formed as part of a donor cell although the remaining parts of the RRM are placed in the relay node. Such a relay node may support legacy UE. For example, various types of smart repeaters, decode-and-forward relays, and second layer (L2) relay nodes and a Type-2 relay node correspond to such a relay node.

In the case of a relay node autonomously controlling a cell, the relay node controls one or a plurality of cells, and a unique physical layer cell identity is provided to each of the cells controlled by the relay node. Furthermore, the cells controlled by the relay node may use the same RRM mechanism. From a viewpoint of UE, there is no difference between access to a cell controlled by a relay node and access to a cell controlled by a common eNB. A cell controlled by such a relay node can support legacy UE. For example, a self-backhauling relay node, a third layer (L3) relay node, a Type-1 relay node, and a Type-1a relay node correspond to such a relay node.

The Type-1 relay node is an in-band relay node and controls a plurality of cells, and each of the plurality of cells is seen by UE as a separate cell different from a donor cell. Furthermore, the plurality of cells has different physical cell IDs (this is defined in LTE release-8), and the relay node may send its own synchronization channel and reference signal. In the case of one cell operation, UE directly may receive scheduling information and HARQ feedback from a relay node and send its own control channels (e.g., a Scheduling Request (SR), a CQI, and ACK/NACK) to the relay node. Furthermore, the Type-1 relay node is seen by legacy UE (i.e., UE operating in accordance with an LTE release-8 system) as a legacy eNB (i.e., an eNB operating in accordance with an LTE release-8 system). That is, the Type-1 relay node has backward compatibility. Meanwhile, the Type-1 relay node is seen by UEs operating in accordance with an LTE-A system as an eNB different from a legacy eNB, thereby being capable of providing improved performance.

The Type-1a relay node has the same characteristics as the Type-1 relay node except that it operates in an out-band. The operation of the Type-1a relay node may be configured so that an influence on a first layer (L1) operation is minimized The Type-2 relay node is an in-band relay node, and it does not have a separate physical cell ID and thus does not form a new cell. The Type-2 relay node is transparent to legacy UE, and the legacy UE does not recognize the presence of the Type-2 relay node. The Type-2 relay node may send a PDSCH, but does not send at least CRS and PDCCH.

In order to prevent a relay node from operating in in-band, some resources in a time-frequency domain may need to be reserved for a backhaul link and may be configured so that they are not used for an access link This is called resource partitioning.

A known principle in resource partitioning in a relay node may be described as follows. Backhaul downlink and access downlink may be multiplexed according to a Time Division Multiplexing (TDM) method on one carrier frequency (i.e., only one of a backhaul downlink and an access downlink in a specific time is activated). Likewise, backhaul uplink and access uplink may be multiplexed according to a TDM method on one carrier frequency (i.e., only one of a backhaul uplink and an access uplink in a specific time is activated).

In backhaul link multiplexing in FDD, backhaul downlink transmission may be performed in a downlink frequency bandwidth, and the transmission of a backhaul uplink may be performed in an uplink frequency bandwidth. In backhaul link multiplexing in TDD, backhaul downlink transmission may be performed in a downlink subframe of an eNB and a relay node, and the transmission of a backhaul uplink may be performed in an uplink subframe of an eNB and a relay node.

In the case of an in-band relay node, for example, when the reception of a backhaul downlink from an eNB and the transmission of an access downlink to UE are performed in the same frequency bandwidth at the same time, signal interference may be generated in the reception end of a relay node due to a signal transmitted by the transmission end of the relay node. That is, signal interference or RF jamming may be generated in the RF front end of the relay node. Likewise, when the transmission of a backhaul uplink to an eNB and the reception of an access uplink from UE are performed in the same frequency bandwidth at the same time, signal interference may be generated.

Accordingly, in order for a relay node to send/receive signals in the same frequency bandwidth at the same time, a sufficient separation needs to be provided between a reception signal and a transmission signal (e.g., that the reception signal and the transmission signal need to be sufficiently separated geographically, such as that a transmission antenna and a reception antenna are installed on the ground and in the grave, respectively).

One method for solving such signal interference is to allow a relay node to operate in such a way as not to send a signal to UE while receiving a signal from a donor cell. That is, a gap is generated in transmission from the relay node to the UE, and the UE (including legacy UE) is configured to not expect any transmission from the relay node during the gap. Such a gap may be configured by configuring a Multicast Broadcast Single Frequency Network (MBSFN) subframe. FIG. 17 illustrates the segmentation of a relay node resource in a wireless communication system to which an embodiment of the present invention may be applied.

In FIG. 17, a first subframe is a common subframe, and a downlink (i.e., access downlink) control signal and data are transmitted from a relay node to UE in the first subframe. In contrast, a second subframe is an MBSFN subframe, and a control signal is transmitted from the relay node to the UE in the control region of the downlink subframe, but no transmission is performed from the relay node to the UE in the remaining region of the downlink subframe. In this case, since legacy UE expects the transmission of a PDCCH in all downlink subframes (i.e., a relay node needs to provide support so that legacy UEs within the region of the relay node perform measurement functions by receiving a PDCCH every subframe), the PDCCH needs to be transmitted in all downlink subframes for the correct operation of the legacy UE. Accordingly, the relay node does not perform backhaul downlink reception, but needs to perform access downlink transmission in the first N (N=1, 2 or 3) OFDM symbol period of a subframe (i.e., the second subframe) on the subframe configured for downlink (i.e., backhaul downlink) transmission from an eNB to the relay node. For this, the relay node may provide backward compatibility to serving legacy UE because a PDCCH is transmitted from the relay node to the UE in the control region of the second subframe. The relay node may receive transmission from the eNB while no transmission is performed from the relay node to the UE in the remaining region of the second subframe. Accordingly, access downlink transmission and backhaul downlink reception may not be performed at the same time in an in-band relay node through such a resource partitioning method.

The second subframe using an MBSFN subframe is described in detail. The control region of the second subframe may be said to be a relay node non-hearing period.

The relay node non-hearing interval means an interval in which a relay node does not receive a backhaul downlink signal, but sends an access downlink signal. The interval may be configured to have a 1, 2 or 3 OFDM length, such as that described above. A relay node performs access downlink transmission to UE in a relay node non-hearing interval, but may perform backhaul downlink reception from an eNB in the remaining region. In this case, time is taken for the relay node to switch from transmission mode to reception mode because the relay node is unable to perform transmission/reception in the same frequency bandwidth at the same time. Accordingly, a Guard Time (GP) needs to be configured so that the relay node switches to transmission/reception mode in the first some interval of a backhaul downlink reception region. Likewise, a guard time for enabling the relay node to switch to reception/transmission mode may be configured although the relay node operates in such a way as to receive a backhaul downlink from the eNB and to send an access downlink to the UE. The length of such a guard time may be set as a value in a time domain. For example, the length of the guard time may be set as a k (k≥1) time sample (Ts) value or may be set as one or more OFDM symbol length.

Alternatively, relay node backhaul downlink subframes may be contiguously configured, or the guard time of the last part of a subframe may not be defined or configured according to a specific subframe timing alignment relationship. Such a guard time may be defined only in a frequency domain configured for backhaul downlink subframe transmission in order to maintain backward compatibility (if a guard time is configured in an access downlink interval, legacy UE cannot be supported). In a backhaul downlink reception interval other than the guard time, the relay node can receive a PDCCH and a PDSCH from the eNB. This may be represented by a relay-PDCCH (R-PDCCH) and a relay-PDSCH (R-PDSCH) in the meaning of a relay node-dedicated physical channel.

Channel State Information (CSI) Feedback

An MIMO method may be divided into an open-loop method and a closed-loop method. In the open-loop method, a transmission end performs MIMO transmission without the feedback of CSI from an MIMO reception end. In the closed-loop MIMO method, a transmission end receives CSI fed back by an MIMO reception end and performs MIMO transmission. In the closed-loop MIMO method, in order to obtain the multiplexing gain of an MIMO transmission antenna, each of a transmission end and a reception end may perform beamforming based on CSI. A transmission end (e.g., an eNB) may allocate an uplink control channel or an uplink shared channel to a reception end (e.g., UE) so that a reception end (e.g., UE) is able to feed CSI back.

The feedback CSI may include a Rank Indicator (RI), a Precoding Matrix Index (PMI), and a Channel Quality Indicator (CQI).

The RI is information about a channel rank. The channel of a rank means a maximum number of layers (or streams) in which different information may be transmitted through the same time-frequency resource. A rank value may be fed back in a longer cycle (i.e., less frequently) than a PMI and CQI because it is mostly determined by long term fading of a channel.

The PMI is information about a precoding matrix which is used in transmission from a transmission end and is a value into which the spatial characteristic of a channel is reflected. The term "precoding" means that a transmission layer is mapped to a transmission antenna, and a layer-antenna mapping relationship may be determined based on a precoding matrix. The PMI corresponds to the PMI of an eNB, which is preferred by UE based on a metric, such as a Signal-to-Interference plus Noise Ratio (SINR). In order to reduce feedback overhead of precoding information, a method of previously sharing, by a transmission end and a reception end, a codebook including several precoding matrices and feeding only an index indicative of a specific precoding matrix in the corresponding codebook back may be used.

The CQI is information indicative of the intensity of channel or quality of channel. The CQI may be represented as a predetermined MCS combination. That is, a CQI index that is fed back is indicative of a corresponding modulation scheme and coding rate. In general, the CQI is a value into which a reception SINR which may be obtained when an eNB configures a space channel using a PMI is reflected.

In a system (e.g., LTE-A system) supporting an extended antenna configuration, to obtain additional multi-user diversity using a multi-user-MIMO (MU-MIMO) method is taken into consideration. In the MU-MIMO method, an interference channel is present between UEs multiplexed in an antenna region. Accordingly, it is necessary to prevent interference from occurring in another UE if an eNB performs downlink transmission using CSI fed back by one UE of multiple users. Accordingly, in order for an MU-MIMO operation to be correctly performed, CSI having higher accuracy compared to a single user-MIMO (SU-MIMO) method needs to be fed back.

A new CSI feedback method using improved CSI including an existing RI, PMI, and CQI may be used so that more accurate CSI can be measured and reported as described above. For example, precoding information fed back by a reception end may be indicated by a combination of two PMIs. One (the first PMI) of the two PMIs has the attributes of a long term and/or a wideband and may be called W1. The other (the second PMI) of the two PMIs has the attributes of a short term and/or a sub-band and may be called W2. The final PMI may be determined by a combination (or function) of W1 and W2. For example, assuming that the final PMI is W, W=W1*W2 or W=W2*W1 may be defined.

In this case, the average characteristics of a channel in terms of the frequency and/or time are reflected in W1. In other words, W1 may be defined as CSI in which the characteristics of a long term channel in terms of time are reflected, the characteristics of a wideband channel in terms of frequency are reflected, or the characteristics of a long term channel in terms of time and a wideband channel in terms of frequency are incorporated. In order to simply represent such characteristics of W1, W1 is called CSI of long term-wideband attributes (or a long term wideband PMI).

A channel characteristic that is instantaneous compared to W1 is reflected in W2. In other words, W2 may be defined as CSI in which the characteristics of a short term channel in terms of time are reflected, the characteristics of a sub-band channel in terms of frequency are reflected, or the characteristics of a short term channel in terms of time and a sub-band channel in terms of frequency are reflected. In order to simply represent such characteristics of W2, W2 is called CSI of a short term-sub-band attributes (or a short term sub-band PMI).

In order for one final precoding matrix W to be determined based on information about 2 different attributes (e.g., W1 and W2) indicative of a channel state, it is necessary to configure a separate codebook including precoding matrices indicative of channel information about attributes (i.e., a first codebook for W1 and a second codebook for W2). The form of a codebook configured as described above may be called a hierarchical codebook. Furthermore, to determine a codebook to be finally used using the hierarchical codebook may be called hierarchical codebook transformation.

If such a codebook is used, channel feedback of higher accuracy compared to a case where a single codebook is used is made possible. Single cell MU-MIMO and/or multi-cell cooperation communication may be supported using channel feedback of higher accuracy as described above.

Enhanced PMI for MU-MIMO or CoMP

In a next-generation communication standard, such as LTE-A, there has been proposed transmission schemes, such as MU-MIMO and CoMP, in order to achieve a high transfer rate. In order to implement such improved transmission schemes, UE needs to feed more complicated and various CSI back to an eNB.

For example, in MU-MIMO, a CSI feedback method of uploading, by UE-A, the PMI (hereinafter called a "best companion PMI (BCPMI)") of UE to be scheduled along with the UE-A, together with the desired PMI of the UE-A, when the UE-A selects a PMI is taken into consideration.

That is, when co-scheduled UE is used as a precoder in a precoding matrix codebook, it calculates a BCPMI that provides less interference to UE-A and additionally feeds the calculated BCPMI back to an eNB.

The eNB schedules the UE-A and another UE which prefers BCPM (Best Companion Precoding Matrix (BCPM) corresponding to a BCPMI) precoding using the information.

A BCPMI feedback method is divided into explicit feedback and implicit feedback depending on whether feedback payload is present or not.

First, there is an explicit feedback method having feedback payload.

In the explicit feedback method, UE-A determines a BCPMI within a precoding matrix codebook and feeds the BCPMI back to an eNB through a control channel. In one method, UE-A may select an interference signal precoding matrix that maximizes an estimated SINR within a codebook and feed the interference signal precoding matrix back as a BCPMI value.

An advantage of the explicit feedback method is to select a BCPMI more effective in removing interference and to send the selected BCPMI. The reason for this is that, assuming that each of all codewords within a codebook is one interference beam, UE determines a value most effective in removing interference to be a BCPMI by performing comparison on metrics, such as SINRs. A greater feedback payload size is required because candidate BCPMIs are increased as a codebook size is increased.

Second, there is an implicit feedback method not having feedback payload.

In the implicit feedback method, UE-A does not search a codebook for a codeword having the least interference and select the retrieved codebook as a BCPMI, but a corresponding BCPMI is statically determined once a desired PMI is determined In this case, a BCPMI may include vectors orthogonal to the determined desired PMI.

The reason for this is that it is effective to reduce interference from an interference signal when desired PM is selected in directions other than the direction of a PM because the desired PM has been configured in the direction in which the channel gain of a channel H can be maximized in order to maximize a reception SINR. If the channel H is analyzed as a plurality of independent channels through Singular Value Decomposition (SVD), such a BCPMI decision method is further justified. A 4×4 channel H may be decomposed through SVD as in Equation 15 below.

$$H = ULV^H = [u_1 \; u_2 \; u_3 \; u_4] \begin{bmatrix} \lambda_1 & 0 & 0 & 0 \\ 0 & \lambda_2 & 0 & 0 \\ 0 & 0 & \lambda_3 & 0 \\ 0 & 0 & 0 & \lambda_4 \end{bmatrix} \begin{bmatrix} v_1^H \\ v_2^H \\ v_3^H \\ v_4^H \end{bmatrix} \quad \text{[Equation 15]}$$

In Equation 15, U, V is a unitary matrix. $u_i$, $v_i$, and $\lambda_i$ are the 4×1 left singular vector, 4×1 right singular vector, and singular value of a channel H and are arranged in $\lambda_i \geq \lambda_{i+1}$ in descending order. All channel gains which may be theoretically obtained if a beamforming matrix V is used in a transmission end and a beamforming matrix $U^H$ is used in a reception end can be obtained without a loss.

In the case of a rank 1, optimal performance may be obtained from the point of view of an SNR because a channel gain $|\lambda_1|^2$ is obtained when a transmission beamforming vector $v_1$ and a reception beamforming vector u1 are used. For example, it is advantage for UE-A to select a PM most similar to $v_1$ in the case of a rank 1. If a desired PM is ideally matched up with $v_1$, an interference signal can be perfectly removed without a loss of a desired signal by setting a reception beam as $u_1$ and setting the transmission beam of the interference signal in a direction orthogonal to the PM. If there is some difference between a desired PM and $v_1$ due to a quantization error, however, an interference signal may not be perfectly removed without a loss of a desired signal because the transmission beam of the interference signal set in the direction orthogonal to the PM is no longer the same as a beam orthogonal to $v_1$, but it may help control the interference signal if the quantization error is small.

As an example of implicit feedback, if an LTE codebook is used, a BCPMI may be statically determined to be a vector index orthogonal to a PMI.

In this case, it has been assumed that the number of transmission antennas is 4 and UE which has fed the PMI back has a reception rank of 1, and 3 vectors orthogonal to a desired PMI are represented as 3 BCPMIs.

For example if a PMI is 3, a BCPMI is determined to be 0, 1, or 2. The PMI and the BCPMI are indicative of the indices of a 4×1 vector codeword within a codebook. An eNB considers the BCPMI set (BCPMI=0, 1, 2) to be a valid precoding index for removing interference and uses some of or the entire BCPMI set as the precoder of co-schedule UE.

An advantage of an implicit PMI is that there is no additional feedback overhead because a desired PMI and a BCPMI set are mapped in a 1:1 way. However, a BCPM dependent on desired PM may have an error in the direction of an optimal interference removal beam due to the quantization error of the desired PM (i.e., a precoding matrix corresponding to a PMI). If a quantization error is not present, all 3 BCPMs represent interference beams (ideal interference beams) for perfectly removing interference. If a quantization error is present, however, there is a difference between the beam of each of the 3 BCPMs and an ideal interference beam.

Furthermore, a difference between the ideal interference beams of the BCPMs is the same in average, but may be different on a specific moment. For example, if a desired PMI=3, it may be effective to remove an interference signal in order of BCPMIs 0, 1, and 2. In this case, there is a possibility that an eNB unaware of a relative error between the BCPMIs 0, 1, and 2 may determine the BCPMI 2 having the greatest error with an ideal interference beam to be the beam of an interference signal and may perform communication in the state in which strong interference is present between co-scheduled UEs.

General (Device-to-Device) D2D Communication

In general, D2D communication is limitedly used as a term indicative of communication between things or thing intelligence communication. In an embodiment of the present invention, however, D2D communication may include all types of communication between a variety of types of devices having a communication function, such as smart phones and personal computers, in addition to simple devices having a communication function.

FIG. 18 is a diagram conceptually illustrating D2D communication in a wireless communication system to which an embodiment of the present invention may be applied.

FIG. 18*a* shows an existing communication method based on an eNB. UE1 may send data to an eNB in uplink, and the eNB may send data to UE2 in downlink Such a communication method may be called an indirect communication method through an eNB. An Un link (i.e., a link between eNBs or a link between an eNB and a relay node, which may be called a backhaul link), that is, a link defined in an existing wireless communication system, and/or an Uu link (i.e., a link between an eNB and UE or a link between a relay node and UE, which may be called an access link) may be related to the indirect communication method.

FIG. 18*b* shows a UE-to-UE communication method, that is, an example of D2D communication. The exchange of data between UEs may be performed without the intervention of an eNB. Such a communication method may be called a direct communication method between devices. The D2D direct communication method has advantages of reduced latency and the use of lesser radio resources compared to the existing indirect communication method through an eNB.

FIG. 19 shows an example of various scenarios of D2D communication to which a method proposed in this specification may be applied.

A scenario for D2D communication may be basically divided into (1) an out-of-coverage network, (2) a partial-coverage network, and (3) an in-coverage network depending on where UE1 and UE2 are placed within cell coverage (i.e., in-coverage) and out of cell coverage (i.e. out-of-coverage).

The in-coverage network may be divided into an in-coverage-single-cell and an in-coverage-multi-cell depending on the number of cells corresponding to coverage of an eNB.

FIG. 19(a) shows an example of an out-of-coverage network scenario for D2D communication.

The out-of-coverage network scenario means that D2D communication is performed between D2D UEs without control of an eNB.

From FIG. 19(a), it may be seen that only UE1 and UE2 are present and the UE1 and the UE2 perform direct communication.

FIG. 19(b) shows an example of a partial-coverage network scenario for D2D communication.

The partial-coverage network scenario means that D2D communication is performed between D2D UE placed within network coverage and D2D UE placed out of the network coverage.

From FIG. 19(b), it may be seen that UE1 placed within network coverage and UE2 placed out of the network coverage perform communication.

FIG. 19(c) shows an example of an in-coverage-single-cell scenario, and FIG. 19(d) shows an example of an in-coverage-multi-cell scenario.

The in-coverage network scenario means that D2D UEs perform D2D communication through control of an eNB within network coverage.

In FIG. 19(c), UE1 and UE2 are placed within the same network coverage (or cell) and perform D2D communication under the control of an eNB.

In FIG. 19(d), UE1 and UE2 are placed within network coverage, but are placed within different network coverage. Furthermore, the UE1 and the UE2 perform D2D communication under the control of eNBs managing each of network coverage. D2D communication is described in more detail below.

D2D communication may be performed in the scenarios of FIG. 19, but may be commonly performed within network coverage (in-coverage) and out of network coverage (out-of-coverage). A link used for D2D communication (i.e., direct communication between UEs) may be called a D2D link, a directlink, or a sidelink, but is hereinafter generally called a sidelink, for convenience of description.

Sidelink transmission may be performed in an uplink spectrum in the case of FDD and may be performed in an uplink (or downlink) subframe in the case of TDD. Time Division Multiplexing (TDM) may be used for the multiplexing of sidelink transmission and uplink transmission.

Sidelink transmission and uplink transmission are not occured at the same time. Sidelink transmission is not occured in a sidelink subframe which partially or generally overlaps an uplink subframe or UpPTS used for uplink transmission. Furthermore, the transmission and reception of a sidelink are also not occured at the same time.

The structure of an uplink physical resource may be identically used as the structure of a physical resource used for sidelink transmission. However, the last symbol of a sidelink subframe includes a guard period and is not used for sidelink transmission.

A sidelink subframe may include an extended Cyclic Prefix (CP) or a normal CP.

D2D communication may be basically divided into discovery, direct communication, and synchronization.

1) Discovery

D2D discovery may be applied within network coverage (including an inter-cell and an intra-cell). In inter-cell discovery, both synchronous and asynchronous cell deployments may be taken into consideration. D2D discovery may be used for various commercial purposes, such as advertising, issuing coupons, and finding friends, to UE within a proximity region.

If UE 1 has a role of sending a discovery message, the UE 1 sends a discovery message, and UE 2 receives the discovery message. The transmission and reception roles of the UE 1 and the UE 2 may be changed. Transmission from the UE 1 may be received by one or more UE(s), such as the UE 2.

The discovery message may include a single MAC PDU. In this case, the single MAC PDU may include a UE ID and an application ID.

A physical sidelink discovery channel (PSDCH) may be defined as a channel for sending the discovery message. The structure of a PUSCH may be reused as the structure of the PSDCH.

Two types Type 1 and Type 2 may be used as a resource allocation method for D2D discovery.

In the case of Type 1, an eNB may allocate a resource for sending a discovery message in a non-UE-specific way.

To be specific, a radio resource pool comprising a plurality of subframe sets and a plurality of resource block sets for transmitting and receiving a discovery message within a specific period (in what follows, 'discovery period') is allocated, and a discovery transmitting UE selects a specific resource within the radio resource pool in an arbitrary manner and transmits a discovery message.

The periodic discovery resource pool can be allocated for transmission of a discovery signal in a semi-static manner. The configuration information of a discovery resource pool for discovery transmission includes a discovery period, a subframe set which can be used for transmission of a discovery signal within the discovery period, and information about a resource block set. The configuration information of the discovery resource pool can be transmitted to the UE through upper layer signaling. In the case of an in-coverage UE, the discovery resource pool for discovery transmission is set up by an eNB and can be informed to the UE through RRC signaling (for example, System Information Block (SIB)).

The discovery resource pool allocated for discovery within one discovery period can be multiplexed to a time-frequency resource block of the same size through TDM and/or FDM scheme, where the time-frequency resource block of the same size can be called a 'discovery resource'. A discovery resource can be set as one subframe unit and include two Physical Resource Blocks (PRBs) per slot in each subframe. One UE can use one discovery resource for transmission of a discovery MAC PDU.

Also, a UE can transmit a discovery signal repeatedly within a discovery period for transmission of one transport block. Transmission of a MAC PDU by one UE can be repeated (for example, four times) contiguously or noncontiguously within the discovery period (namely radio resource pool). The transmission times of a discovery signal for one transmission block can be transmitted to the UE through upper layer signaling.

UE may randomly select a first discovery resource in a discovery resource set which may be used for the repetitive transmission of an MAC PDU and may determine the remaining discovery resources in relation to the first discovery resource. For example, a specific pattern may be previously determined, and a next discovery resource may be determined according to the predetermined specific pattern depending on the position of a discovery resource first selected by UE. Alternatively, UE may randomly select each discovery resource within a discovery resource set which may be used for the repetitive transmission of an MAC PDU.

In the case of Type 2, a resource for discovery message transmission is allocated in a UE-specific way. Type 2 is subdivided into Type-2A and Type-2B. Type-2A is a method of allocating, by an eNB, a resource at the instance at which UE sends a discovery message within a discovery cycle, and Type-2B is a method of allocating resources semi-persistently.

In the case of Type-2B, RRC_CONNECTED UE requests an eNB to allocate a resource for the transmission of a D2D discovery message through RRC signaling. Furthermore, the eNB may allocate the resource through RRC signaling. When the UE transits to an RRC_IDLE state or when the eNB withdraws resource allocation through RRC signaling, the UE releases the most recently allocated transmission resource. As described above, in the case of Type-2B, a radio resource may be allocated through RRC signaling, and the activation/deactivation of an allocated radio resource may be determined by a PDCCH.

A radio resource pool for receiving a discovery message may be configured by an eNB, and UE may be notified of the configured radio resource pool through RRC signaling (e.g., a System Information Block (SIB)).

Discovery message reception UE monitors both the aforementioned discovery resource pools of Type 1 and Type 2 in order to receive a discovery message.

2) Direct Communication

The region to which D2D direct communication is applied includes a network coverage edge area (i.e., edge-of-coverage) in addition to inside and outside network coverage (i.e., in-coverage and out-of-coverage). D2D direct communication may be used for purposes, such as Public Safety (PS).

If UE 1 has a role of direct communication data transmission, the UE 1 sends direct communication data, and UE 2 receives the direct communication data. The transmission and reception roles of the UE 1 and the UE 2 may be changed. The direct communication transmission from the UE 1 may be received by one or more UE(s), such as the UE 2.

D2D discovery and D2D communication may be independently defined without being associated with each other. That is, in groupcast and broadcast direct communication, D2D discovery is not required. If D2D discovery and D2D direct communication are independently defined as described above, UEs do not need to perceive adjacent UE. In other words, in the case of groupcast and broadcast direct communication, all reception UEs within a group are not required to be adjacent to each other.

A physical sidelink shared channel (PSSCH) may be defined as a channel for sending D2D direct communication data. Furthermore, a physical sidelink control channel (PSCCH) may be defined as a channel for sending control information (e.g., Scheduling Assignment (SA), a transmission format for direct communication data transmission, etc) for D2D direct communication. The structure of a PUSCH may be reused as the structures of the PSSCH and the PSCCH.

Two types of mode 1 and mode 2 may be used as a resource allocation method for D2D direct communication.

Mode 1 refers to a method of scheduling, by an eNB, data for D2D direct communication by UE or a resource used for UE to send control information. Mode 1 is applied to in-coverage.

An eNB configures a resource pool for D2D direct communication. In this case, the resource pool for D2D communication may be divided into a control information pool and a D2D data pool. When an eNB schedules control information and a D2D data transmission resource within a pool configured for transmission D2D UE using a PDCCH or ePDCCH(enhanced PDCCH), the transmission D2D UE sends control information and D2D data using the allocated resource.

Transmission UE requests a transmission resource from an eNB. The eNB schedules a resource for sending control information and D2D direct communication data. That is, in the case of mode 1, the transmission UE needs to be in the RRC_CONNECTED state in order to perform D2D direct communication. The transmission UE sends a scheduling request to the eNB, and a Buffer Status Report (BSR) procedure is performed so that the eNB may determine the amount of resources requested by the transmission UE. Reception UEs monitors a control information pool. When decoding control information related to reception UE, the reception UE may selectively decode D2D data transmission related to corresponding control information. The reception UE may not decode a D2D data pool based on a result of the decoding of the control information.

Mode 2 refers to a method of randomly selecting, by UE, a specific resource in a resource pool in order to send data or control information for D2D direct communication. Mode 2 is applied to out-of-coverage and/or edge-of-coverage.

In mode 2, a resource pool for sending control information and/or a resource pool for sending D2D direct communication data may be pre-configured or may be configured semi-statically. UE is supplied with a configured resource pool (time and frequency) and selects a resource for D2D communication transmission in the resource pool. That is, the UE may select a resource for control information transmission in a control information resource pool in order to send control information. Furthermore, the UE may select a resource in a data resource pool in order to send D2D direct communication data.

In D2D broadcast communication, control information is transmitted by broadcasting UE. Control information is explicitly and/or implicitly indicative of the position of a resource for data reception in relation to a physical channel (i.e., a PSSCH) on which D2D direct communication data is carried.

3) Synchronization

A D2D Synchronization Signal/sequence (D2DSS) can be used by a UE to obtain time-frequency synchronization. In particular, since the eNB is unable to control a UE located beyond network coverage, a new signal and procedure can be defined to establish synchronization among UEs. A D2D synchronization signal can be called a sidelink synchronization signal.

A UE transmitting a D2D synchronization signal periodically can be called a D2D synchronization source or a sidelink synchronization source. In case a D2D synchronization source is an eNB, the structure of a D2D synchronization signal being transmitted can be identical to that of PSS/SSS. In case the D2D synchronization source is not an eNB (for example, a UE or GNSS (Global Navigation Satellite System)), the structure of a D2D synchronization signal being transmitted can be newly defined. The D2D synchronization signal is transmitted periodically with a period not shorter than 40 ms. Each UE can have a physical-layer D2D synchronization identity. The physical-layer D2D synchronization identifier may be called a physical-layer sidelink synchronization identity or simply a D2D synchronization identifier.

The D2D synchronization signal includes a D2D primary synchronization signal/sequence and a D2D secondary synchronization signal/sequence. These signals can be called a primary sidelink synchronization signal and a secondary sidelink synchronization signal, respectively.

Before transmitting a D2D synchronization signal, the UE may first search for a D2D synchronization source. If a D2D synchronization source is found, the UE can obtain time-frequency synchronization through a D2D synchronization signal received from the D2D synchronization source found. And the corresponding UE can transmit the D2D synchronization signal.

In D2D communication, direct communication between two devices is described below as an example, for clarity, but the scope of the present invention is not limited thereto. The same principle described in an embodiment of the present invention may be applied to D2D communication between a plurality of two or more devices.

Distributed Discovery Method

One of D2D discovery methods includes a method (hereinafter called "distributed discovery") of performing, by all UEs, discovery in a distributed way. The method of performing distributed D2D discovery means a method of autonomously determining, by all UEs, discovery resources and sending and receiving discovery messages unlike a method of determining resource selection at one place (e.g., an eNB, UE, or a D2D scheduling device) as in a centralized method.

Hereinafter, a signal (or message) periodically transmitted by UEs for D2D discovery may be hereinafter called a discovery message, discovery signal, or beacon. The signal is generally called a discovery message, for convenience of description.

In distributed discovery, a dedicated resource may be periodically allocated as a resource for allowing UE to send and receive a discovery message, separately from a cellular resource. This is described below with reference to FIG. 21.

FIG. 20 shows an example in which discovery resources have been allocated according to an embodiment of the present invention.

Referring to FIG. 20, in the distributed discovery method, a discovery subframe (i.e., a "discovery resource pool") 2001 for discovery in all cellular uplink frequency-time resources is allocated fixedly (or dedicatedly), and the remaining region may consist of an existing LTE uplink Wide Area Network (WAN) subframe region 2003. The discovery resource pool may include one or more subframes.

The discovery resource pool may be periodically allocated at a specific time interval (i.e., "discovery cycle"). Furthermore, the discovery resource pool may be repeatedly configured within one discovery cycle.

FIG. 20 shows an example in which a discovery resource pool is allocated in a discovery cycle of 10 sec and 64 contiguous subframes are allocated to each discovery resource pool, but a discovery cycle and the size of time/frequency resources of a discovery resource pool are not limited thereto.

UE autonomously selects a resource (i.e., "discovery resource") for sending its discovery message in a dedicated allocated discovery pool and sends the discovery message through the selected resource. This is described below with reference to FIG. 21.

FIG. 21 is a simplified diagram illustrating a discovery process according to an embodiment of the present invention.

Referring to FIGS. 20 and 21, a discovery method basically includes a 3-step procedure, such as a resource sensing step S2101 for discovery message transmission, a resource selection step S2103 for discovery message transmission, and a discovery message transmission and reception step S2105.

First, in the resource sensing step S2101 for discovery message transmission, all UEs performing D2D discovery receive (i.e., sense) all discovery messages in a distributed way (i.e., autonomously) during 1 cycle (period) of a D2D discovery resource (i.e., a discovery resource pool). For example, assuming that an uplink bandwidth is 10 MHz in FIG. 20, all UEs receive (i.e., sense) all discovery messages transmitted in N=44 RBs (6 RBs of a total of 50 RBs are used for PUCCH transmission because the entire uplink bandwidth is 10 MHz) during K=64 msec (64 subframes).

Furthermore, in the resource selection step S2103 for discovery message transmission, UE selects resources that belong to the sensed resources and that have a low energy level and randomly selects a discovery resource within a specific range (e.g., within lower x % (x=a specific integer, 5, 7, 10, . . . )) from the selected resources.

A discovery resource may include one or more resource blocks having the same size and may be multiplexed within a discovery resource pool in a TDM and/or FDM way.

The reason why the UE selects the resources having a low energy level as the discovery resources may be considered to mean that UEs do not use the same D2D discovery resource a lot nearby in the case of resources of a low energy level. That is, this disprove that the number of UEs performing D2D discovery procedures that causes interference is not many nearly. Accordingly, if resources having a low energy level are selected as described above, there is every probability that interference is small when a discovery message is transmitted.

Furthermore, the reason why a resource having the lowest energy level is not selected, but discovery resources are randomly selected within a predetermined range (i.e., within lower x %) is that there is a possibility that if a resource having the lowest energy level is selected, several UEs may select the same resource corresponding to the lowest energy level at the same time. That is, a lot of interference may be caused because UEs select the same resource corresponding to the lowest energy level. Accordingly, a discovery resource may be randomly selected within a predetermined range (i.e., configuring a candidate pool for selectable resources). In this case, for example, the range of the energy level may be variably configured depending on the design of a D2D system.

Furthermore, in the discovery message transmission and reception step S2105, that is, the last step, the UE sends and receives discovery messages based on the discovery resource after a discovery cycle (after P=10 seconds in FIG. 20) and periodically sends and receives discovery messages depending on a random resource hopping pattern in subsequent discovery cycles.

Such a D2D discovery procedure continues to be performed even in an RRC_IDLE state not having connection with an eNB as well as in an RRC_CONNECTED state in which the UE has connection with the eNB.

If such a discovery method is taken into consideration, all UEs senses all resources (i.e., discovery resource pools) transmitted by surrounding UEs and randomly selects discovery resources from all the sensed resources within a specific range (e.g., within lower x %).

The above method has a disadvantage in that all resources being used by all UEs in addition to surrounding UEs must be received for D2D discovery regardless of the distance between the UEs. That is, each UE is unable to be aware that it has to send a discovery message to which place because all UEs randomly select discovery resource. Accordingly, all the UEs has to determine whether to detect discovery resources by monitoring whether a signal is present in corresponding resources over the entire bandwidth and during the entire given time or has to attempt to detect the discovery resources. Practically, it is important to check that surrounding UEs rather than UE placed at a remote place send discovery messages through which discovery resources in order to send resources for D2D discovery, but the positions of UEs are unaware in a D2D discovery step. Furthermore, a method of exchanging pieces of position information about all UEs between the UEs using a specific resource periodically is inefficient.

That is, there is an inefficient problem if all UEs receive the entire D2D discovery resource pool and sense the entire discovery resource pool in a lump as in the aforementioned method.

Hereinafter, an embodiment of the present invention proposes a method of determining a discovery resource using a Reference Signal (RS).

In 3GPP LTE/LTE-A systems, in order to manage signaling connection between UE and a network, an EPS Connection Management (ECM)-CONNECTED state and an ECM-IDLE state are defined. The ECM-CONNECTED state and the ECM-IDLE state may be applied to UE and an MME. ECM connection includes RRC connection established between UE and an eNB and S1 signaling connection established between an eNB and an MME. An RRC state indicates whether the RRC layer of UE and the RRC layer of an eNB have been logically connected. That is, if the RRC layer of UE is connected to the RRC layer of an eNB, the UE is in an RRC-CONNECTED state. If the RRC layer of the UE is not connected to the RRC layer of the eNB, the UE is in an RRC-IDLE state.

A network is able to know the presence of UE in the ECM-CONNECTED state in a cell unit and effectively controlling the UE. That is, when the UE is in the ECM-CONNECTED state, the mobility of the UE is managed by a command from the network. In the ECM-CONNECTED state, the network is aware of a cell to which the UE belongs. Accordingly, the network may send and/or receive data to the UE and/or from the UE, may control mobility, such as the handover of the UE, and may perform cell measurement on surrounding cells.

In contrast, a network is unable to know the presence of UE in the ECM-IDLE state and a Core Network (CN) manages the UE in a tracking area unit, that is, an area unit greater than a cell. When the UE is in the ECM-IDLE state, the UE performs discontinuous reception (DRX) configured by an NAS using an ID uniquely allocated in the tracking area. That is, the UE may receive the broadcasting of system information and paging information by monitoring a paging signal in a specific paging opportunity for each UE-specific paging DRX cycle. Furthermore, when the UE is in the ECM-IDLE state, a network does not have context information about the UE. Accordingly, the UE in the ECM-IDLE state may perform a mobility-related procedure based on the UE, such as cell selection or cell reselection, without a need to receive a command from the network. In the ECM-IDLE state, if the position of the UE is different from a position known to the network, the UE may notify the network of the position of the UE through a Tracking Area Update (TAU) procedure.

As described above, the D2D discovery procedure needs to continue to be performed even in the RRC_IDLE state in which UE does not have connection with an eNB as well as in the RRC_CONNECTED state in which the UE has connection with the eNB.

In 3GPP LTE/LTE-A systems, all UEs continue to receive a Reference Signal (RS) periodically broadcasted by an eNB within a cell in downlink After being powered on, UE receives an RS regardless of the RRC_CONNECTED state or the RRC_IDLE state.

UE in the RRC_IDLE state continues to perform cell selection (or cell reselection) based on an RS as they move. If the UE moves out of a Tracking Area (TA) including several cells, it performs a TA update procedure over a network. UE in the RRC_CONNECTED state performs a handover procedure based on an RS when it moves between eNBs in the state in which the UE has connection with an eNB. This is described in detail below with reference to FIG. 22.

FIG. 22 is a diagram illustrating UEs for receiving a reference signal according to an embodiment of the present invention.

Referring to FIG. 22, all UEs periodically receive an RS from an eNB and calculate Reference Signal Received Power (RSRP) based on the received RS. If the UEs are placed at the center of the eNB and receive strong RS in the state in which they are close to the eNB, high reception power appears. That is, RSRP is measured as being a high value.

If UE moves to the coverage edge area of the eNB and the distance between the eNB and the UE becomes distant, the intensity of the RS received by the UE through pathloss becomes weak. That is, RSRP is measured as being a low value. If the UE moves toward the edge of the eNB during such a process of continuing to receive the RS and measured RSRP becomes lower than a predetermined reception threshold, the UE receives the RSs of surrounding eNBs and performs cell reselection or a handover procedure depending on its RRC state.

Such a TA update or handover procedure is performed separately from a D2D discovery process in which uplink is used, and it continues to be performed as the UE moves through downlink In the example of FIG. 22, it is assumed that reception power of RS transmitted from an eNB is 60 dbm at the center of a cell closest to the eNB and is −60 dbm near a cell edge farthest from the eNB. It is assumed that in the case of UE 1, reception power of the RS is 30 dbm because the UE1 is placed close to the eNB, in the case of UE 2 and UE 4, reception power of the RS is 0 dbm because the UE2 and the UE4 are placed in the middle of the eNB and the cell edge, and in the case of UE 3, reception power of the RS is −30 dbm because the UE3 is placed near the cell edge.

If UEs have similar RSRP values as described above, this means that the pathloss of an RS may be present near the position where the UEs are placed if the pathloss of the RS is taken into consideration. That is, there is a good possibility that the UEs may be concentrically present around an eNB or around UE which sends the RS. In other words, there is a high probability that UEs having similar RSRP may be adjacent to each other in position.

D2D discovery may be performed mainly for surrounding UEs. Accordingly, if such RSRP information is used, UEs may perform D2D discovery mainly for surrounding UEs even without the exchange of position information through the Global Positioning Systems (GPSs) of the UEs or the exchange of position information between UEs for discovery.

Hereinafter, an embodiment of the present invention proposes a method of determining, by UE, a specific resource area to be sensed within a D2D discovery resource pool based on cell measurement results measured using a received RS (e.g., a CRS or a CSI-RS) and selecting a discovery resource in the specific resource area. In this case, the cell measurement results include measured results, such as Radio Link Monitoring (RLM), Radio Resource Management (RRM) (e.g., RSRP, Reference Signal Received Quality (RSRQ), a Received Signal Strength Indicator (RSSI)), Channel State Information (CSI) (e.g., a CQI, a PMI, and an RI), and pathloss.

If a D2D discovery resource area is allocated based on signal information transmitted by a network using the method proposed by an embodiment of the present invention as described above, a sensing duration can be reduced and surrounding UEs can be discovered more rapidly and efficiently.

FIG. 23 is a diagram illustrating a method for sensing a D2D discovery message according to an embodiment of the present invention.

Referring to FIG. 23, UE receives discovery resource area configuration information from an eNB at step S2301.

In this case, the discovery resource area means a candidate region, which is sensed in order for the UE to select a discovery resource in a discovery resource pool based on measured cell measurement information and in which the UE selects the discovery resource. In other words, the discovery resource pool means a resource area which is used by UEs, grouped based on cell measurement information, for a discovery procedure by group.

The discovery resource area may be determined to be divided (or segmented) into a combination of one or more of a frequency domain, a time domain, and a partial region. For example, in the example of FIG. 20, assuming that an uplink bandwidth is 10 MHz, a total of 44 RBs are used as a discovery resource pool, and a discovery resource area is segmented in a frequency domain, 4 discovery resource areas may be configured every 11 RBs in the frequency domain. Furthermore, in the example of FIG. 20, assuming that 64 subframes are used as a discovery resource pool and a discovery resource area is segmented in a time domain, 4 discovery resource areas may be configured every 16 subframes in the time domain. A method for configuring a discovery resource area is described in more detail below.

Such a discovery resource area may be dynamically configured for each discovery resource pool. Alternatively, the discovery resource area may be semi-statically configured by one or more discovery cycles.

Furthermore, the discovery resource area may be configured in a cell-specific way and applied to UEs belonging to a corresponding cell in common or may be configured to each UE in a UE-specific way.

Configuration information about a discovery resource area configured as described above may be periodically broadcasted to UE as system information, such as a System Information Block (SIB) or a Master Information Block (MIB). Furthermore, the configuration information may be transmitted to the UE through RRC signaling or a physical layer channel (e.g., a PDCCH or PDSCH).

Configuration information about a discovery resource area means information indicative of the relationship (i.e., mapping information) between cell measurement information measured by UE and the discovery resource area. Furthermore, the configuration information may be represented in the form of an equation or rule for determining the discovery resource area based on cell measurement information calculated by the UE. For example, if the region of a resource is allocated based on a specific RSRP value, information indicating that a discovery resource area is used according to the range of RSRP based on an RB index No. 22 in the case of RSRP 0 dbm may be transmitted to an eNB.

More specifically, the mapping relationship (or equation or rule) between a discovery resource area and a cell measurement value (or the range of a cell measurement value) corresponding to the discovery resource area is described below. For example, it is assumed that an uplink frequency domain is 10 MHz, 44 RBs (e.g., an RB index No. 4 to an RB index No. 47) of a total of 50 RBs (e.g., an RB index No. 1 to an RB index No. 50) are configured as a discovery resource pool in a frequency domain, and a discovery resource area is sorted based on RSRP in the frequency domain. In this case, mapping information (or an equation or rule indicative of such a relationship), indicating that the discovery resource area is determined to be a group A (from the RB index No. 4 to the RB index No. 18) if a measured value of RSRP corresponds to a range "a" (e.g., −60 dbm or more to less than −20 dbm), the discovery resource area is determined to be a group B (from the RB index No. 19 to the RB index No. 32) if the measured value of RSRP corresponds to a range "b" (−20 dbm or more to less than 20 dbm), and the discovery resource area is determined to be a group C (from the RB index No. 33 to the RB index No. 47) if the measured value of RSRP corresponds to a range "c" (20 dbm or more to 60 dbm or less), may be transmitted to the UE.

In this case, a cell measurement value (or the range of a cell measurement value or threshold) may be represented as follows.

In the example of FIG. 22, it is assumed that an RSRP value has a range from a maximum of 60 dbm to a minimum of −60 dbm and the range of RSRP is set as −60 dbm or more to less than −20 dbm, −20 dbm or more to less than 20 dbm, and 20 dbm or more to 60 dbm.

In this case, a value, that is, the reference point of each RSRP range, and a value for specifying a range of RSRP to which each reference point belongs may be used. For example, −40 dbm, 0 dbm, and 40 dbm may be transmitted to the UE as values, that is, the respective reference points of the RSRP ranges. 40 dbm (or 20 dbm (if higher and lower values are the same)) may be transmitted to the UE as a value for specifying a range of RSRP to which each reference point belongs.

Furthermore, the start value of the entire RSRP range and a value for indicating each RSRP range may be used. For example, −60 dbm may be transmitted to the UE as the start value of the entire RSRP range, and 40 dbm may be transmitted to the UE as the value for indicating each range. In this case, the UE may recognize that the RSRP range is set every 40 dbm starting from −60 dbm.

Furthermore, only the start value of each RSRP range may be used. For example, −60 dbm, −20 dbm, and 20 dbm may be transmitted to the UE as the respective start values of the RSRP ranges. In this case, the UE may recognize that the RSRP ranges are set to −60 dbm or more to less than −20 dbm, −20 dbm or more to less than 20 dbm, and 20 dbm or more to 60 dbm, respectively.

Furthermore, information for specifying the discovery resource area may be represented as follows. It is assumed that an uplink frequency domain is 10 MHz, 44 RBs of a total of 50 RBs are configured as a discovery resource pool in a frequency domain, and a discovery resource area is configured every 11 RBs in the frequency domain.

In this case, a resource index, that is, the reference point of each discovery resource area, and information for specifying the range of a discovery resource area to which each reference point belongs may be used. For example, the RB index No. 9, the RB index No. 20, the RB index No. 31, and the RB index No. 42 may be transmitted to the UE as respective resource indices, that is, the reference points of discovery resource areas. 11 RBs (or 5 RBs if higher and lower values are the same) may be transmitted to the UE as the range of a discovery resource area to which each reference point belongs.

Furthermore, a resource index at which the entire discovery resource area is started and information for indicating the range of each discovery resource area may be used. For example, the RB index No. 4 may be transmitted to the UE as a resource index at which the entire discovery resource area is started. 11 RBs may be transmitted to the UE as information for indicating the range of each discovery resource area. In this case, the UE may recognize that a discovery resource area has been configured every 11 RBs starting from the RB index No. 4.

Furthermore, only a resource index at which each discovery resource area is started may be used. For example, the RB index No. 4, the RB index No. 15, the RB index No. 26, and the RB index No. 37 may be transmitted to the UE as resource indices at which respective discovery resource areas are started. In this case, the UE may recognize that the discovery resource areas are configured from the RB index No. 4 to the RB index No. 14, from the RB index No. 15 to the RB index No. 25, from the RB index No. 26 to the RB index No. 36, and from the RB index No. 37 to the RB index No. 47, respectively.

At step S2303, the UE receives an RS periodically transmitted by the eNB and measures a cell based on the RS. Furthermore, the UE determines a discovery resource area to which the UE belongs based on the calculated cell measurement information and the discovery resource area configuration information received at step S2301.

In this case, the UE may determine the discovery resource area to which the UE belongs based on a value measured using a signal (e.g., a discovery message or a synchronization signal) transmitted by another UE other than the RS transmitted by the eNB and the discovery resource area configuration information received at step S2301.

Furthermore, the UE may determine the discovery resource area by taking into consideration both the value measured using a signal transmitted by the eNB or another UE and a cell recognizer/identifier.

The UE senses a discovery resource within the determined discovery resource area at step S2305. That is, the UE receives (i.e., senses) all discovery messages transmitted in the discovery resource area determined at step S2303.

At step S2307, the UE selects a resource for discovery message transmission within the discovery resource area determined at step S2303.

The UE searches the resources, sensed at step S2305, for resources having a low energy level and randomly selects a discovery resource within a specific range (e.g., low x % (x=a specific integer, 5, 7, 10, . . . )) in the retrieved resources.

Furthermore, the UE may receive a subframe configuration set, allocated by the eNB, for sending a discovery message and select the discovery resource randomly or based on a specific probability within the allocated subframe configuration set.

The UE transmits the discovery message in the selected discovery resource at step S2309. Furthermore, in a subsequent discovery cycle, the UE periodically sends and receives a discovery message according to a random resource hopping pattern.

A method for configuring a discovery resource area is described in detail below with reference to drawings.

An embodiment in which UE configures a discovery resource area based on measured RSRP using a CRS transmitted by an eNB is mostly described below, for convenience of description, but the present invention is not limited thereto.

FIG. 24 shows an example in which discovery resource areas are distinctly configured according to an embodiment of the present invention.

In FIG. 24, small squares indicate discovery resources now used by other UEs, and different patterns of the squares indicate that the discovery resources are used by different UEs.

In FIG. 24, it is assumed that a discovery resource pool 2401 is configured to include 44 RB pairs in a frequency domain and configured to include 64 subframes in a time domain. Furthermore, it is assumed that the discovery resource pool 2401 is divided into discovery resource areas based on subbands in the frequency domain based on the RSRP values of RSs received by UEs. Furthermore, as in FIG. 22, it is assumed that three UEs are present and each discovery resource area is divided into three frequency domains for each UE. Furthermore, as in FIG. 22, it is assumed that if the entire range of RSRP is −60 dbm to 60 dbm in a corresponding cell, RSRP ranges mapped to the respective discovery resource area are −60 dbm~−30 dbm, −30 dbm 18 30 dbm, and 30 dbm~60 dbm.

Referring to FIG. 24, in the case of UE1, RSRP of the received RS may have a value of about 60 dbm because the UE1 is placed at the center of an eNB. In this case, the UE1 may configure a resource area, mapped to the RSRP range of 30 dbm~60 dbm, as a sensing window (i.e., a discovery resource area A) 2403. That is, UEs having the RSRP measurement value of 30 dbm~60 dbm are determined to be placed in the discovery resource area A 2403 mapped to the RSRP measurement value of 30 dbm~60 dbm.

Furthermore, in the case of UE2, RSRP of the received RS may have a value of about 0 dbm because the UE2 is placed at a point further distant from the center of the eNB. In this case, the UE2 may configure a resource area, mapped to the RSRP range of −30 dbm~30 dbm, as a discovery resource area B 2405. That is, UEs having the RSRP measurement value of −30 dbm~30 dbm are determined to be placed in the discovery resource area B 2405 mapped to the RSRP measurement value of −30 dbm~30 dbm.

Furthermore, in the case of UE3, RSRP of the received RS may have a value of about −60 dbm because the UE3 is placed in the coverage edge of the eNB. In this case, the UE3 may configure a resource area, mapped to the RSRP range of −60 dbm~−30 dbm, as a discovery resource area C 2407. That is, UEs having the RSRP measurement value of −60 dbm~−30 dbm are determined to be placed in the discovery resource area C 2407 mapped to the RSRP measurement value of −60 dbm~−30 dbm.

Furthermore, each UE senses a discovery message resource within the configured discovery resource area (or sensing window) range and selects a discovery resource for sending its discovery message within the discovery resource area (or sensing window) range.

In FIG. 24, the discovery resource areas have been illustrated as being contiguously configured in the frequency domain, but they may not be contiguously (e.g., a discontiguous RB group) configured in the frequency domain.

Furthermore, in FIG. 24, the discovery resource areas have been illustrated as not overlapping, but the present invention is not limited thereto. Adjacent discovery resource areas may overlap.

In the method proposed with reference to FIG. 24, UEs have been illustrated as being grouped based on RSRP. In some embodiments, UEs may be grouped by taking into consideration a cell recognizer/identifier (e.g., a cell ID) along with RSRP with consideration taken of the operation of UE for performing discovery (or direct communication) with another cell. That is, UEs may be grouped by taking into consideration that corresponding UE belongs to which cell along with RSRP measured by the UE when the UE forms a group. Accordingly, in general, in the case of UE placed at the center of a cell, grouping is performed by taking into consideration a corresponding cell ID having strong RSRP. However, in the case of UE placed at the edge of the cell, grouping may be performed by taking into consideration a neighbor cell ID along with RSRP of the UE.

More specifically, assuming that multiple cells have been synchronized, a cell ID may be used as the factor of a grouping rule function for resource selection. For example, discovery resource areas may be configured by forming groups in such a manner that a cell 1 is determined to be a group 1 if the cell 1 (in particular, in the case of UE placed at the edge of a cell) has maximum RSRP and a cell 2 is determined to be a group 2 if the cell 2 has maximum RSRP.

Referring back to the example of FIG. 24, if RSRP of the RS of a cell to which UE now belongs is a maximum, the discovery resource area A 2403 and the discovery resource area B 2405 may be allocated. If RSRP of the RS of a neighbor cell is a maximum, the discovery resource area C 2407 may be allocated. Furthermore, which one of the discovery resource area A 2403 and the discovery resource area B 2405 will be determined may be determined based on the value of RSRP of the RS of a cell to which UE now belongs.

In some embodiments, a UE grouping rule may be determined by performing comparison on received RSRP thresholds instead of a cell ID. In other words, a case where RSRP is a predetermined threshold or more may be defined to be included in a group Ai (i=1, 2, 3, . . . ) and a case where RSRP is less than the predetermined threshold may be defined to be included in a group Bi (i=1, 2, 3, . . . ) regardless of a cell ID (when the number of UE groups (i.e., discovery resource areas) is plural). For example, if the number of UE groups is 4, the number of groups used by UEs placed at the centers of respective cells may be defined to be 3 and the number of groups used by UEs placed at the edges of the cells may be defined to be 1 based on RSRP values, and discovery resource areas may be selected.

In the example of FIG. 24, assuming that a predetermined threshold is −30 dbm, the discovery resource area A 2403 and the discovery resource area B 2405 may be allocated to UEs placed at the centers of cells. Furthermore, the discovery resource area C 2407 may be allocated to UEs placed at the edge area of the cell.

Furthermore, if 5 UE groups are defined by taking into consideration discovery between multiple cells and UEs are included in the groups, 4 of the 5 UE groups may include UEs slightly closer to cell centers, and the remaining one UE group may include UEs placed cell edges and UEs placed at the edge of a neighbor cell. That is, if discovery between multiple cells is taken into consideration, a group to which UE at a cell edge belongs may include UE (in particular, UE close in distance) placed at the cell edge of a neighbor cell (e.g., a cell selected based on the intensity of a synchronization signal and/or the intensity of RSRP) in addition to UE belonging to the same cell. That is, inter-cell discovery is possible (on the assumption of synchronization between cells) because UEs placed in the edge area of a neighbor cell have mutual proximity although they belong to different cells. Accordingly, UEs belonging to different cells may be defined as one group. Accordingly, a discovery message can be transmitted in the same discovery resource area, and adjacent UE can be discovered by searching for a corresponding discovery resource area from the point of view of reception.

In the example of FIG. 24, the discovery resource area A 2403 and the discovery resource area B 2405 may be allocated to UEs placed in the centers of cells. Furthermore, the discovery resource area C 2407 may be allocated to UE placed in a cell edge area and UE placed at the edge area of a neighbor cell.

FIG. 25 shows an example in which discovery resource areas are distinctly configured according to an embodiment of the present invention.

In FIG. 25, small squares indicate discovery resources now used by other UEs, and different patterns of the squares indicate that the discovery resources are used by different UEs.

In FIG. 25, it is assumed that a discovery resource pool 2501 is configured to include 44 RB pairs in a frequency domain and configured to include 64 subframes in a time domain. Furthermore, it is assumed that the discovery resource pool 2501 is divided into discovery resource areas for each slot in the time domain based on the RSRP values of RSs received by UEs. Furthermore, as in FIG. 22, it is assumed that three UEs are present and each discovery resource area is divided into three time domains for each UE. Furthermore, as in FIG. 22, it is assumed that if the entire range of RSRP is −60 dbm to 60 dbm in a corresponding cell, RSRP ranges mapped to the respective discovery resource area are −60 dbm~−30 dbm, −30 dbm~30 dbm, and 30 dbm~60 dbm.

Referring to FIG. 25, in the case of UE1, RSRP of the received RS may have a value of about 60 dbm because the UE1 is placed at the center of an eNB. In this case, the UE1 may configure a resource area (i.e., a first slot interval), mapped to the RSRP range of 30 dbm~60 dbm, as a sensing window (i.e., a discovery resource area A) 2503. That is, UEs having the RSRP measurement value of 30 dbm~60 dbm are determined to be placed in the discovery resource area A 2503 mapped to the RSRP measurement value of 30 dbm~60 dbm.

Furthermore, in the case of UE2, RSRP of the received RS may have a value of about 0 dbm because the UE2 is placed at a point further distant from the center of the eNB. In this case, the UE2 may configured a resource area (i.e., a second slot interval), mapped to the RSRP range of −30 dbm~30 dbm, as a discovery resource area B 2505. That is, UEs having the RSRP measurement value of −30 dbm~30 dbm are determined to be placed in the discovery resource area B 2505 mapped to the RSRP measurement value of −30 dbm~30 dbm.

Furthermore, in the case of UE3, RSRP of the received RS may have a value of about −60 dbm because the UE3 is placed in the coverage edge of the eNB. In this case, the UE3 may configure a resource area (i.e., a third slot interval), mapped to the RSRP range of −60 dbm~−30 dbm, as a discovery resource area C 2507. That is, UEs having the RSRP measurement value of −60 dbm~−30 dbm are determined to be placed in the discovery resource area C 2507 mapped to the RSRP measurement value of −60 dbm~−30 dbm.

Furthermore, each UE senses a discovery message resource within the configured discovery resource area (or sensing window) range and selects a discovery resource for sending its discovery message within the discovery resource area (or sensing window) range.

In FIG. 25, the discovery resource areas have been illustrated as being contiguously configured in the time domain, but they may not be contiguously (e.g., a discontiguous RB group) configured in the time domain.

Furthermore, in FIG. 25, the discovery resource areas have been illustrated as not overlapping, but the present invention is not limited thereto. Adjacent discovery resource areas may overlap.

In the method proposed with reference to FIG. 25, UEs have been illustrated as being grouped based on RSRP. In some embodiments, UEs may be grouped by taking into consideration a cell recognizer/identifier (e.g., a cell ID) along with RSRP with consideration taken of the operation of UE for performing discovery (or direct communication) with another cell. That is, UEs may be grouped by taking into consideration that corresponding UE belongs to which cell along with RSRP measured by the UE when the UE forms a group. Accordingly, in general, in the case of UE placed at the center of a cell, grouping is performed by taking into consideration a corresponding cell ID having strong RSRP. However, in the case of UE placed at the edge of the cell, grouping may be performed by taking into consideration a neighbor cell ID along with RSRP of the UE.

More specifically, assuming that multiple cells have been synchronized, a cell ID may be used as the factor of a grouping rule function for resource selection. For example, discovery resource areas may be configured by forming groups in such a manner that a cell 1 is determined to be a group 1 if the cell 1 (in particular, in the case of UE placed at the edge of a cell) has maximum RSRP and a cell 2 is determined to be a group 2 if the cell 2 has maximum RSRP.

Referring back to the example of FIG. 25, if RSRP of the RS of a cell to which UE now belongs is a maximum, the discovery resource area A 2503 and the discovery resource area B 2505 may be allocated. If RSRP of the RS of a neighbor cell is a maximum, the discovery resource area C 2507 may be allocated. Furthermore, which one of the discovery resource area A 2503 and the discovery resource area B 2505 will be determined may be determined based on the value of RSRP of the RS of a cell to which UE now belongs.

In some embodiments, a UE grouping rule may be determined by performing comparison on received RSRP thresholds instead of a cell ID. In other words, a case where RSRP is a predetermined threshold or more may be defined to be included in a group Ai (i=1, 2, 3, . . . ) and a case where RSRP is less than the predetermined threshold may be defined to be included in a group Bi (i=1, 2, 3, . . . ) regardless of a cell ID (when the number of UE groups (i.e., discovery resource areas) is plural).

In the example of FIG. 25, assuming that a predetermined threshold is −30 dbm, the discovery resource area A 2503 and the discovery resource area B 2505 may be allocated to UEs placed at the centers of cells. Furthermore, the discovery resource area C 2507 may be allocated to UEs placed at the edge area of the cell.

Furthermore, if 5 UE groups are defined by taking into consideration discovery between multiple cells and UEs are included in the groups, 4 of the 5 UE groups may include UEs slightly closer to cell centers, and the remaining one UE group may include UEs placed cell edges and UEs placed at the edge of a neighbor cell. That is, if discovery between multiple cells is taken into consideration, a group to which UE at a cell edge belongs may include UE (in particular, UE close in distance) placed at the cell edge of a neighbor cell (e.g., a cell selected based on the intensity of a synchronization signal and/or the intensity of RSRP) in addition to UE belonging to the same cell. That is, inter-cell discovery is possible (on the assumption of synchronization between cells) because UEs placed in the edge area of a neighbor cell have mutual proximity although they belong to different cells. Accordingly, UEs belonging to different cells may be defined as one group. Accordingly, a discovery message can be transmitted in the same discovery resource area, and adjacent UE can be discovered by searching for a corresponding discovery resource area from the point of view of reception.

In the example of FIG. 25, the discovery resource area A 2503 and the discovery resource area B 2505 may be allocated to UEs placed in the centers of cells. Furthermore, the discovery resource area C 2507 may be allocated to UE placed in a cell edge area and UE placed at the edge area of a neighbor cell.

If UEs sense discovery messages using methods, such as those of FIGS. 24 and 25, and differently configures their discovery message transmission sections for each subband/slot according to frequency/time, the number of D2D UEs capable of receiving discovery messages may look like reducing because the time taken to sense a discovery message is reduced. If UEs which have to sense all discovery messages are divided into 3 regions (i.e., 3 subbands/sections), however, it may be determined that the number of UEs which have to actually sense discovery messages has been reduced to ⅓ on the assumption that the UEs have been uniformly distributed. Furthermore, the frequency/time have been reduced to ⅓ unlike in an existing hopping pattern, but small UEs whose frequency/time have been reduced to ⅓ may perform D2D discovery in a predetermined frequency/time based on a subband/slot within the reduced frequency/time if they perform transmission according to a hopping pattern based on the time/frequency using resources three times existing resources.

FIG. 26 shows an example in which discovery resource areas are distinctly configured according to an embodiment of the present invention.

In FIG. 26, small squares indicate discovery resources now used by other UEs, and different patterns of the squares indicate that the discovery resources are used by different UEs.

In FIG. 26, a discovery resource pool 2601 is configured to include 44 RB pairs in a frequency domain and configured to include 64 subframes in a time domain. Furthermore, it is assumed that the discovery resource pool 2601 is divided into discovery resource areas based on the RSRP values of RSs received by UEs. Furthermore, the entire range of RSRP is −60 dbm to 60 dbm in a corresponding cell.

FIG. 26 illustrates that the number of UEs is 12 in a cell and each discovery resource area has been divided into 12 frequency-time domains for each UE.

Referring to FIG. 26, a specific RSRP value (or RSRP range) may be mapped to each of discovery resource areas 2603 to 2625 divided in the in the time and frequency domains. In other words, the entire range of RSRP of −60 dbm~60 dbm is divided at a 10 dbm interval, and the RSRP ranges divided at the 10 dbm interval may be mapped to the discovery resource areas 2603 to 2625. That is, in FIGS. 24 and 25, the discovery resource area has been allocated in the frequency or time domain based on an RSRP value measured by UE. In contrast, in the example of FIG. 26, an RSRP range and each discovery resource area are subdivided in the frequency and time domains and mapped. For example, if the RSRP measurement value of UE1 belongs to −60 dbm~−50 dbm, the UE1 may sense a discovery message resource within the discovery resource area A 2603 and then select a discovery resource for sending its discovery message. Furthermore, if the RSRP measurement value of UE2 belongs to −50 dbm~−40 dbm, the UE2 may sense a discovery message resource within the discovery resource area B 2605 and then select a discovery resource for sensing its discovery message.

In FIG. 26, the discovery resource areas have been illustrated as being contiguously configured in the time and frequency domains, but they may be discontiguously (e.g., based on a discontiguous RB group and/or a discontiguous subframe group) configured in the time and/or frequency domains. Furthermore, in FIG. 26, the discovery resource areas have been illustrated as not overlap, but the present invention is not limited thereto. For example, adjacent discovery resource areas may overlap.

Furthermore, even in the method of dividing the entire discovery resource pool into discovery resource areas in the time and frequency domains based on RSRP values measured by UEs, the UEs may be grouped by taken into consideration cell IDs.

For example, groups may be formed in such a manner that a cell 1 is classified as a group 1 (e.g., the discovery resource area A 2603 to the discovery resource area H 2617) if the cell 1 has maximum RSRP and a cell 2 is classified as a group 2 (e.g., the discovery resource area I 2619 to the discovery resource area L 2625) if the cell 2 has maximum RSRP. Discovery resource areas may be determined based on RSRP measured by UE within each of the cells 1 and 2.

Furthermore, groups may be formed in such a manner that a cell is classified as a group A (e.g., the discovery resource area A 2603 to the discovery resource area H 2617) if RSRP of the cell is a predetermined threshold or more and a cell is classified as a group B (e.g., the discovery resource area I 2619 to the discovery resource area L 2625) if RSRP of the cell is less than the predetermined threshold. Discovery resource areas may be determined based on RSRP measured by UE within each of the cells 1 and 2.

Furthermore, UE placed at the edge of a neighbor cell may also be included by taking into consideration discovery between multiple cells. For example, the discovery resource area A 2603 to the discovery resource area H 2617 may be allocated to UE placed in the center of each cell. Furthermore, the discovery resource area I 2619 to the discovery resource area L 2625 may be allocated to UE placed in a cell edge area and UE placed at the edge area of a neighbor cell.

Unlike in the aforementioned method, discovery resource areas may be configured by dividing the entire discovery resource pool in a frequency domain based on an RSRP value measured by UE, and a discovery resource may be selected by dividing a discovery resource area into subframe configuration sets allocated to each UE group in a time domain. For example, a UE group 1 may use a first subframe configuration set in order to select a discovery resource, and a UE group 2 may use a second subframe configuration set in order to select a discovery resource. That is, UE selects a discovery resource within a discovery resource area determined based on RSRP measured by the UE, but may select the discovery resource randomly or based on a specific probability within a subframe configuration set allocated by the eNB. In this case, the subframe configuration set may include a plurality of contiguous or discontiguous subframes.

More specifically, an eNB or UE may group adjacent UEs and a specific subframe configuration set may be used for each UE group so that UEs belonging to RSRP having the same or similar range receive or send discovery messages in the same subframe intensively. For example, an eNB may notify adjacent UEs (i.e., a UE group) of specific subframe configuration set information through RRC signaling or a physical layer channel (e.g., a PUCCH or PUSCH) based on RRM measurement information or CSI received from the UEs. Furthermore, UEs may notify surrounding UEs of their subframe configuration set information through a D2D synchronization signal or discovery message. Alternatively, grouping may be performed based on a UE ID, and a different subframe configuration set may be allocated to each group.

Furthermore, UE may be made to automatically recognize a subframe configuration set, used by the UE, based on RSRP. What a discovery message has to be transmitted or received in which discovery resource (e.g., a subframe or subframe group) may be determined with reference to a measured value, such as RSRP owned by UE through measurement, and an RSRP classification reference within a cell because the measured value.

Since two or more UEs are able to discover each other through a discovery procedure, each UE may randomly select a subframe in which a discovery message is transmitted in its subframe configuration set/group. That is, each UE may select an operation for sending which subframe in a given subframe configuration set and not sending which subframe in the given subframe configuration set randomly or based on a specific probability. In contrast, UE which detects a discovery message may monitor all such subframe configuration sets and efficiently detect proximity UE.

Meanwhile, the discovery resource area configured using the methods described with reference to FIGS. 24 to 26 may be changed for each discovery resource pool or for each discovery cycle as described above.

Furthermore, the discovery resource area may be variably changed depending on a service used by a user or the setting (or input) of a user. For example, in a D2D discovery process, the range in which UE to be discovered is discovered may be various for each UE. If a service suitable for discovering UE in a wide range is used, adjacent UEs are to be discovered in a wide range, or a larger number of UEs are to be discovered, the range of a discovery resource area may be set larger, sensing may be performed within the discovery resource area that is set larger, and a discovery resource may be selected. In contrast, if an irrelevant service is used although UE is discovered in a narrow range, adjacent UEs are to be discovered in a narrow range, or a small number of UEs are to be discovered, the range of a discovery resource area may be set small, sensing may be performed within the discovery resource area that is set small, and a discovery resource may be selected.

In other words, a discovery range and/or the number of discoverable devices may influence such parameters. Such a demand may be generated in services for public safety or commercial purposes. That is, a discovery range and/or the number of discoverable devices may be different depending on which service (or application) is used.

Furthermore, a user may directly input a discovery range and/or the number of discoverable devices or select (or control) a discovery range and/or the number of discoverable devices through a switch manipulation. In other words, in order to change the range in which many users are to be discovered in a narrow area or small users are to be discovered in a wide area and to change the number of discoverable devices, a user may directly set the parameters. Simply, a user may directly set the parameters using an external switch, such as a dip switch.

FIGS. 24 to 26 have illustrated the method of grouping UEs based on the results of cell measurement (e.g., RLM, RRM, and CSI) using RSs transmitted by an eNB and mapping a discovery resource area for each UE. However, the present invention is not limited to an RS transmitted by an eNB, and a discovery resource area to be used may be determined by the signal quality and intensity of a signal transmitted by another UE. This is described in more detail below with reference to FIG. 27.

FIG. 27 is a diagram illustrating a method for determining a discovery resource area based on a signal transmitted by UE according to an embodiment of the present invention.

Referring to FIG. 27(a), a network sets specific UEs as a kind of reference UE. In FIG. 27, it is assumed that UE A, UE B, and UE C have been set as reference UE.

In this case, UEs that are placed geographically distant may be set as reference UE. Furthermore, if discovery between cells is taken into consideration as described above, a discovery resource area may also be configured in the same discovery pool with respect to UE placed at the edge area of a neighbor cell. Accordingly, reference UEs are not related to whether they belong to a specific cell. That is, all of the UE A, the UE B, and the UE C may be placed in the same cell coverage or may be placed in different cell coverage.

Furthermore, as in FIG. 27(b), the reference UEs (i.e., the UE A, the UE B, and the UE C) may be associated with respective groups, and discovery resource areas mapped to the respective groups may be configured. That is, the UE A may be mapped to a discovery resource area A 2703, the UE B may be mapped to a discovery resource area B 2705, and the UE C may be mapped to a discovery resource area C 2707. In this case, each discovery resource area mapped to the reference UE may be segmented by combining one or more of a frequency domain, a time domain, and a spatial domain as described above. Furthermore, the discovery resource area mapped to the reference UE may be segmented by taking into consideration a UE ID or a cell ID.

In this case, regarding the remaining UEs other than the reference UE, a discovery resource area to be used may be selected based on the quality and intensity of a signal received by the reference UE. For example, a discovery resource area associated with reference UE from which the strongest signal is received or a signal having the best quality is received may be used. In the example of FIG. 27, UE 1 receives signals from the UE A, the UE B, and the UE C, respectively, determines a signal having the highest reception signal intensity or a signal having the best reception signal quality, and selects a discovery resource area associated with UE which has sent the corresponding signal.

Furthermore, the UE 1 senses a discovery message in the selected discovery resource area, searches the sensed resources for resources having a low energy level, and randomly selects a discovery resource within a specific range (e.g., low x % (x=a specific integer, 5, 7, 10, . . . ) in the retrieved resources.

In order to determine a discovery resource area to be used, a discovery signal transmitted by reference UE may be used. If reference UE sends a synchronization signal for discovery, the synchronization signal may be used to determine a discovery resource area to be used.

As described above, if infrastructure is supported using the method for determining a discovery resource area using an RS, which is proposed by an embodiment of the present invention, a discovery procedure using an existing dispersive method can be efficiently improved. Furthermore, what UE measures RSRP using RS information is a technology now implemented in LTE UEs. If such a technology is used, UE can be efficiently discovered based on surrounding UEs in a D2D discovery without proposing a change of the LTE standard or a new signal or protocol. Furthermore, consumed energy can be reduced by reducing the time taken for UE to perform sensing for discovery. Furthermore, processing overhead for the sensing of UE and for discovery resource selection can be reduced compared to existing discovery methods because a sensed frequency section is reduced and a discovery resource is selected. Furthermore, various sensing configurations and resource selection are made possible based on a required service or range according to various requirements which may be taken into consideration in a D2D discovery step.

In the aforementioned description of the present invention, a method for limiting a discovery resource area to a time domain and/or frequency domain and performing a sensing or transmission operation has been mostly illustrated, but this is for convenience of description and the present invention is not limited thereto. As described above, a discovery resource area may be divided even in a spatial domain in the same manner using the method of configuring a discovery resource area in a time domain or frequency domain. Furthermore, as in the method of combining time and frequency domains and dividing a discovery resource area, a spatial domain may be combined with time and frequency domains and a discovery resource area may be divided. Furthermore, other regions (e.g., a UE ID and/or a cell ID) may be combined other than the time, frequency, and spatial domains, and an operation according to an embodiment of the present invention may be performed.

Furthermore, in the aforementioned description of the present invention, the method of determining, by each UE, that it has to send a discovery message in which discovery resource area based on RSRP has been mostly illustrated, but this is for convenience of description and the present invention is not limited thereto. As described above, various values in addition to RSRP may be used as parameters for determining the discovery resource area of UE. For example, RLM, RSRQ, RSSI, CSI, and pathloss may also be used as parameters for determining the discovery resource area of UE. That is, factors used between UE and an eNB, which may be used to estimate the position or proximity of UE, may be used as parameters for determining a discovery resource area for the sensing and transmission of a discovery resource according to an embodiment of the present invention. Furthermore, one or more factors may be combined and used as parameters for determining a discovery resource area. For example, a discovery resource area may be determined by combining and using RSRP and RSRQ or by taking into consideration RSRP, RSRQ, and pathloss together.

Delayed Response-Based D2D Search Method

Recently, disaster communication services and technology standardization using a 3GPP LTE/LTE-A mobile communication network have been actively conducted. In 3GPP, a group communication service utilizing a proximity-based communication technology and a discovery service utilizing a D2D discovery signal/message to transfer an emergency rescue request signal are mentioned as representative use cases of disaster communication and relevant services and technical standards have been discussed.

Disaster communication include all the wide range of problems such as a public warning system through disaster recognition, information exchange between UEs in a disaster area, infrastructure network access, and the like.

The present invention proposes a technique of effectively and promptly accessing an infrastructure network by utilizing an inter-UE direct communication technology in a state in which the entirety or a portion of a communication infrastructure cannot be used in a disaster situation (for example, an out-of-coverage or partial network coverage scenario). That is, the present invention intends to realize information exchange between UEs and infrastructure network access in a disaster area in order for UEs of the disaster area to provide information regarding a specific disaster situation and information required for prompt rescue.

Hereinafter, for UE discovery, a discovery signal will be assumed and described, but the present invention is not limited thereto. That is, a synchronization signal, a beacon signal, a reference signal, a D2D direct communication signal, and the like, may also be used.

FIG. 28 is a view illustrating a situation in which UEs in a disaster area access an infrastructure network according to an embodiment of the present invention.

Referring to FIG. 28, an eNB-PS (enhanced-Node B of Public Safety Network) represents a disrupted base station (BS) in a disaster area, and an eNB-NPS (eNB of Non-Public Safety Network) represents a neighbor BS which has recognized a situation in which the eNB-PS does not normally operate.

When a disaster situation occurs so the eNB is disrupted, eNBs (i.e., eNB-NPS 1 and eNB-NPS 2) of adjacent cells detect a corresponding situation, allocates resource (e.g., a resource pool) for transmitting a D2D discovery signal to UEs appropriate for UE discovery among UEs that belong to the cells thereof and subsequently permits (or commands) the UEs to perform UE discovery on UEs of the disaster area. Resource for transmitting the D2D discovery signal may be allocated in advance or in real time (i.e., when performing discovery is permitted).

UEs outside of coverage may detect (i.e., receive) a discovery signal transmitted from UEs within coverage, and receive information (e.g., a UE ID (identifier)) of adjacent UEs available for D2D communication and information regarding a D2D signal transmission resource through the received discovery signal.

In the sequential processes, a D2D transmission environment may deteriorate due to resource conflict among a plurality of D2D UEs present outside of coverage, in the boundary of coverage, and within coverage and restrictions for protecting a wide area network (WAN) UE within coverage, and thus, a UE recognition method for minimizing resource conflict among UEs and minimizing battery consumption is required.

A plurality of disaster area UEs may discover a neighbor BS and attempt access or a UE unable to discover a neighbor BS may search for a signal of a neighbor D2D UE and so as to be connected to a D2D relay UE within coverage through hopping using various D2D relay functions. In this process, indiscriminate signal transmissions may be made to cause resource conflict between D2D UEs or between cellular resources and ineffective use of resource. Thus, it is desirable to optimize a system operation by minimizing signals unnecessarily exchanged in terms of entire UEs or individual UEs.

FIG. 29 is a view illustrating a UE discovery method according to an embodiment of the present invention.

In the present invention, a model in which a resource pool required for transmitting a discovery signal and a D2D signal is received from a UE that belongs to an eNB-NPS (eNB of Non-Public Safety Network), a neighbor BS which has detected a situation in which an eNB-PS (enhanced-Node B of Public Safety Network), a disrupted BS of a disaster area, does not normally operate is considered.

It is anticipated that indiscriminate signal transmissions may be made while UEs in the disaster area receive a discovery signal transmitted by a UE of an adjacent cell and respond thereto, which may inevitably cause resource conflict and ineffective use of resource.

Thus, the present invention aims to reduce resource conflict by minimizing unnecessary signal transmission of UEs by utilizing D2D signal transmission and discovery method of a response delay-based D2D UE.

In the method proposed in the present invention, a UE that transmits a discovery signal transmits a signal only once during a discovery period and maintains a reception mode during the other remaining time.

UEs, which receive the discovery signal, wait for a predetermined period of time and transmit a response signal on the basis of a magnitude of reception SINR (Signal-to-Interference plus Noise Ratio) (or an SNR (Signal-to-Noise Ratio), an RSRP (Reference Signal Receive Power), an RSRQ (Reference Signal Received Quality), or an RSSI (Received Signal Strength Indicator), etc.) of each UE, instead of responding at a previously designated fixed time.

That is, after the discovery signal is received, a response delay time is determined according to a reception SINR, and when the response delay time terminates, a response signal is transmitted. Here, the response delay time may be determined to be in inverse proportion to the reception SINR.

For example, as the SINR is higher, a corresponding UE is highly likely to be positioned in the proximity of the discovery signal transmission terminal so a short response delay time is determined for the UE, and as the SINR is lower, a corresponding UE is highly likely to be positioned to be distant from the discovery signal transmission terminal so a long response delay time may be determined for the UE.

Equation 16 expresses an example of determining a response delay time.

$$\text{Response\_delay} = \frac{\beta_D}{\beta_D + SNR} \cdot \text{discovery\_period} \quad \text{[Equation 16]}$$

In Equation 16, $\beta_D$ denotes a D2D target SINR/SNR. The target SINR/SNR value may be set in advance.

Here, the discovery signal includes information required for discovery such as a UE ID and/or a discovery period, and the response signal includes a UE ID. Each UE may identify neighbor UEs available for D2D communication with each UE through a UE ID transmitted and included in the received discovery signal or response signal.

FIG. 30 is a view illustrating a D2D UE discovery method according to an embodiment of the present invention.

In FIG. 30, in order to clarify features of a delayed response, an absolute and relative propagation delay time during which a transmission signal (i.e., a discovery signal or a response signal) is transmitted is partially enlarged and illustrated. That is, both propagation delay and response delay are illustrated in the same drawing, a propagation delay relative time interval and a delay response relative time in accordance with an SINR should be understood by applying different scales.

In the present invention, a synchronous D2D terminal discovery is assumed. That is, every UE transmits a discovery signal and also receives a discovery signal transmitted from an adjacent UE. Also, it is assumed that an eNB of a cell adjacent to a disaster area may detect a disaster situation through back haul.

A proposed response delay-based terminal discovery procedure will be described on the basis of the example of FIG. 30.

1) An eNB of a cell, which is adjacent to a disaster area and has detected a disaster situation through back haul, selects a UE1-NPS, a UE adjacent to the disaster situation and appropriate for relaying, among UEs that belong to the corresponding cell, allocates a resource pool required for transmitting a D2D discovery signal to the UE, and enables the UE to perform UE discovery.

Here, the eNB may implicitly instruct the UE to perform UE discovery by allocating a resource pool, and may explicitly instruct through an indicator for performing UE discovery together with a resource pool.

2) Allocated the resource pool from the eNB, the UE1-NPS transmits a discovery signal 3001 toward the UEs in the disaster area and subsequently maintains a reception mode during a remaining time until a discovery period 3006 terminates.

Also, when the UEs (i.e., UE2-PS, UE3-PS, UE4-PS) positioned in the disaster area are disconnected from the eNB-PS to which they belong due to the disaster situation, the UEs maintain a reception mode in order to receive a discovery signal from the UE positioned in an adjacent cell.

Here, the discovery signal 3001 includes a UE ID.

Also, the discovery signal 3001 may include discovery period 3006 information.

In a case in which the discovery period 3006 is not synchronized in each cell, the discovery signal 3001 may include discovery period 3006 information to adjust synchronization of the discovery period 3006 between UEs that belong to the disaster area cell and UEs that belong to a cell adjacent to the disaster area.

Also, the discovery signal 3001 may not include the discovery period 3006 information. When the discovery period 3006 is synchronized in each cell, the UEs may receive the discovery period 3006 information from the BSs to which they belong. Here, the discovery period 3006 may be transmitted through system information (e.g., a master information block (MIB) or a system information block (SIB)).

3) Rather than immediately responding to the discovery signal, the UE2-PS, UE3-PS, and UE4-PS of the disaster area have a different (variable) response delay 3007 value determined according to a magnitude of a reception SINR and wait for a corresponding response delay 3007 time. That is, UEs having a high reception SINR have a relatively short response delay 3007, compared with UEs having a low SINR.

Here, in order to determine the response delay 3007, parameters such as a strength of a signal from the UE (i.e., the UE1-NPS) which has transmitted the discovery signal, signal quality, path loss, and the like, may be used. Here, in a case in which the UE1-NPS transmits a reference signal to determine the response delay 3007, strength or quality of the reference signal may be used as a reference thereof.

4) When the determined response delay 3007 time terminates, the UEs (i.e., UE2-PS, UE3-PS, and UE4-PS) of the disaster area transmits a response signal 3002 regarding the discovery signal received from the UE1-NPS.

In FIG. 30, since the UE2-PS has a relatively high reception SINR, it has a short response delay 3007, compared with other UEs (i.e., the UE2-PS and the UE3-PS), and thus, the UE2-PS first responds to the discovery signal received from the UE1-NPS. Also, the UE1-NPS detects the corresponding response signal 3002 to recognize presence of the UE2-PS.

When the response delay 3007 of each of the UE2-PS and the UE3-PS terminates, the UE2-PS and the UE3-PS sequentially transmit the response signal 3002 to the UE1-NPS, and upon detecting the corresponding response signal 3002, the UE1-NPS successfully recognizes presence of the UE2-PS and the UE3-PS and the discovery period 3006 terminates.

Here, if the determined response delay 3007 is longer than the discover period 3006, the discovery period 3006 terminates in a state in which the response signal 3002 is not transmitted yet, and thus, the UE1-NPS cannot recognize presence of a corresponding UE. In FIG. 30, since a relatively long response delay 3007 of the UE5-PS is determined, it is not discovered by the UE1-NPS.

5) Having successfully finished UE discovery, the UE1-NPS selects a UE to which the discovery signal is to be transmitted during a next discovery period, and forwards a resource pool for transmitting the discovery signal thereto.

Here, the UE1-NPS may select a UE to which the discovery signal is to be transmitted in consideration of the three schemes as follows.

Scheme 1) The UE1-NPS may select a UE which has the shortest response delay 3007 and has first transmitted a response signal 3002 with respect to the discovery signal 3001. This will be described with reference to FIG. 31.

FIG. 31 is a view illustrating a UE discovery method according to an embodiment of the present invention.

Referring to FIGS. 30 and 31, since the UE2-PS has a relatively high SINR, it has a relatively short response delay 3007, compared with other UEs (i.e., the UE3-PS and the UE4-PS), and thus, the UE2-PS first transmits a response signal 3002 in response to the discovery signal from the UE1-NPS. The selects the UE2-PS which has first transmitted the response signal 3002, forwards a resource pool, and enables the UE2-PS to perform UE discovery during a next discovery period.

The UE1-NPS may transmit information regarding a subframe pool and/or a resource block pool that belongs to the resource pool, as resource pool information, to the UE2-PS. The subframe pool and/or the resource block pool may be indicated by a bitmap or a start/end subframe/resource block index.

Scheme 2) The UE1-NPS may select a UE which has the longest response delay 3007 and responds the latest. This will be described with reference to FIG. 32.

FIG. 32 is a view illustrating a UE discovery method according to an embodiment of the present invention.

Referring to FIGS. 30 and 32, since the UE4-PS has a relatively low reception SINR, compared with other UEs (i.e., the UE2-PS and the UE3-PS) which have transmitted a response signal, the UE4-PS has a relatively short response delay 3007 and transmits the response signal 3002 the latest with respect to the discovery signal of the UE1-NPS, compared with other UEs. The UE1-NPS selects the UE4-PS which has transmitted the response signal 3002 the latest, forwards a resource pool, and enables the UE4-PS to perform UE discovery during a next discovery period.

Scheme 3) The UE1-NPS randomly selects a certain UE among the UEs which have transmitted the response signal 3002 with respect to the discovery signal 3001.

It is assumed that the UE1-NPS randomly selects the UE3-PS and transmits resource pool information.

The UE1-NPS selects an arbitrary UE among the UE2-PS, the UE3-PS, and the UE4-PS which have transmitted the response signal 3002, forwards a resource pool thereto, and enables the selected UE to perform UE discovery during a next discovery period.

6) The UE of the disaster area, which has received the resource pool, randomly selects an available resource from the resource pool and performs UE discovery.

That is, in the example illustrated in FIG. 31, the UE2-PS, which has received the resource pool information from the UE1-NPS, transmits the discovery signal 3003 from a resource randomly selected from the resource pool toward neighbor UEs. Also, in the foregoing example of FIG. 32, the UE4-PS, which has received the resource pool information from the UE1-NPS, transmits a discovery signal 3004 from a resource randomly selected from the resource pool toward neighbor UEs. Also, the randomly selected UE3-PS in the foregoing example receives the resource pool information from the UE1-NPS and transmits a discovery signal 3005 from a resource randomly selected from the resource pool toward neighbor UEs.

The UEs, which have recognized the presence of the neighbor UEs, does not respond to a discovery signal any longer, and only the terminals that first receive the discovery signal responds thereto. The UE discovery proposed in the present invention is repeatedly performed until there are no more UEs to which the discovery signal is to be transmitted, among the UEs of the disaster area.

A scheme in which the UE1-NPS selects a UE for performing UE discovery during a next discovery period and a scheme in which the selected UE selects a UE for performing UE discovery during a next discovery period may be independently determined for each UE. For example, the UE1-NPS selects a UE which has first transmitted a response signal, as a UE which is to perform UE discovery, and the selected UE may select an arbitrary UE as a UE for performing UE discovery during a next discovery period.

Meanwhile, the UE1-NPS may not select a UE for performing UE discovery during a next discovery period, and a UE for performing UE discovery during a next discovery period may be implicitly selected.

In detail, in the example of FIG. 30, since the UE2-PS has the highest SINR, it has a short response delay, compared with the UE3-PS and the UE4-PS, and thus, the UE2-PS first responds to the discovery signal from the UE1-NPS. Here, the UE3-PS and the UE4-PS which have been maintained in the reception mode listen to a response signal that the UE2-PS has transmitted to the UE1-NPS.

The UE3-PS and the UE4-PS abandon responding to the discovery signal from the UE1-NPS and transmit a response signal to the UE2-PS instead. The UE1-NPS, which has been maintained in the reception mode after it had received the response signal from the UE2-PS, listens to the response signal that the UE3-PS and the UE4-PS have transmitted to the UE2-PS, and recognizes presence of the UE3-PS and the UE4-PS.

Accordingly, the UE1-NPS successfully discovers the UE2-PS, the UE3-PS, and the UE4-PS, and the UE2-PS recognizes presence of the UE1-NPS, the UE3-PS, and the UE4-PS and finishes the UE discovery process of the discovery period.

Since the UE1-NPS has successfully terminated the UE discovery, the UE2-PS which has successfully discovered the neighbor UEs other than the UE1-NPS performs UE discovery at a next discover period. That is, the UE, which has transmitted the response signal fastest performs UE discovery at a next discovery period.

Since the discovery signal and the response signal include a UE ID, the UE1-NPS, the UE3-PS, and the UE4-PS, among the UEs which have received the discovery signal from the UE2-PS, already recognize presence of the UE2-PS, so they do not transmit a response signal any longer, and UEs of the disaster area other than the UE5-PS that first receives the discovery signal, discover UEs available for D2D communication nearby. Repeating this process, UE discovery is continuously performed until the innermost UE of the cell of the disaster area is discovered, to form a multi-hop link for accessing an external infrastructure network.

In the UE discovery method proposed in the present invention, it is assumed that UE discovery and D2D direct communication use the same resource. Thus, information of a UE available for D2D communication nearby and resource information to be used for communicating with the corresponding terminal may be provided together.

Thus, advantageously, there is no need to separately allocate resource required for transmission of a D2D signal of disaster area terminals.

FIG. 33 is a view illustrating a method for allocating resource simultaneously with UE discovery according to an embodiment of the present invention.

Referring to FIG. 33, it is assumed that a resource pool allocated for an eNB of a cell which is adjacent to a disaster area and has detected a disaster situation to discover UEs positioned in the disaster area is the UE1-NPS to UEn-PS.

Also, it is assumed that the UE1-NPS that belongs to the cell of the eNB of the cell which is adjacent to the disaster area and has detected the disaster situation transmits a discovery signal and UEs from which response signals thereto are received so as to be discovered are the UE2-PS, the UE3-PS, and the UE4-PS.

Also, it is assumed that the UE1-NPS that belongs to the cell of the eNB of the cell which is adjacent to the disaster area and has detected the disaster situation selects the UE2-PS as a UE for discovering neighbor UEs at a next discovery period and it is assumed that the UE2-PS selects the UE5-PS as a UE for discovering neighbor UEs at a next discovery period.

The UE1-NPS, which belongs to the cell of the eNB of the cell which is adjacent to the disaster area and has detected the disaster situation, selects the UE1-NPS resource RB1 3301 randomly selected from the resource pool and transmits a discovery message. Also, the UE1-NPS may equally use the resource 3301 used for transmitting the discovery message in order to perform D2D direct communication with the UE2-PS, the UE3-PS, and the UE4-PS discovered by the UE1-NPS. That is, the corresponding frequency region (e.g., RB) may be used by the UE1-NPS for D2D direct communication within the same discovery period.

Also, the UE2-PS and the UE5-PS selected by the UE1-NPS to discover a neighbor UE may use resource (i.e., RB1 3302 and RB2 3303) used by the UE2-PS and the UE5-PS to transmit the discovery signal, for D2D direct communication.

Thus, for example, the UE2-PS receives signals transmitted from the UE1-NPS and the UE5-PS by using the RB1 3301 and the RB3 3303. Also, the UE4-PS, which only receives a discover signal, exchanges information with the UE1-NPS through D2D direct communication by using the RB 1 3301, which has been used by the UE1-NPS, an adjacent UE available for D2D direct communication, to transmit the discovery signal.

FIG. 34 is a view illustrating a UE discovery method according to an embodiment of the present invention.

In FIG. 34, it is assumed that the eNB of the cell which is adjacent to the disaster area and has detected the disaster situation through back haul selects a UE1 for performing UE discovery because the UE1 is adjacent to the disaster situation and appropriate for relaying, among UEs that belong to the corresponding cell. Also, it is assumed that the UEs of the disaster area are UE2 to UEn.

Referring to FIG. 34, the UE1 transmits a discovery signal toward the UEs (i.e., the UE2 to UEn) of the disaster area (S3401).

The UE1 may be allocated a resource pool required for transmission of a D2D signal from the BS and transmit a D2D discovery signal from a resource randomly selected from the resource pool.

Here, the discovery signal may include a UE ID and/or discovery period information.

After transmitting the discovery signal, the UE1 is switched to a reception mode and maintains the reception mode for a remaining period of time until the discovery period terminates.

Meanwhile, when the UEs (i.e., the UE2 to UEn) positioned in the disaster area are disconnected from the eNB to which they belong, the UEs maintain a reception mode in order to receive a discovery signal from the UE positioned in the adjacent cell.

Upon receiving the discovery signal from the UE1, the UE2 to UEn determine a response delay time on the basis of a reception SINR (S3402).

Here, the reception SINR may be derived using the received discovery signal, and here, in a case in which the UE1 transmits a reference signal, the reception SINR may be derived on the basis of the reference signal.

Also, UEs having a high reception SINR has a relatively short response delay, compared with UEs having a low SINR. That is, the response delay time is determined to be in inverse proportion to the reception SINR.

The UE2 to UEn wait for the corresponding response delay time.

When the calculated response delay terminates, the UE2 to UEn transmit a response signal (S3403). That is, each of the UEs independently has a calculated response delay time, and when the response delay time thereof terminates, each of the UEs transmits a response signal.

After transmitting the response signal, the UE2 to UEn are switched to a reception mode and maintain the reception mode for a remaining period of time until the discovery period terminates.

Upon receiving the response signals from the UE2 to UEn, the UE1 selects a UE for performing a UE discovery process at a next discovery period, among the UEs which have transmitted the response signals (S3404). That is, the UE1 selects a UE for transmitting a discovery signal at a next discovery period.

Here, the UE1 may select a UE for performing the UE discovery process at a next discovery period by using any one of the three schemes described above. That is, the UE1 may select a UE which has transmitted a response signal first, a UE which has transmitted the response signal the latest, or an arbitrary UE In FIG. 34, it is assumed that the UE1 selects the UE2 as a UE for performing a UE discovery process at a next discovery period.

The UE1 transmits resource pool information to the UE2 (S3405).

Thereafter, the UE (i.e., the UE2) of the disaster area which has received the resource pool randomly selects an available resource from the resource pool and performs UE discovery. The UE discovery process is repeatedly performed until every UE positioned in the disaster area is discovered FIG. 35 is a view illustrating a difference between an existing UE discovery method and a UE discovery method proposed in the present invention.

FIG. 35(a) is a view illustrating an existing UE discovery scheme, and FIG. 35(b0 is a view illustrating a UE discovery scheme proposed in the present invention.

Referring to FIG. 35, compared with the existing UE discovery as a scheme of responding only to a discovery signal, in the UE discovery method proposed in the present invention, the UEs, which have received the discovery signal, are on standby in a reception mode for a predetermined period of time on the basis of an SNIR thereof, or the like, and sequentially transmit a response signal, thus obtaining an effect of reducing a resource conflict between the UEs.

Also, since a UE listens to a response signal transmitted by another UE in the reception mode and transmits a respond signal, whereby a link may be additionally formed between the UE2 and the UE3 and between the UE2 and the UE4 as illustrated in FIG. 35(b), compared with the existing UE discovery.

The UE discovery performance of the D2D UE discovery scheme based on a response delay and the infrastructure access performance proposed in the present invention were verified through a simulation in an environment as illustrated in Table 6.

TABLE 6

| Parameter | Value |
|---|---|
| ISD (Inter-Site Distance) | 500 m |
| Number of eNBs | 1 for NPS (100% enabled) |
|  | 1 for PS (0% enabled) |
| Number of UEs | 75 UEs in case of NPS, and 25 UEs in case of PS |
| UE distribution | NPS: Uniform (entire cells) |
|  | PS: Uniform (⅙ of cell adjacent to NPS) |
| Minimum distance between UEs | 20 m |
| Path loss model (D2D) | 148.1 + 40log10(d [km]) |
| Shadow fading | 7 dB log-normal |
| Thermal noise PSD (power spectral density)) | −174 dBm/Hz |
| Noise figure at all UEs | 9 dB |
| Channel bandwidth | 180 kHz |

TABLE 6-continued

| Parameter | Value |
|---|---|
| Resource allocation | Randomly 1 PRB per UE |
| UE transmission power | 23 dBm |
| Target SINR | 10 dB |
| Discovery period | 8 s |
| Beacon (discovery signal) transmission/reception time | 0.5 ms |

In order to verify the discovery performance of the UE discovery scheme based on response delay proposed in the present invention under the environment of Table 6, the number of transmissions of the discovery signal during the entire discovery period until the UE discovery terminated and the number of successfully discovering the innermost UE of a disaster area in which an eNB was disrupted were derived.

FIG. 36 is a view illustrating results of a simulation of UE discovery performance of response delay-based UE discovery according to an embodiment of the present invention.

In FIG. 36, the horizontal axis represents three schemes (scheme 1, scheme 2, and scheme 3) proposed in the present invention, and the vertical axis represents the number (the number of hops or the number of discovered UEs).

Performances of three different cases of the schemes described above were compared (the schemes were (1) Scheme 1: UE discovery was performed by selecting a UE having the shortest response delay, (2) Scheme 2: UE discovery was performed by selecting a UE having the longest response delay, and (3) Scheme 3: UE discovery was performed by selecting a certain UE among UEs which transmitted a response).

In the simulation, the number of transmissions of a discovery signal (the number of hops) (the average hop number 3601) during the entire discovery period until UE discovery terminated and the number of successfully discovering the innermost UE of the disaster area in which an eNB was disrupted (average number of innermost UE discovered (×100) 3602) were derived in each scheme.

The results derived from the simulation are average values obtained by executing the proposed discovery scheme 1000 times in different UE drop environments.

Referring to FIG. 36, it can be seen that Scheme 2 in which UE discovery continued for a relatively long period of time and the number of successfully discovering the innermost UE of the disaster area cell was large exhibits the best performance in terms of network coverage.

Also, in order to verify infrastructure access performance of the proposed scheme, an experiment regarding whether UEs of the disaster area discovered during the entire discovery period formed a bi-directional link satisfying a threshold SINR value was conducted.

FIG. 37 is a view illustrating results of a simulation of infrastructure access performance of a response delay-based UE discovery method according to an embodiment of the present invention.

In FIG. 37, the horizontal axis represents the three schemes (Scheme 1, Scheme 2, and Scheme 3) proposed in the present invention, and the vertical axis represents the number of UEs.

Performances of three different cases in which UE discovery was performed by selecting any one of Scheme 1, Scheme 2, and Scheme 3 described above were compared.

In order for terminals of the disaster area to successfully access an adjacent infrastructure, (1) SINRs at the time when UEs, which have transmitted discovery signals playing a pivot role for infrastructure access, receive the mutual discovery signals should satisfy a threshold value, and (2) an SINR of a terminal which has transmitted a discovery signal when a UE, which only receives a discovery signal, transmits a response signal should satisfy a threshold value.

In the simulation, the average number of discovered UEs 3701 and the average number of network access UEs 3702 of each scheme were derived.

The results derived in the simulation are average values obtained by executing the proposed discovery scheme 1000 times in different UE drop environments.

Referring to FIG. 37, in the case of the three schemes, the almost same number of UEs successfully access the infrastructure, and here, in the case of scheme 2 in which the number of discovered UEs is larger than those of other schemes as illustrated in FIG. 35, since the number of terminals accessing the infrastructure is almost the same, while the number of discovered UEs is greater than those of the other two schemes, the infrastructure access probability is slightly low.

To sum up, in the present invention, the D2D UE discovery scheme based on response delay is proposed as a solution to the problem that resource conflict inevitably occurs due to indiscriminate signal transmissions during a process in which UEs of a disaster area which have received a discovery signal detect the discovery signal and transmit a response signal so resource is ineffectively used.

It is confirmed that, when a UE for transmitting a discovery signal is selected from UEs of a disaster area, three terminal selection methods are considered, and average performances in terms of network coverage and network access are compared. When a UE which transmits a response signal the latest is selected and perform discovery, the number of discovered UEs is the largest, obtaining better network coverage performance than two other schemes, and the average numbers of UEs successfully accessing a network are similar in performance in the three cases.

Device to Which Present Invention is Applicable

FIG. 38 is a view illustrating a block diagram of a wireless communication device according to an embodiment of the present invention.

Referring to FIG. 38, a wireless communication system includes a base station (BS) (or eNB) 3810 and a plurality of terminals (or UEs) 3820 positioned within coverage of the BS 3810.

The eNB 3810 includes a processor 3811, a memory 3812, and a radio frequency (RF) unit 3813. The processor 3811 implements functions, processes and/or methods proposed in FIGS. 1 through 37. Layers of radio interface protocols may be implemented by the processor 3811. The memory 3812 may be connected to the processor 3811 to store various types of information for driving the processor 3811. The RF unit 3813 may be connected to the processor 3811 to transmit and/or receive a wireless signal.

The UE 3820 includes a processor 3821, a memory 3822, and a radio frequency (RF) unit 3823. The processor 3821 implements functions, processes and/or methods proposed in FIGS. 1 through 37. Layers of radio interface protocols may be implemented by the processor 3821. The memory 3822 may be connected to the processor 3821 to store various types of information for driving the processor 3821. The RF unit 3823 may be connected to the processor 3821 to transmit and/or receive a wireless signal.

The memory 3812 or 3822 may be present within or outside of the processor 3811 or 3821 and may be connected to the processor 3811 or 3821 through various well known units. Also, the eNB 3810 and/or the UE 3820 may have a single antenna or multiple antennas.

The aforementioned embodiments are achieved by combination of structural elements and features of the present invention in a predetermined manner Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

An embodiment of the present invention may be implemented by various means, for example, hardware, firmware, software or a combination of them. In the case of implementations by hardware, an embodiment of the present invention may be implemented using one or more Application-Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers and/or microprocessors.

In the case of implementations by firmware or software, an embodiment of the present invention may be implemented in the form of a module, procedure, or function for performing the aforementioned functions or operations. Software code may be stored in the memory and driven by the processor. The memory may be placed inside or outside the processor, and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

In the wireless communication system of this disclosure, an example of a terminal discovery method in D2D communication applied to a 3GPP LTE/LTE-A system is described, but the terminal discovery method may also be applied to various wireless communication systems other than the 3GPP LTE/LTE-A system.

The invention claimed is:

1. A method for discovering a different terminal in a wireless communication system supporting device-to-device (D2D) communication, the method comprising:
   transmitting, by a terminal, a discovery signal for detecting neighboring terminals for the D2D communication;
   receiving, by the terminal, a response signal as a response with respect to the discovery signal from the different terminal,
   wherein the response signal is transmitted by the different terminal when a response delay time determined on the basis of a reception signal-to-interference noise ratio (SINR) terminates;
   detecting the different terminal based on the received response signal;
   selecting, by the terminal, a specific terminal for performing a terminal discovery process at a next discovery period, from among terminals which have transmitted the response signal; and
   transmitting, by the terminal, information of a resource pool for transmission of a discovery message by the selected specific terminal at the next discovery period to the selected specific terminal.

2. The method of claim 1, wherein the response delay time is determined to be in inverse proportion to the reception SINR.

3. The method of claim 1, wherein the specific terminal for performing the terminal discovery process at the next discovery period is selected as a terminal which has first transmitted the response signal.

4. The method of claim 1, wherein the specific terminal for performing the terminal discovery process at the next discovery period is selected as a terminal which has transmitted the response signal the latest.

5. The method of claim 1, wherein the specific terminal for performing the terminal discovery process at the next discovery period is selected randomly.

6. The method of claim 1, wherein the discovery signal includes a terminal identifier and/or discovery period information.

7. The method of claim 1, further comprising: after transmitting the discovery signal, switching the terminal to a reception mode.

8. The method of claim 1, wherein the terminal transmits the discovery signal only once during a discovery period and maintains a reception mode to receive a response signal transmitted from the neighboring terminals for a remaining time of the discovery period.

9. The method of claim 1, wherein the specific terminal is a terminal having a shortest response delay time or a longest response delay time.

10. A method for discovering a terminal in a wireless communication system supporting device-to-device (D2D) communication, the method comprising:
    receiving, by the terminal, a discovery signal for detecting neighboring terminals for the D2D communication from a neighboring terminal;
    determining, by the terminal, a response delay time on the basis of a reception signal-to-interference noise ratio (SINR);
    transmitting, by the terminal, a response signal as a response with respect to the discovery signal when the response delay time terminates,
    wherein the terminal is detected by the neighboring terminal based on the response signal; and
    receiving information of a resource pool for transmitting, by the terminal, a discovery message at a next discovery period from the neighboring terminal, if the terminal is selected by the neighboring terminal to perform a terminal discovery process at the next discovery period.

11. The method of claim 10, wherein the response delay time is determined to be in inverse proportion to the reception SINR.

12. The method of claim 10, wherein the reception SINR is derived on the basis of the discovery signal or a reference signal transmitted from the terminal which has transmitted the discovery signal.

* * * * *